(12) United States Patent
Okumura et al.

(10) Patent No.: US 8,300,040 B2
(45) Date of Patent: Oct. 30, 2012

(54) COEFFICIENT GENERATING DEVICE AND METHOD, IMAGE GENERATING DEVICE AND METHOD, AND PROGRAM THEREFOR

(75) Inventors: Akihiro Okumura, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 702 days.

(21) Appl. No.: 12/493,615

(22) Filed: Jun. 29, 2009

(65) Prior Publication Data

US 2010/0001989 A1 Jan. 7, 2010

(30) Foreign Application Priority Data

Jul. 2, 2008 (JP) .................................. 2008-173459

(51) Int. Cl.
*G09G 5/00* (2006.01)
(52) U.S. Cl. ........................................ 345/212; 345/214
(58) Field of Classification Search .................. 345/600, 345/690–694, 76–83, 87–102, 204–215
See application file for complete search history.

(56) References Cited

U.S. PATENT DOCUMENTS

| | | | | |
|---|---|---|---|---|
| 6,956,506 | B2 * | 10/2005 | Mantyjarvi et al. | 341/22 |
| 7,358,939 | B2 * | 4/2008 | Kim et al. | 345/77 |
| 7,928,969 | B2 * | 4/2011 | Ebisawa et al. | 345/204 |
| 8,085,224 | B2 * | 12/2011 | Kanai et al. | 345/75.2 |
| 2006/0208980 | A1 | 9/2006 | Okumura et al. | |
| 2007/0024582 | A1 * | 2/2007 | Kamimura | 345/156 |
| 2008/0259099 | A1 * | 10/2008 | Arai et al. | 345/690 |
| 2009/0237423 | A1 * | 9/2009 | Shih et al. | 345/690 |
| 2010/0164978 | A1 * | 7/2010 | Brown Elliott et al. | 345/600 |

FOREIGN PATENT DOCUMENTS

JP 2006-243518 9/2006

* cited by examiner

*Primary Examiner* — Vijay Shankar
(74) *Attorney, Agent, or Firm* — Oblon, Spivak, McClelland, Maier & Neustadt, L.L.P.

(57) ABSTRACT

A coefficient generating device generating a conversion coefficient for converting an input image signal of an input image into a display image signal of a display image includes a past-image generating unit that generates a past image signal of a past image correlated with a teacher image being one frame before a teacher image correlated with the display image; a transient-image generating unit that generates a transient image signal of a transient image; a visual-image generating that generates a visual image signal of a visual image; and a calculating unit that obtains the conversion coefficient using a pixel value of a pixel of interest in the teacher image and pixel values of pixels determined by a motion vector detected in a student image correlated with the input image and spatially/temporally near a pixel in the student image at the same position as the pixel of interest.

24 Claims, 29 Drawing Sheets

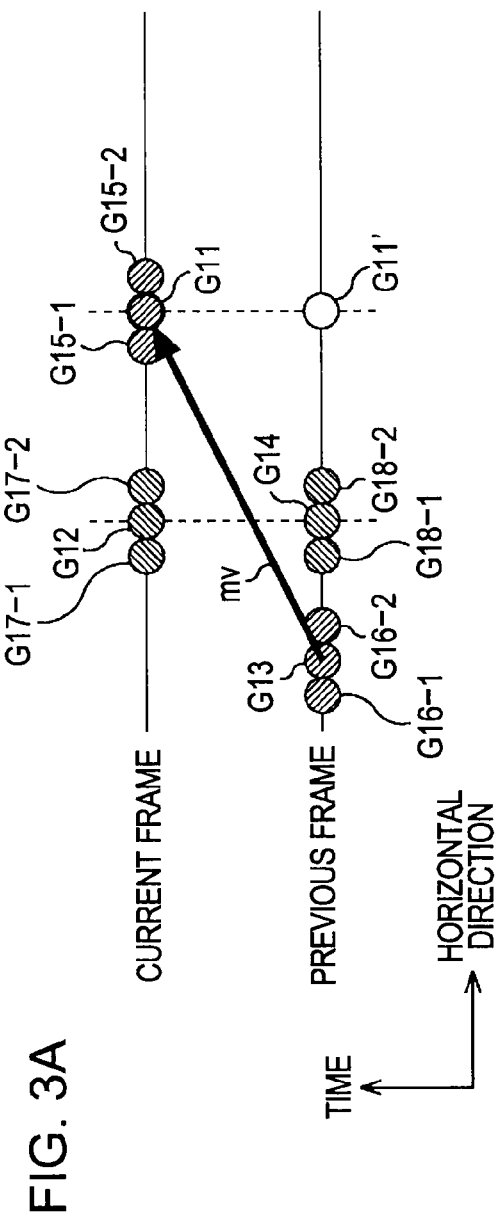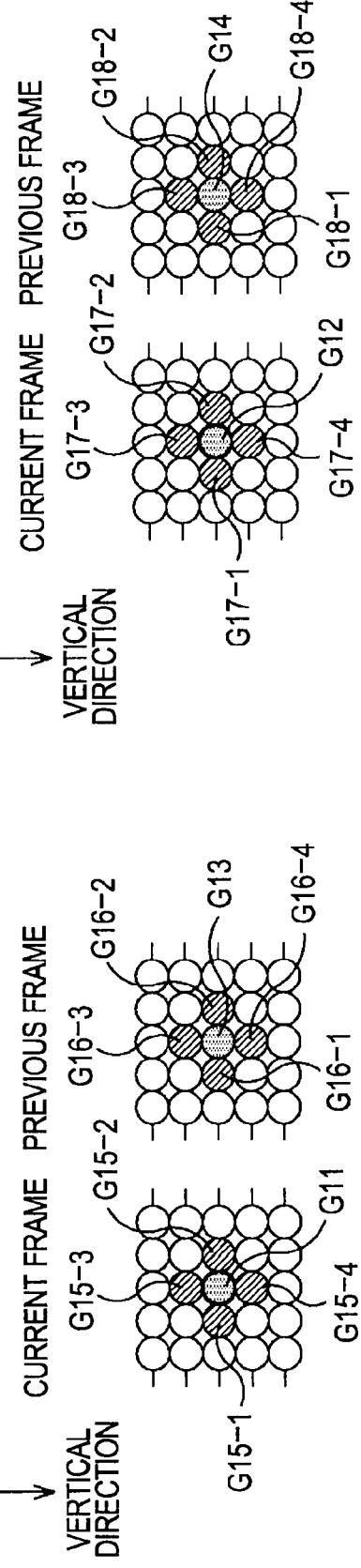
FIG. 3A
FIG. 3B
FIG. 3C

FIG. 12

$$\frac{A+B+C+D+E}{5}$$

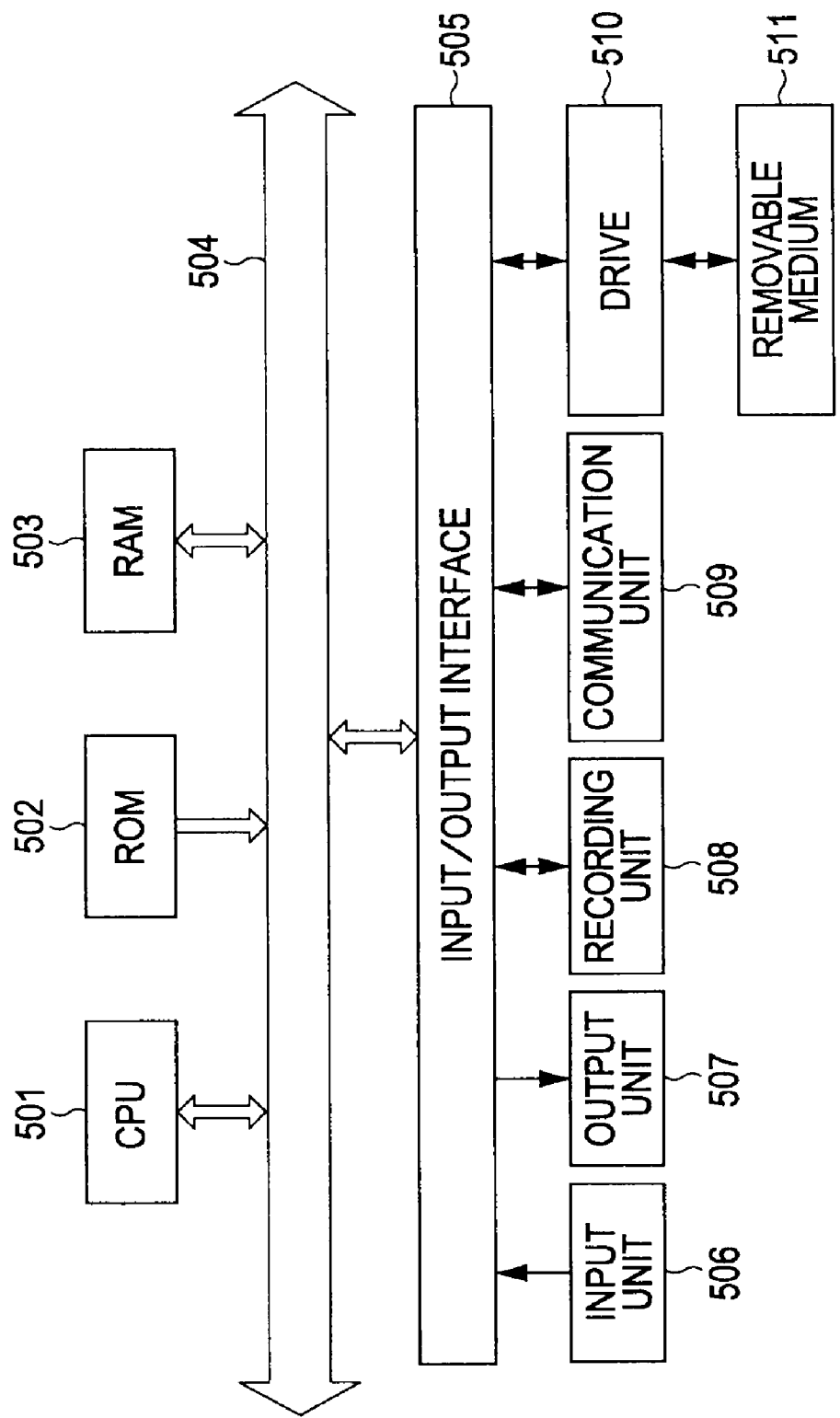

COEFFICIENT GENERATING DEVICE AND METHOD, IMAGE GENERATING DEVICE AND METHOD, AND PROGRAM THEREFOR

BACKGROUND OF THE INVENTION

1. Field of the Invention

The present invention relates to coefficient generating devices and methods, image generating devices and methods, and programs therefor, and more particularly, to a coefficient generating device and method, an image generating device and method, and a program therefor that can more easily improve the degraded image quality of an image.

2. Description of the Related Art

There is knowledge that, when a moving object displayed on a hold-type display device such as a liquid crystal display (LCD) is observed, so-called motion blur occurs, and it seems to the human eyes that the moving object is blurred. This motion blur occurs because the human eyes observe the moving object moving on the display screen while following the moving object.

Hitherto, techniques such as overdrive, black insertion, and frame double speed have been proposed as techniques for improving the degraded image quality or suppressing degradation of the image quality of images due to such motion blur.

For example, the technique called overdrive is designed to improve the response speed of a display device by adding a value obtained by multiplying the difference between an image of a frame to be displayed and an image of a frame displayed immediately before that frame by a predetermined coefficient to the image of the frame to be displayed.

Specifically, for example, when display switching is delayed due to insufficient response speed, it seems to the human eyes as if the ahead side of a boundary portion of a moving object and the opposite side of the boundary portion were displayed using luminance values different from the respective original luminance values. Therefore, overdrive improves the image quality of an image by adding the difference between images to an image of a frame to be displayed so that the luminance values in the boundary portion of the moving object can be corrected.

The technique called black insertion improves the image quality degraded by motion blur, by displaying a black image between frames. That is, instead of consecutively displaying images in frames, after an image in one frame is displayed, a period in which a black image is displayed, that is, a period in which nothing is displayed, is provided. After that period, an image in the next frame is displayed.

Furthermore, the technique called frame double speed improves the image quality degraded by motion blur, by substantially doubling the frame rate by displaying, in a display period of one frame, an image in that frame and an image generated by interpolation.

Furthermore, as a technique related to improvement of the image quality degraded by motion blur, a measuring system that generates an image that more accurately reproduces motion blur by correcting the tilt angle of, relative to a measurement target display that displays an image of a measurement target, a camera that captures an image to be displayed on the measurement target display (for example, see Japanese Unexamined Patent Application Publication 2006-243518).

SUMMARY OF THE INVENTION

With the foregoing techniques, it has been difficult to improve the degraded image quality of motion blurred images.

For example, overdrive is effective in suppressing the degradation of the image quality due to motion blur in the case where the response speed of a display device is higher than the frame rate of an image to be displayed. However, when the response speed is the same or lower than the frame rate, overdrive is not effective in suppressing the degradation of the image quality. More specifically, when the response speed is the same or lower than the frame rate, the boundary portion of a moving object in an image displayed on the display device, that is, the edge portion, is excessively emphasized, thereby degrading the image quality. In particular, the higher the moving speed of a moving object, the more striking the degradation of the image quality.

Also, when a period in which no image is displayed is provided by inserting black, the longer this period in which no image is displayed, the more the motion blur is removed. However, when the period in which no image is displayed becomes longer, the time in which the display device emits light in order to display an image becomes shorter. This makes a displayed image dark, which is thus difficult for an observer to see the image.

In the frame double speed technique, it is difficult to generate an image to be displayed by performing interpolation. The image quality of a generated image is not better than the image quality of images in other frames. As a result, the image quality of an image to be displayed may be degraded.

Furthermore, the frame double speed technique is effective for images having no motion blur at the time they were captured, such as moving captions or subtitles superimposed on the images. However, the frame double speed technique is not sufficiently effective for motion blurred images that were captured at a shutter speed at which the shutter is completely open, that is, motion blurred images captured at a shutter speed that is the same as a display time of one frame.

The present invention provides techniques for more easily improving the degraded image quality of an image.

According to a first embodiment of the present invention, there is provided a coefficient generating device that generates a conversion coefficient for converting an input image signal of an input image into a display image signal of a display image perceived by an observer as if the input image were displayed when the display image is displayed on predetermined display means, including the following elements: past-image generating means for generating a past image signal of a past image correlated with a teacher image of a frame that is one frame before a teacher image correlated with the display image, on the basis of a teacher image signal of the teacher image and a motion vector detected in the teacher image, the teacher image being used to obtain the conversion coefficient; transient-image generating means for generating, on the basis of the teacher image signal and the past image signal, in a case where the past image and then the teacher image are to be displayed on the display means, a transient image signal of a transient image to be displayed on the display means in a period in which displaying is switched from the past image to the teacher image; visual-image generating means for generating, using the past image signal, the transient image signal, the teacher image signal, and the motion vector, a visual image signal of a visual image perceived by the observer when the teacher image is displayed on the display means, the visual image serving as a student image correlated with the input image, the student image being used to obtain the conversion coefficient, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image; and calculating means for obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

The transient-image generating means may generate the transient image signal using a model indicating a light-emitting characteristic of the display means, the teacher image signal, and the past image signal.

The calculating means may include the following elements: class-tap extracting means for extracting, from a student image signal of the student image, pixel values of some pixels that are determined by the motion vector detected in the student image and that are spatially or temporally near the pixel in the student image that is at the same position as that of the pixel of interest as class taps used to classify the pixel of interest into one of a plurality of classes; class classification means for classifying the pixel of interest on the basis of a size of the motion vector detected in the student image and the class taps; prediction-tap extracting means for extracting, from the student image signal, pixel values of some pixels that are determined by the motion vector detected in the student image and that are spatially or temporally near the pixel in the student image that is at the same position as that of the pixel of interest as prediction taps used to predict the pixel of interest; and coefficient generating means for obtaining the conversion coefficient for each of the plurality of classes by solving a normal equation formulated for the class of the pixel of interest, relative to the pixel value of the pixel of interest and the prediction taps, the normal equation representing a relationship among the pixel value of the pixel of interest, the prediction taps, and the conversion coefficient.

According to the first embodiment of the present invention, there is provided a coefficient generating method or a program for a coefficient generating device that generates a conversion coefficient for converting an input image signal of an input image into a display image signal of a display image perceived by an observer as if the input image were displayed when the display image is displayed on predetermined display means. The coefficient generating method or program includes the steps of: generating a past image signal of a past image correlated with a teacher image of a frame that is one frame before a teacher image correlated with the display image, on the basis of a teacher image signal of the teacher image and a motion vector detected in the teacher image, the teacher image being used to obtain the conversion coefficient; generating, on the basis of the teacher image signal and the past image signal, in a case where the past image and then the teacher image are to be displayed on the display means, a transient image signal of a transient image to be displayed on the display means in a period in which displaying is switched from the past image to the teacher image; generating, using the past image signal, the transient image signal, the teacher image signal, and the motion vector, a visual image signal of a visual image perceived by the observer when the teacher image is displayed on the display means, the visual image serving as a student image correlated with the input image, the student image being used to obtain the conversion coefficient, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image; and obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

According to the first embodiment of the present invention, in a coefficient generating device that generates a conversion coefficient for converting an input image signal of an input image into a display image signal of a display image perceived by an observer as if the input image were displayed when the display image is displayed on predetermined display means, a past image signal of a past image correlated with a teacher image of a frame that is one frame before a teacher image correlated with the display image is generated on the basis of a teacher image signal of the teacher image and a motion vector detected in the teacher image, the teacher image being used to obtain the conversion coefficient; on the basis of the teacher image signal and the past image signal, in a case where the past image and then the teacher image are to be displayed on the display means, a transient image signal of a transient image to be displayed on the display means in a period in which displaying is switched from the past image to the teacher image is generated; using the past image signal, the transient image signal, the teacher image signal, and the motion vector, a visual image signal of a visual image perceived by the observer when the teacher image is displayed on the display means is generated, the visual image serving as a student image correlated with the input image, the student image being used to obtain the conversion coefficient, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image; and the conversion coefficient is obtained using a pixel value of a pixel of interest in the teacher image and pixel values of pixels that are determined by a motion vector detected in the student image and that are spatially or temporally near a pixel in the student image that is at the same position as that of the pixel of interest.

According to a second embodiment of the present invention, there is provided an image generating device that converts an input image signal of an input image into a display image signal of a display image perceived by an observer as if the input image were displayed when the display image is displayed on predetermined display means, including the following elements: prediction-tap extracting means for regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest; and predictive calculation means for predictively calculating a pixel value of the first pixel of interest by performing linear coupling on a conversion coefficient that is obtained in advance and the prediction taps. The conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest. The student image is a visual image perceived by the observer when the teacher image is displayed on the display means, the visual image being generated using a teacher image signal of the teacher image, a past image signal of a past image correlated with a teacher image of a frame that is one frame before the teacher image, the past image being generated on the basis of the teacher image signal and a motion vector detected in the teacher image, a transient image signal of a transient image to be displayed on the display means in a period in which displaying is switched from the past image to the teacher image in a case where the past image and then the teacher image are to be displayed on the display means, the transient image being generated on the basis of a model indicating a light-emitting characteristic of the display means, the teacher image signal, and the past image signal, and the motion vector detected in the teacher image, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image.

The image generating device may further include the following elements: class-tap extracting means for extracting, from the input image signal, pixel values of some pixels that are determined by the motion vector detected in the input image and that are spatially or temporally near the pixel in the input image that is at the same position as that of the first pixel of interest as class taps used to classify the first pixel of interest into one of a plurality of classes; and class classification means for classifying the first pixel of interest on the basis of a size of the motion vector detected in the input image and the class taps. The predictive calculation means may predictively calculate a pixel value of the first pixel of interest using the conversion coefficient obtained in advance for the class of the first pixel of interest.

According to the second embodiment of the present invention, there is provided an image generating method or a program for an image generating device that converts an input image signal of an input image into a display image signal of a display image perceived by an observer as if the input image were displayed when the display image is displayed on predetermined display means. The image generating method or program includes the steps of: regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest; and predictively calculating a pixel value of the first pixel of interest by performing linear coupling on a conversion coefficient that is obtained in advance and the prediction taps. The conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest. The student image is a visual image perceived by the observer when the teacher image is displayed on the display means, the visual image being generated using a teacher image signal of the teacher image, a past image signal of a past image correlated with a teacher image of a frame that is one frame before the teacher image, the past image being generated on the basis of the teacher image signal and a motion vector detected in the teacher image, a transient image signal of a transient image to be displayed on the display means in a period in which displaying is switched from the past image to the teacher image in a case where the past image and then the teacher image are to be displayed on the display means, the transient image being generated on the basis of a model indicating a light-emitting characteristic of the display means, the teacher image signal, and the past image signal, and the motion vector detected in the teacher image, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image.

According to the second embodiment of the present invention, in an image generating device that converts an input image signal of an input image into a display image signal of a display image perceived by an observer as if the input image were displayed when the display image is displayed on predetermined display means, a pixel of interest in the display image to be generated is regarded as a first pixel of interest, and, from the input image signal, pixel values of some pixels that are determined by a motion vector detected in the input image and that are spatially or temporally near a pixel in the input image that is at the same position as that of the first pixel of interest are extracted as prediction taps used to predict the first pixel of interest; and a pixel value of the first pixel of interest is predictively calculated by performing linear coupling on a conversion coefficient that is obtained in advance and the prediction taps.

According to a third embodiment of the present invention, there is provided a coefficient generating device that generates a conversion coefficient for converting an input image signal of an input image into a display image signal of a display image perceived by an observer as if the input image were displayed when the display image is displayed on predetermined display means, including the following elements: average-image generating means for generating an average image signal of an average image obtained by averaging a teacher image correlated with the display image and a teacher image of a frame that is one frame before the teacher image, on the basis of a teacher image signal of the teacher image, the teacher image being used to obtain the conversion coefficient; past-image generating means for generating a past image signal of a past image correlated with an average image of a frame that is one frame before the average image, on the basis of the average image signal and a motion vector detected in the average image; transient-image generating means for generating, on the basis of the average image signal and the past image signal, in a case where the past image and then the average image are to be displayed on the display means, a transient image signal of a transient image to be displayed on the display means in a period in which displaying is switched from the past image to the teacher image; visual-image generating means for generating, using the past image signal, the transient image signal, the average image signal, and the motion vector, a visual image signal of a visual image perceived by the observer when the average image is displayed on the display means, the visual image serving as a student image correlated with the input image, the student image being used to obtain the conversion coefficient, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image; and calculating means for obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

The transient-image generating means may generate the transient image signal using a model indicating a light-emitting characteristic of the display means, the average image signal, and the past image signal.

The calculating means may include the following elements: class-tap extracting means for extracting, from a student image signal of the student image, pixel values of some pixels that are determined by the motion vector detected in the student image and that are spatially or temporally near the pixel in the student image that is at the same position as that of the pixel of interest as class taps used to classify the pixel of interest into one of a plurality of classes; class classification means for classifying the pixel of interest on the basis of a size of the motion vector detected in the student image and the class taps; prediction-tap extracting means for extracting, from the student image signal, pixel values of some pixels that are determined by the motion vector detected in the student image and that are spatially or temporally near the pixel in the student image that is at the same position as that of the pixel of interest as prediction taps used to predict the pixel of interest; and coefficient generating means for obtaining the conversion coefficient for each of the plurality of classes by solving a normal equation formulated for the class of the pixel of interest, relative to the pixel value of the pixel of interest and the prediction taps, the normal equation representing a relationship among the pixel value of the pixel of interest, the prediction taps, and the conversion coefficient.

According to the third embodiment of the present invention, there is provided a coefficient generating method or a program for a coefficient generating device that generates a conversion coefficient for converting an input image signal of an input image into a display image signal of a display image perceived by an observer as if the input image were displayed when the display image is displayed on predetermined display means. The coefficient generating method or program includes the steps of: generating an average image signal of an average image obtained by averaging a teacher image correlated with the display image and a teacher image of a frame that is one frame before the teacher image, on the basis of a teacher image signal of the teacher image, the teacher image being used to obtain the conversion coefficient; generating a past image signal of a past image correlated with an average image of a frame that is one frame before the average image, on the basis of the average image signal of the average image and a motion vector detected in the average image; generating, on the basis of the average image signal and the past image signal, in a case where the past image and then the average image are to be displayed on the display means, a transient image signal of a transient image to be displayed on the display means in a period in which displaying is switched from the past image to the average image; generating, using the past image signal, the transient image signal, the average image signal, and the motion vector, a visual image signal of a visual image perceived by the observer when the average image is displayed on the display means, the visual image serving as a student image correlated with the input image, the student image being used to obtain the conversion coefficient, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image; and obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

According to the third embodiment of the present invention, in a coefficient generating device that generates a conversion coefficient for converting an input image signal of an input image into a display image signal of a display image perceived by an observer as if the input image were displayed when the display image is displayed on predetermined display means, an average image signal of an average image is generated, which is obtained by averaging a teacher image correlated with the display image and a teacher image of a frame that is one frame before the teacher image, on the basis of a teacher image signal of the teacher image, the teacher image being used to obtain the conversion coefficient; a past image signal of a past image correlated with an average image of a frame that is one frame before the average image is generated on the basis of the average image signal and a motion vector detected in the average image; on the basis of the average image signal and the past image signal, in a case where the past image and then the average image are to be displayed on the display means, a transient image signal of a transient image to be displayed on the display means in a period in which displaying is switched from the past image to the average image is generated; using the past image signal, the transient image signal, the average image signal, and the motion vector, a visual image signal of a visual image perceived by the observer when the average image is displayed on the display means is generated, the visual image serving as a student image correlated with the input image, the student image being used to obtain the conversion coefficient, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image; and the conversion coefficient is obtained using a pixel value of a pixel of interest in the teacher image and pixel values of pixels that are determined by a motion vector detected in the student image and that are spatially or temporally near a pixel in the student image that is at the same position as that of the pixel of interest.

According to a fourth embodiment of the present invention, there is provided an image generating device that converts an input image signal of an input image into a display image signal of a display image perceived by an observer as if the input image were displayed when the display image is displayed on predetermined display means, including the following elements: prediction-tap extracting means for regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest; and predictive calculation means for predictively calculating a pixel value of the first pixel of interest by performing linear coupling on a conversion coefficient that is obtained in advance and the prediction taps. The conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest. The student image is a visual image perceived by the observer when the average image is displayed on the display means, the visual image being generated using an average image signal of an average image obtained by averaging the teacher image and a teacher image of a frame that is one frame before the teacher image, the average image being generated on the basis of a teacher image signal of the teacher image, a past image signal of a past image correlated with an average image of a frame that is one frame before the average image, the past image being generated on the basis of the average image signal and a motion vector detected in the average image, a transient image signal of a transient image to be displayed on the display means in a period in which displaying is switched from the past image to the average image in a case where the past image and then the average image are to be displayed on the display means, the transient image being generated on the basis of a model indicating a light-emitting characteristic of the display means, the average image signal, and the past image signal, and the motion vector detected in the average image, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image.

The image generating device may further include the following elements: class-tap extracting means for extracting, from the input image signal, pixel values of some pixels that are determined by the motion vector detected in the input image and that are spatially or temporally near the pixel in the input image that is at the same position as that of the first pixel of interest as class taps used to classify the first pixel of interest into one of a plurality of classes; and class classification means for classifying the first pixel of interest on the basis of a size of the motion vector detected in the input image and the class taps. The predictive calculation means may predictively calculate the pixel value of the first pixel of interest using the conversion coefficient obtained in advance for the class of the first pixel of interest.

According to the fourth embodiment of the present invention, there is provided an image generating method or a program for an image generating device that converts an input image signal of an input image into a display image signal of a display image perceived by an observer as if the input image were displayed when the display image is displayed on predetermined display means. The image generating method or program includes the steps of: regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest; and predictively calculating a pixel value of the first pixel of interest by performing linear coupling on a conversion coefficient that is obtained in advance and the prediction taps. The conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest. The student image is a visual image perceived by the observer when the average image is displayed on the display means, the visual image being generated using an average image signal of an average image obtained by averaging the teacher image and a teacher image of a frame that is one frame before the teacher image, the average image being generated on the basis of a teacher image signal of the teacher image, a past image signal of a past image correlated with an average image of a frame that is one frame before the average image, the past image being generated on the basis of the average image signal and a motion vector detected in the average image, a transient image signal of a transient image to be displayed on the display means in a period in which displaying is switched from the past image to the average image in a case where the past image and then the average image are to be displayed on the display means, the transient image being generated on the basis of a model indicating a light-emitting characteristic of the display means, the average image signal, and the past image signal, and the motion vector detected in the average image, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image.

According to the fourth embodiment of the present invention, in an image generating device that converts an input image signal of an input image into a display image signal of a display image perceived by an observer as if the input image were displayed when the display image is displayed on predetermined display means, a pixel of interest in the display image to be generated is regarded as a first pixel of interest, and, from the input image signal, pixel values of some pixels that are determined by a motion vector detected in the input image and that are spatially or temporally near a pixel in the input image that is at the same position as that of the first pixel of interest are extracted as prediction taps used to predict the first pixel of interest; and a pixel value of the first pixel of interest is predictively calculated by performing linear coupling on a conversion coefficient that is obtained in advance and the prediction taps.

According to the first embodiment of the present invention, the degraded image quality of an image can be more easily improved.

According to the second embodiment of the present invention, the degraded image quality of an image can be more easily improved.

According to the third embodiment of the present invention, the degraded image quality of an image can be more easily improved.

According to the fourth embodiment of the present invention, the degraded image quality of an image can be more easily improved.

BRIEF DESCRIPTION OF THE DRAWINGS

FIGS. 3A to 3C are diagrams illustrating examples of class taps and prediction taps;

FIG. 12 is a diagram describing prediction taps;

FIG. 30 is a diagram illustrating a structure example of a computer.

DESCRIPTION OF THE PREFERRED EMBODIMENTS

Hereinafter, an embodiment of the present invention will be described with reference to the drawings.

Figure 1:
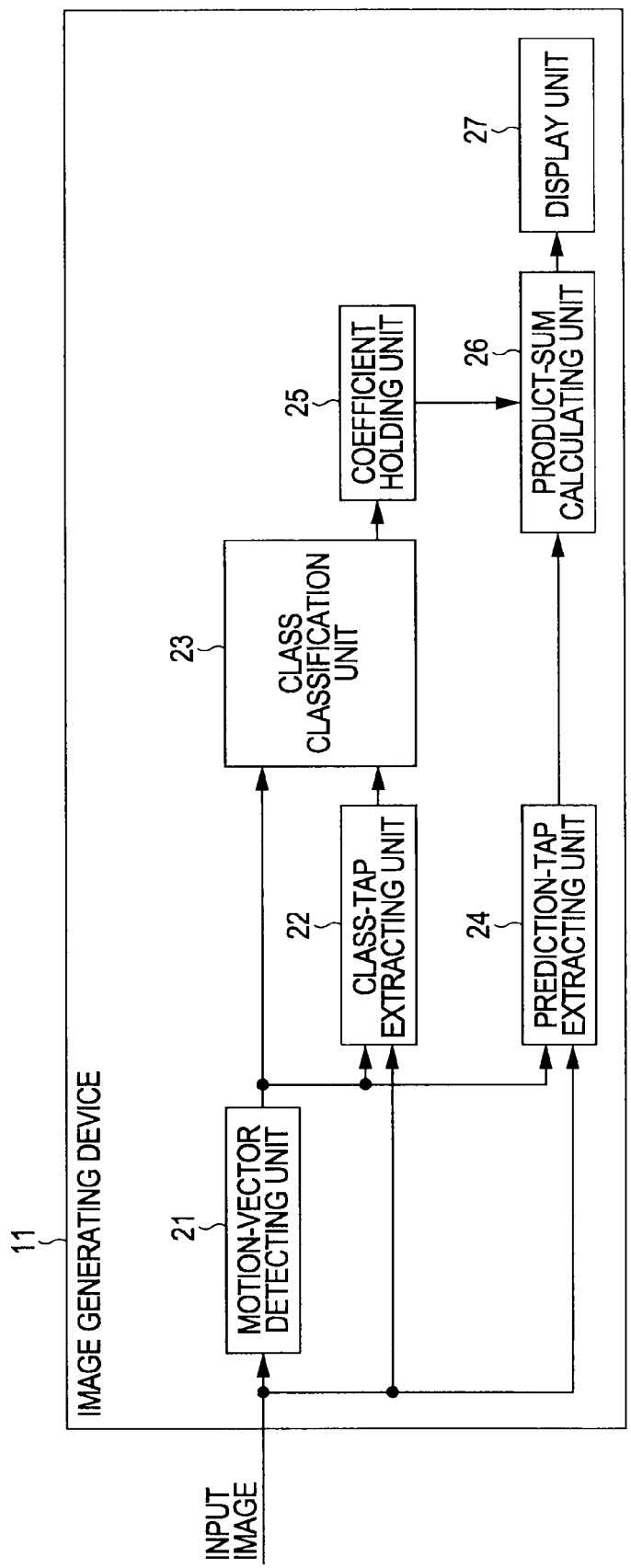
FIG. 1 is a diagram illustrating a structure example of an image generating device according to an embodiment of the present invention.

FIG. 1 is a block diagram illustrating a structure example of an image generating device according to an embodiment of the present invention.

An image generating device 11 performs a class classification adaptive process using an input image captured with a camera or the like, and, from the input image, generates and displays a display image that seems to be of higher quality to an observer. Here, an image that seems to be of higher quality is an image that has no motion blur and seems more vivid.

The image generating device 11 includes a motion-vector detecting unit 21, a class-tap extracting unit 22, a class classification unit 23, a prediction-tap extracting unit 24, a coefficient holding unit 25, a product-sum calculating unit 26, and a display unit 27. An input image signal of an input image input to the image generating device 11 is supplied to the motion-vector detecting unit 21, the class-tap extracting unit 22, and the prediction-tap extracting unit 24.

The motion-vector detecting unit 21 detects, on the basis of the supplied input image signal, a motion vector in the input image, and supplies the detected motion vector to the class classification unit 23, the class-tap extracting unit 22, and the prediction-tap extracting unit 24.

The class-tap extracting unit 22 sequentially regards one of pixels constituting a display image, one pixel at a time, as a pixel of interest, and, using the supplied input image signal and the motion vector from the motion-vector detecting unit 21, extracts some of the pixels constituting the input image as class taps for classifying the pixel of interest into one of classes. The class-tap extracting unit 22 supplies the class taps extracted from the input image to the class classification unit 23. A display image is an image to be obtained and does not exist at present. Thus, a display image is virtually assumed.

Using the motion vector from the motion-vector detecting unit 21 and the class taps from the class-tap extracting unit 22, the class classification unit 23 classifies the pixel of interest into a class and supplies a class code indicating this class to the coefficient holding unit 25.

Using the supplied input image signal and the motion vector from the motion-vector detecting unit 21, the prediction-tap extracting unit 24 extracts some of the pixels constituting the input image as prediction taps used for predicting the pixel value of the pixel of interest, and supplies the extracted prediction taps to the product-sum calculating unit 26.

The coefficient holding unit 25 is holding a conversion coefficient used for predicting the pixel value of a pixel of interest, which has been obtained in advance for each class. The coefficient holding unit 25 supplies a conversion coefficient specified by the class code supplied from the class classification unit 23 to the product-sum calculating unit 26. For example, the coefficient holding unit 25 includes a memory for recording conversion coefficients. A conversion coefficient is read from a region in the memory at an address specified by the class code, and the read conversion coefficient is supplied to the product-sum calculating unit 26.

The product-sum calculating unit 26 predictively calculates the pixel value of the pixel of interest by performing linear coupling by multiplying the prediction taps supplied from the prediction-tap extracting unit 24, that is, the pixel values of pixels constituting the prediction taps, by the conversion coefficient from the coefficient holding unit 25. The product-sum calculating unit 26 supplies, to the display unit 27, a display image signal of a display image that is obtained by regarding the individual pixels of the display image as pixels of interest and predictively calculating the pixel values of the individual pixels of interest.

The display unit 27 is implemented by a hold-type display device such as an LCD display or an LCD projector and displays the display image based on the display image signal supplied from the product-sum calculating unit 26.

When the input image is a moving image, the input image signal of the input image is supplied, one frame at a time, to the image generating device 11. When the input image signal of one frame is supplied to the image generating device 11, the image generating device 11 starts a display process that is a process of generating, on the basis of the supplied input image signal of the frame, a display image signal of a frame correlated with that frame, and displaying the display image.

Hereinafter, with reference to the flowchart illustrated in FIG. 2, the display process performed by the image generating device 11 will be described.

In step S11, the motion-vector detecting unit 21 detects, using an input image (input image signal) of an input frame and an input image of a frame immediately before that frame, a motion vector of a pixel in the input image of the input frame, which is at the same position as a pixel of interest in a display image.

A frame to be processed, that is, a newly input frame, will be called a current frame, and a frame that is temporally one frame before the current frame will be called a previous frame. The motion-vector detecting unit 21 is holding an input image signal of a previous frame that was supplied last time. For example, the motion-vector detecting unit 21 detects, using the input image signal of the current frame and the input image signal of the previous frame, a motion vector of the pixel in the input image of the current frame, which is at the same position as that of the pixel of interest, by performing, for example, block matching or a gradient method. The motion-vector detecting unit 21 supplies the detected motion vector to the class classification unit 23, the class-tap extracting unit 22, and the prediction-tap extracting unit 24.

In step S12, on the basis of the motion vector supplied from the motion-vector detecting unit 21, the class classification unit 23 generates a motion code determined by the size (absolute value) of the motion vector. The motion code is binary data (bit value) and is used to classify the pixel of interest. For example, it is assumed that, as the range of the size of the motion vector, the range from 0 (inclusive) to 8 (exclusive), the range from 8 (inclusive) to 16 (exclusive), the range from 16 (inclusive) to 24 (exclusive), and the range above 24 (inclusive), and motion codes "00", "01", "10", and "11" correlated with the respective ranges are defined in advance. In this case, when the size of the detected motion vector is "4", this size of the motion vector is included in the range from 0 (inclusive) to 8 (exclusive). Thus, the value "00" correlated with that range serves as the motion code.

The greater the number of the ranges of the size of the motion vector, that is, the greater the number of divisions of the size of the motion vector, the greater the number of classes into which the individual pixels of interest are classified. In particular, in a moving image, the greater the amount of movement of a moving object, the greater the amount of motion blur that occurs in the moving image. Therefore, the effect of motion blur removal can be enhanced by dividing the range of the size of the motion vector in a more detailed manner.

In step S13, the class-tap extracting unit 22 extracts, on the basis of the motion vector from the motion-vector detecting unit 21 and the supplied input image signal, class taps from the input image, and supplies the class taps to the class classification unit 23. That is, the class-tap extracting unit 22 is holding the input image signal of the previous frame, which was supplied last time. Using the input image signal of the previous frame and the input image signal of the current frame, the class-tap extracting unit 22 extracts class taps from the input image.

For example, some pixels positioned temporally or spatially near a pixel in the input image signal of the current frame, which is at the same position as that of the pixel of interest, that is, more specifically, pixel values of these pixels, are extracted as class taps.

In step S14, the class classification unit 23 applies an adaptive dynamic range control (ADRC) process to the class taps supplied from the class-tap extracting unit 22. The ADRC process is a process of converting a feature amount of the luminance waveform of an input image into binary data (bit value). For example, the class classification unit 23 applies a 1-bit ADRC process to the class taps.

That is, the class classification unit 23 detects a maximum value MAX and a minimum value MIN of the pixel values of pixels constituting the class taps, and regards the difference DR between the detected maximum value MAX and the detected minimum value MIN of the pixel values (DR=MAX−MIN) as a local dynamic range of a set of the pixels constituting the class taps. On the basis of the dynamic range DR, the class classification unit 23 requantizes (the pixel values of) the pixels constituting the class taps as one bit. That is, the class classification unit 23 subtracts the minimum value MIN from the pixel value of each of the pixels constituting the class taps, and divides (quantizes) the obtained difference by DR/2.

The class classification unit 23 regards a bit string of a predetermined sequence of the pixel values of the 1-bit pixels constituting the class taps obtained as above as an ADRC code. The ADRC code is used to classify the pixel of interest and indicates a feature of the waveform of luminance in the vicinity of the pixel in the input image, which is at the same position as that of the pixel of interest.

In step S15, the class classification unit 23 classifies the pixel of interest on the basis of the generated motion code and the ADRC code, and determines the class of the pixel of interest. That is, the class classification unit 23 regards a bit value obtained by adding the motion code to the ADRC code as a class code that indicates the class of the pixel of interest, and supplies the class code to the coefficient holding unit 25.

In this manner, the class classification unit 23 classifies the pixel of interest in accordance with a distribution of luminance waveforms in the input image, that is, luminance levels in the input image, and the size of the motion vector.

When the class code is supplied from the class classification unit 23 to the coefficient holding unit 25, the coefficient holding unit 25 reads, among the recorded conversion coefficients, a conversion coefficient specified by the supplied class code, and supplies the conversion coefficient to the product-sum calculating unit 26. The conversion coefficient is a coefficient for converting an input image into a display image having no motion blur. The conversion coefficient is obtained in advance and recorded in the coefficient holding unit 25.

For example, when an input image which is a moving image is displayed as it is on the hold-type display unit 27, a moving object in the input image seems blurred to the eyes of an on observer who observes the displayed input image. Therefore, in the image generating device 11, a conversion coefficient with which a display image that causes the observer to perceive the moving object as being displayed without any blur, when displayed on the display unit 27, can be generated is prepared in advance and is recorded in the coefficient holding unit 25.

In the image generating device 11, this conversion coefficient is used, and an input image is converted into a high-quality display image having no motion blur. The display image is, when displayed on the display unit 27, an image predicted to cause an observer who is looking at the display image to perceive as if the input image were displayed on the display unit 27. That is, when the display image is displayed on the display unit 27, it seems to the observer as if the input image having no motion blur were displayed In step S16, the prediction-tap extracting unit 24 extracts, on the basis of the motion vector from the motion-vector detecting unit 21 and the supplied input image signal, prediction taps from the input image, and supplies the prediction taps to the product-sum calculating unit 26. That is, the prediction-tap extracting unit 24 is holding the input image signal of the previous frame, which was supplied last time. Using the input image signal of the previous frame and the input image signal of the current frame, the prediction-tap extracting unit 24 extracts prediction taps from the input image. For example, some pixels positioned temporally or spatially near a pixel in the input image signal of the current frame, which is at the same position as that of the pixel of interest, that is, more specifically, pixel values of these pixels, are extracted as prediction taps.

Here, the class taps and the prediction taps extracted from the input image are, for example, as illustrated in FIG. 3A, pixels that are spatially or temporally near a pixel in the input image, which is at the same position as that of the pixel of interest. In FIG. 3A, the vertical direction indicates time, and the horizontal direction indicates the position of each pixel in the input image of each frame. One circle indicates one pixel in the input image. Hereinafter, the horizontal direction of the input image in the drawings will be called a horizontal direction, and a direction perpendicular to the horizontal direction of the input image will be called a vertical direction.

Referring to FIG. 3A, the input image of the current frame including a horizontal array of pixels is illustrated in the upper portion of the drawing, and the input image of the previous frame including a horizontal array of pixels is illustrated in the lower portion of the drawing.

It is assumed that, among the pixels of the input image of the current frame, a pixel G11 is a pixel at the same position as that of the pixel of interest in the display image, and a motion vector mv having a size MV is detected as a motion vector of the pixel G11. In this case, a total of four pixels, namely, the pixel G11 in the input image of the current frame, a pixel G12, which is determined by the motion vector mv, in the input image of the current frame, and pixels G13 and G14, which are determined by the motion vector mv, in the input image of the previous frame, serve as class taps.

Here, the pixel G12 is a pixel in the input image of the current frame, which is at a position displaced from the pixel G11 serving as a reference by a size at a predetermined rate of the motion vector mv, such as a distance of ¾MV, in a direction opposite to the motion vector mv.

The pixel G13 is a pixel in the input image of the previous frame, which is at a position displaced from a pixel G11' that is at the same position as that of the pixel G11 in the current frame by a distance MV in a direction opposite to the motion vector mv. That is, the pixel G13 is a pixel at which a moving object displayed at the pixel G11 in the input image of the current frame is displayed in the input image of the previous frame. Therefore, in the input image of the previous frame, the moving object displayed at the pixel G13 moves by the same distance as the size MV of the motion vector mv in a direction indicated by the motion vector mv, and, in the input image of the current frame, is displayed at the pixel G11.

Furthermore, the pixel G14 is a pixel in the input image of the previous frame, which is at a position displaced from the pixel G11', which is at the same position as that of the pixel G11, by a size at a predetermined rate of the motion vector mv, such as a distance of ¾MV, in a direction opposite to the motion vector mv.

In this manner, the class-tap extracting unit 22 extracts the pixel G11 in the input image of the current frame, which is at the same position as that of the pixel of interest, the pixel G12 which is spatially near the pixel G11, and the pixels G13 and G14 in the input image of the previous frame, which are temporally near the pixel G11, as class taps.

The prediction-tap extracting unit 24 extracts, as illustrated in FIGS. 3A to 3C, the pixels G11 to G14, which are the same pixels as the class taps, and additionally extracts pixels adjacent to these pixels as prediction taps. Referring to FIGS. 3B and 3C, the horizontal direction indicates the horizontal direction of the input image, and the vertical direction indicates the vertical direction of the input image.

That is, as illustrated in the left portion of FIG. 3B, pixels G15-1 to G15-4 that are adjacent to (on the left of, on the right of, above, and below) the pixel G11 in the input image of the current frame serve as prediction taps. As illustrated in the right portion of FIG. 3B, pixels G16-1 to G16-4 that are adjacent to (on the left of, on the right of, above, and below) the pixel G13 in the input image of the previous frame serve as prediction taps.

As illustrated in the left portion of FIG. 3C, pixels G17-1 to G17-4 that are adjacent to (on the left of, on the right of, above, and below) the pixel G12 in the input image of the current frame serve as prediction taps. As illustrated in the right portion of FIG. 3C, pixels G18-1 to G18-4 that are adjacent to (on the left of, on the right of, above, and below) the pixel G14 in the input image of the previous frame serve as prediction taps.

In this manner, the prediction-tap extracting unit 24 extracts a total of twenty pixels, namely, the pixels G11 to G18-4, which are spatially or temporally near the pixel in the input image, which is at the same position as that of the pixel of interest, as prediction taps.

Figure 2:
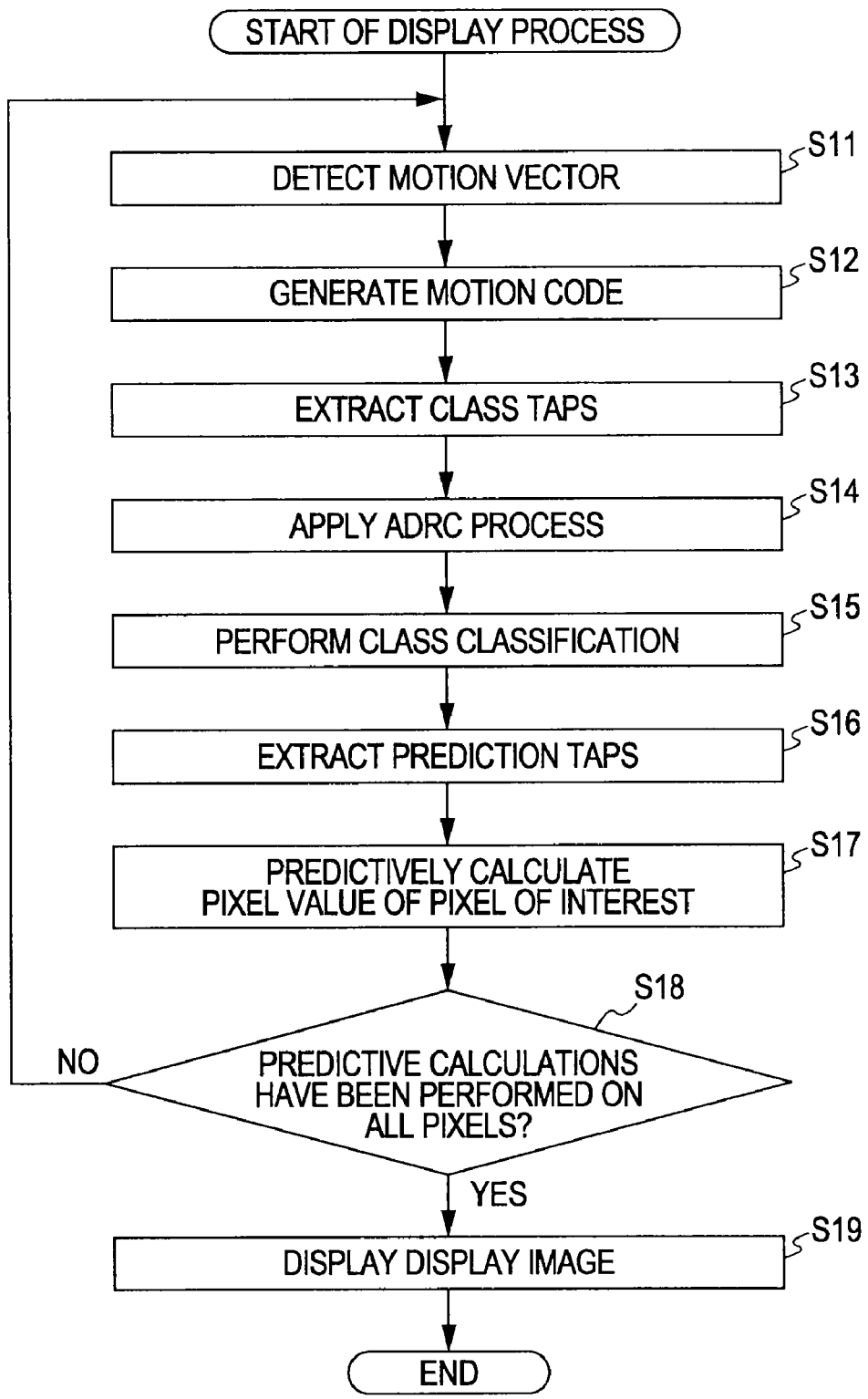
FIG. 2 is a flowchart describing a display process.

Referring back to the flowchart illustrated in FIG. 2, in step S17, the product-sum calculating unit 26 predictively calculates the pixel value of the pixel of interest by performing linear coupling by multiplying the pixel values of the pixels constituting the prediction taps from the prediction-tap extracting unit 24 by the conversion coefficient from the coefficient holding unit 25.

In step S18, the image generating device 11 determines whether or not predictive calculations have been performed on all the pixels of the display image. That is, when all the pixels of the display image have been individually selected as pixels of interest and the pixel values of these pixels have been obtained, it is determined that predictive calculations have been performed on all the pixels.

When it is determined in step S18 that predictive calculations have not been performed on all the pixels yet, the flow returns to step S11, and the above-described flow is repeated. That is, a pixel in the display image that has not been selected as a pixel of interest yet is selected as a new pixel of interest, and the pixel value of that pixel of interest is obtained.

In contrast, when it is determined in step S18 that predictive calculations have been performed on all the pixels, the product-sum calculating unit 26 generates, from the obtained pixel values of the pixels of the display image, a display image signal of the display image, and supplies the display image signal to the display unit 27. The flow proceeds to step S19.

In step S19, the display unit 27 displays the display image on the basis of the display image signal supplied from the product-sum calculating unit 26. The display process is completed. Accordingly, the display image of one frame is displayed on the display unit 27. Thereafter, the display process is repeatedly performed, and the display image of each frame is sequentially displayed.

In this manner, the image generating device 11 extracts class taps from an input image in accordance with a motion vector of the input image, and classifies each pixel of interest on the basis of the class taps and the motion vector. Using a conversion coefficient determined by the result of class classification and prediction taps extracted from the input image in accordance with the motion vector, the image generating device 11 predictively calculates the pixel value of the pixel of interest, thereby obtaining a display image.

In this manner, by generating a display image using prediction taps extracted from an input image in accordance with a motion vector and a class-based conversion coefficient determined using the motion vector, an image that does not cause an observer to perceive motion blur can be generated and displayed using a simple process. That is, the degraded image quality of an image can be more easily improved.

Next, a predictive calculation performed by the product-sum calculating unit 26 illustrated in FIG. 1 and learning of a conversion coefficient recorded in the coefficient holding unit 25 will be described.

For example, as a class classification adaptive process, the following is performed. That is, prediction taps are extracted from an input image signal, and, using the prediction taps and a conversion coefficient, the pixel values of pixels (hereinafter called high-image-quality pixels as necessary) of a display image are obtained (predicted) by performing predictive calculations.

When, for example, a linear primary predictive calculation is employed as a predetermined predictive calculation, a pixel value y of a high-image-quality pixel is obtained using a linear primary equation indicated in equation (1):

$$y = \sum_{i=1}^{N} w_i x_i \quad (1)$$

where $x_i$ denotes a pixel value of an i-th pixel (hereinafter called a low-image-quality pixel as necessary) of an input image signal, which constitutes a prediction tap for the pixel value y of the high-image-quality pixel, and $w_i$ denotes an i-th conversion coefficient to be multiplied by (the pixel value of) the i-th low-image-quality pixel. In equation (1), it is assumed that prediction taps are constituted by N low-image-quality pixels $x_1, x_2, \ldots, x_N$.

Alternatively, the pixel value y of the high-image-quality pixel may be obtained using, instead of the linear primary equation indicated in equation (1), a quadratic or higher-order linear function. Alternatively, the pixel value y of the high-image-quality pixel may be obtained not using a linear function, but using a non-linear function.

Now, when the true value of the pixel value of a j-th sample high-image-quality pixel is denoted by $y_j$, and a predicted value of the true value $y_j$ obtained using equation (1) is denoted by $y_j'$, a prediction error $e_j$ thereof is expressed by equation (2):

$$e_j = (y_j - y_j') \quad (2)$$

Now, since the predicted value $y_j'$ in equation (2) is obtained in accordance with equation (1), $y_j'$ in equation (2) is replaced in accordance with equation (1), thereby obtaining equation (3):

$$e_j = \left( y_j - \left( \sum_{i=1}^{N} w_i x_{j,i} \right) \right) \quad (3)$$

where $x_{j,i}$ denotes the i-th low-image-quality pixel constituting a prediction tap for the j-th sample high-image-quality pixel.

The conversion coefficient $w_i$ whose prediction error $e_j$ in equation (3) (or (2)) is zero is optimal for predicting the high-image-quality pixel. However, it is generally difficult to obtain such a conversion coefficient $w_i$ for every high-image-quality pixel.

Therefore, when, for example, the least squares method is employed as a standard representing that the conversion coefficient $w_i$ is optimal, the optimal conversion coefficient $w_i$ can be obtained by minimizing the sum E of square errors expressed by equation (4):

$$E = \sum_{j=1}^{J} \left( y_j - \sum_{i=1}^{N} w_i x_{j,i} \right)^2 \quad (4)$$

where J denotes the number of samples of a set of a high-image-quality pixel $y_j$ and low-image-quality pixels $x_{j,1}, x_{j,2}, \ldots, x_{j,N}$ constituting prediction taps for the high-image-quality pixel $y_j$ (the number of samples for learning).

The minimum value of the sum E of the square errors in equation (4) is given by the conversion coefficient $w_i$ that obtains zero when the sum E is partially differentiated by the conversion coefficient $w_i$, as indicated in equation (5)

$$\frac{\partial E}{\partial w_i} = 2e_1 \frac{\partial e_1}{\partial w_i} + 2e_2 \frac{\partial e_2}{\partial w_i} + \ldots + 2e_J \frac{\partial e_J}{\partial w_i} = 0 \quad (5)$$
$$(i = 1, 2, \ldots, N)$$

In contrast, when equation (3) is partially differentiated by the conversion coefficient $w_i$, the next equation (6) is obtained:

$$\frac{\partial e_j}{\partial w_1} = -x_{j,1}, \ \frac{\partial e_j}{\partial w_2} = -x_{j,2}, \ \ldots, \ \frac{\partial e_j}{\partial w_N} = -x_{j,N}, \quad (6)$$
$$(j = 1, 2, \ldots, J)$$

From equations (5) and (6), the next equation (7) is obtained:

$$\sum_{j=1}^{J} e_j x_{j,1} = 0, \ \sum_{j=1}^{J} e_j x_{j,2} = 0, \ \ldots \ \sum_{j=1}^{J} e_j x_{j,N} = 0 \quad (7)$$

By substituting equation (3) for $e_j$ in equation (7), equation (7) can be expressed using a normal equation indicated in equation (8):

$$\begin{bmatrix} \left(\sum_{j=1}^{J} x_{j,1} x_{j,1}\right) & \left(\sum_{j=1}^{J} x_{j,1} x_{j,2}\right) & \cdots & \left(\sum_{j=1}^{J} x_{j,1} x_{j,N}\right) \\ \left(\sum_{j=1}^{J} x_{j,2} x_{j,1}\right) & \left(\sum_{j=1}^{J} x_{j,2} x_{j,2}\right) & \cdots & \left(\sum_{j=1}^{J} x_{j,2} x_{j,N}\right) \\ \vdots & \vdots & \ddots & \vdots \\ \left(\sum_{j=1}^{J} x_{j,N} x_{j,1}\right) & \left(\sum_{j=1}^{J} x_{j,N} x_{j,2}\right) & \cdots & \left(\sum_{j=1}^{J} x_{j,N} x_{j,N}\right) \end{bmatrix} \begin{bmatrix} w_1 \\ w_2 \\ \vdots \\ w_N \end{bmatrix} = \begin{bmatrix} \left(\sum_{j=1}^{J} x_{j,1} y_j\right) \\ \left(\sum_{j=1}^{J} x_{j,2} y_j\right) \\ \vdots \\ \left(\sum_{j=1}^{J} x_{j,N} y_j\right) \end{bmatrix} \quad (8)$$

The normal equation indicated in equation (8) can be solved for the conversion coefficient $w_i$ by using, for example, a sweeping out method (Gauss-Jordan elimination).

By formulating and solving the normal equation indicated in equation (8) on a class-by-class basis, the optimal conversion coefficient $w_i$ (the conversion coefficient $w_i$ that minimizes the sum E of square errors) can be obtained for each class. That is, the conversion coefficient $w_i$ which can estimate a luminance level (pixel value) of a pixel of interest, which is statistically closest to the true value, can be obtained for each class of pixels of interest.

The product-sum calculating unit 26 illustrated in FIG. 1 can obtain a display image signal from an input image signal by calculating equation (1) using the above-described conversion coefficient $w_i$ for each class.

Figure 4:
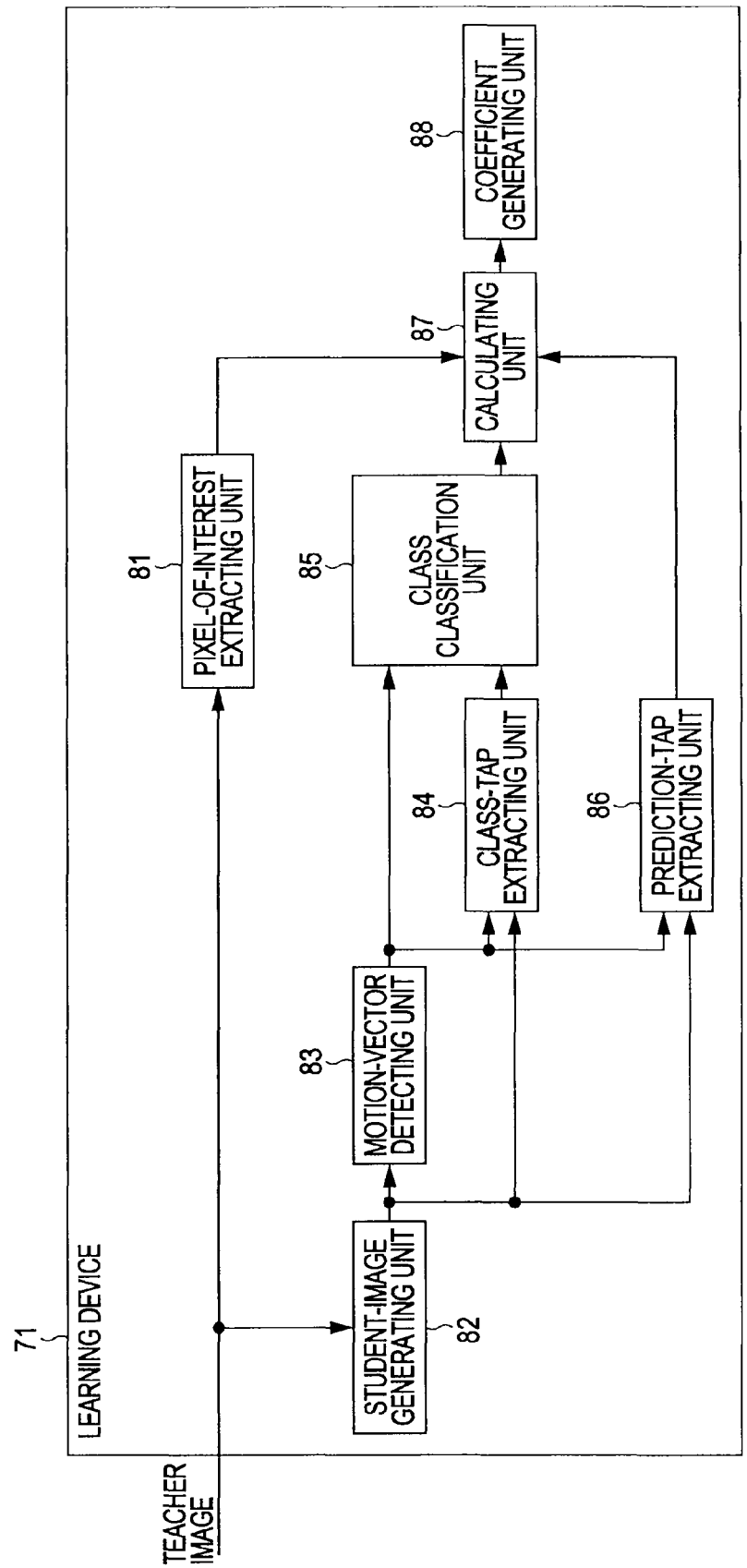
FIG. 4 is a diagram illustrating a structure example of a learning device according to an embodiment of the present invention.

Next, FIG. 4 illustrates a structure example of a learning device that performs learning to obtain the conversion coefficient $w_i$ by formulating and solving the normal equation indicated in equation (8) on a class-by-class basis.

A learning device 71 includes a pixel-of-interest extracting unit 81, a student-image generating unit 82, a motion-vector detecting unit 83, a class-tap extracting unit 84, a class classification unit 85, a prediction-tap extracting unit 86, a calculating unit 87, and a coefficient generating unit 88.

An input image signal serving as a teacher image signal of a teacher image used for obtaining a conversion coefficient is supplied to the pixel-of-interest extracting unit 81 and the student-image generating unit 82 of the learning device 71. Here, the teacher image refers to, among images used in a learning process, an image constituted by image samples to be obtained at last using a conversion coefficient, that is, an image constituted by high-image-quality pixels $y_j$. In a learning process, an image constituted by image samples used for obtaining a teacher image, that is, an image constituted by low-image-quality pixels, will be called a student image. Therefore, a teacher image corresponds to a display image in the image generating device 11, and a student image corresponds to an input image in the image generating device 11.

The pixel-of-interest extracting unit 81 sequentially regards one of pixels of a teacher image based on the supplied teacher image signal, one pixel at a time, as a pixel of interest to which attention is paid, extracts the pixel of interest from the teacher image signal, that is, more specifically, extracts the pixel value of the pixel of interest, and supplies the pixel of interest (or the pixel value thereof) to the calculating unit 87.

Using the supplied teacher image signal, the student-image generating unit 82 generates a student image signal of a student image that is used for obtaining a conversion coefficient and that is an image of lower quality than the teacher image based on the teacher image signal, and supplies the student image signal to the motion-vector detecting unit 83, the class-tap extracting unit 84, and the prediction-tap extracting unit 86.

For example, a visual image that is an input image with motion blur is generated as a student image. A visual image refers to, in the case where an input image of the previous frame is displayed and then an input image of the current frame is displayed, an image seen by the eyes of an observer who observes the display unit 27 in a period from when the input image of the previous frame is displayed to when the input image of the current frame is displayed. That is, when the input image is displayed as it is on the display unit 27, depending on the characteristics of the display unit 27, an image predicted to be perceived by the observer who observes the input image is a visual image.

On the basis of the student image signal from the student-image generating unit 82, the motion-vector detecting unit 83 detects a motion vector in the student image, and supplies the motion vector to the class classification unit 85, the class-tap extracting unit 84, and the prediction-tap extracting unit 86.

Using the motion vector from the motion-vector detecting unit 83, in correlation with the pixel of interest in the teacher image, the class-tap extracting unit 84 extracts, from the student image signal from the student-image generating unit 82, some of the pixels of the student image as class taps. The class-tap extracting unit 84 supplies the extracted class taps to the class classification unit 85.

Using the motion vector from the motion-vector detecting unit 83 and the class taps from the class-tap extracting unit 84, the class classification unit 85 classifies the pixel of interest into a class and supplies a class code indicating this class to the calculating unit 87.

Using the motion vector from the motion-vector detecting unit 83, in correlation with the pixel of interest in the teacher image, the prediction-tap extracting unit 86 extracts, from the student image signal from the student-image generating unit 82, some of the pixels of the student image as prediction taps. The prediction-tap extracting unit 86 supplies the extracted prediction taps to the calculating unit 87.

Correlating the pixel of interest supplied from the pixel-of-interest extracting unit 81 with the prediction taps supplied from the prediction-tap extracting unit 86, the calculating unit 87 performs an addition on the pixel of interest and pixels constituting the prediction taps in accordance with the class code from the class classification unit 85.

That is, a pixel value $y_j$ of the pixel of interest in the teacher image data, (a pixel value of a pixel in the student image data constituting) a prediction tap $x_{j,i}$, and the class code indicating the class of the pixel of interest are supplied to the calculating unit 87.

For each class correlated with the class code, using the prediction tap (student image signal) $x_{j,i}$, the calculating unit 87 performs a calculation corresponding to multiplications $(x_{j,i}x_{j,i})$ of student image signals in a matrix on the left side of equation (8) and summation of the products obtained by the multiplications.

Furthermore, for each class correlated with the class code, using the prediction tap (student image signal) $x_{j,i}$ and the teacher image signal $y_j$, the calculating unit 87 performs a calculation corresponding to multiplications $(x_{j,i}y_j)$ of the student image signal $x_{j,i}$ and the teacher image signal $y_j$ in a vector on the right side of equation (8) and summation of the products obtained by the multiplications.

That is, the calculating unit 87 stores a component $(\Sigma x_{j,i}x_{j,i})$ of the matrix on the left side of equation (8) and a component $(\Sigma x_{j,i}y_j)$ of the vector on the right side of equation (8), which are obtained for a teacher image signal that served as a previous pixel of interest. For a teacher image signal serving as a new pixel of interest, the calculating unit 87 adds, to the component $(\Sigma x_{j,i}x_{j,i})$ of the matrix or the component $(\Sigma x_{j,i}y_j)$ of the vector, a correlated component $x_{j+1,i}x_{j+1,i}$ or $x_{j+1,i}y_{j+1}$ calculated using the teacher image signal $y_{j+1}$ and the student image signal $x_{j+1,i}$ (that is, performs summation represented by $\Sigma$ in equation (8)).

The calculating unit 87 regards all the pixels of the teacher image signal as pixels of interest and performs the above-described additions, thereby formulating (generating) the normal equation indicated in equation (8) for each class, which is then supplied to the coefficient generating unit 88.

The coefficient generating unit 88 obtains the optimal conversion coefficient $w_i$ for each class by solving (the matrix coefficients of) the normal equation for each class, which has been obtained by additions performed by the calculating unit 87, and records the obtained optimal conversion coefficient $w_i$.

Figure 5:
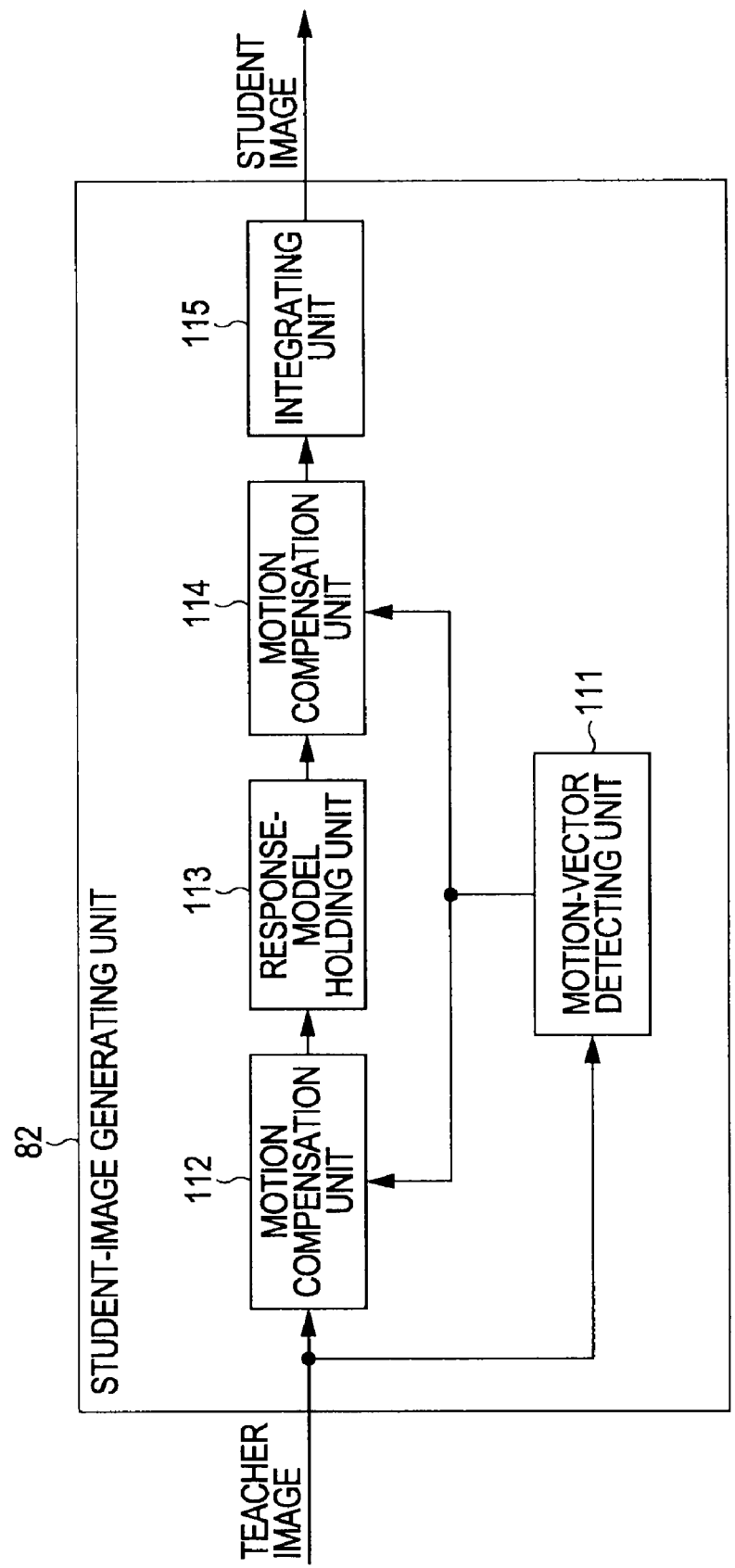
FIG. 5 is a diagram illustrating a structure example of a student-image generating unit.

Next, FIG. 5 is a block diagram illustrating a more detailed exemplary structure of the student-image generating unit 82 illustrated in FIG. 4.

The student-image generating unit 82 includes a motion-vector detecting unit 111, a motion compensation unit 112, a response-model holding unit 113, a motion compensation unit 114, and an integrating unit 115.

The motion-vector detecting unit ill detects a motion vector in a supplied teacher image and supplies the detected motion vector to the motion compensation unit 112 and the motion compensation unit 114.

The motion compensation unit 112 performs motion compensation using the supplied teacher image and the motion vector supplied from the motion-vector detecting unit 111, and generates a past image that is an image corresponding to (correlated with) an input image of a previous frame that is one image temporally prior to an input image serving as the supplied teacher image. The motion compensation unit 112 supplies the teacher image and the generated past image to the response-model holding unit 113.

Here, the past image is an image equivalent to an input image that is generated by moving a moving object, which is moving in the input image serving as the supplied teacher image, in a direction opposite to a direction indicated by a motion vector of the moving object, and that is one frame prior to the supplied input image.

The response-model holding unit 113 is holding in advance a model indicating a light-emitting characteristic of the display unit 27 of the image generating device 11, such as a response model representing a temporal change in luminance value when the luminance value of each of pixels constituting a display screen of the display unit 27 is changed from a certain luminance value to a different luminance value. When the display unit 27 is implemented by, for example, an LCD, the response model of the display unit 27 is a response model of an LCD. After a black image in which the luminance value of each pixel is the lowest is displayed on the display unit 27, a white image in which the luminance value of each pixel is the highest is displayed. On this occasion, a temporal change in luminance value of each pixel is measured using a high-speed camera or an optical probe, thereby generating a response model of the display unit 27.

Using the held response model and the teacher image and past image supplied from the motion compensation unit 112, the response-model holding unit 113 generates, in the case where the past image is displayed on the display unit 27 and then the input image serving as the teacher image is displayed on the display unit 27, transient images that are transitory images displayed on the display unit 27 at the time the image being displayed is switched from the past image to the input image (teacher image). The response-model holding unit 113 supplies the teacher image and the past image, which are supplied from the motion compensation unit 112, and the generated transient images to the motion compensation unit 114.

For example, when the past image is displayed on the display unit 27 and then the input image (teacher image) is displayed on the display unit 27, the pixel value of each of the pixels constituting the image displayed on the display unit 27, that is, the display screen of the display unit 27, is gradually changed, in accordance with a change in luminance value indicated by the response model, from a luminance value at the time the past image is displayed to a luminance value at the time the input image is displayed.

An image displayed on the display unit 27 at a predetermined time in a period during which the image displayed on the display unit 27 is switched from the past image to the input image serves as a transient image. The response-model holding unit 113 generates, at predetermined times, for example, sixteen transient images. In other words, transient images are images displayed in frames between the frame of the past image and the frame of the input image.

The motion compensation unit 114 obtains pixel values of tracking pixels by performing motion compensation using the motion vector supplied from the motion-vector detecting unit 111, and the teacher image, past image, and transient images supplied from the response-model holding unit 113, and supplies the obtained pixel values of the tracking pixels to the integrating unit 115.

Now, tracking pixels will be described. When the past image is displayed on the display unit 27 and then the input image serving as the teacher image is displayed on the display unit 27, a visual image that is an image perceived by an observer who is observing the display unit 27 in a period from when the past image is displayed to when the input image is displayed is as an average image of the past image, the transient images, and the input image.

That is, for example, when an image in which a moving object is moving in a predetermined direction on the display screen is displayed on the display unit 27, the observer's eyes follow the moving object. Thus, an average of luminance values of pixels displaying a predetermined portion of the moving object in the past image, the transient images, and the input image, that is, more specifically, an average of luminance values of pixels in the images that are followed by the observer's eyes, serves as the luminance value of a pixel in the visual image that displays the predetermined portion of the moving object.

In the following description, pixels of the past image, the transient images, and the input image, which are subjected to a calculation of an average for obtaining the luminance value (pixel value) of a predetermined pixel in the visual image, that is, pixels predicted to be followed by the observer's eyes, are called tracking pixels. Therefore, for the individual pixels of the visual image, the motion compensation unit 114 obtains pixel values for causing the tracking pixels of the past image, the transient images, and the input image to emit light at respective luminance values, and supplies the obtained pixel values as the pixel values of the tracking pixels to the integrating unit 115.

The integrating unit 115 generates a visual image by integrating the pixel values of the tracking pixels, which are supplied from the motion compensation unit 114, and supplies the generated visual image as a student image to the motion-vector detecting unit 83, the class-tap extracting unit 84, and the prediction-tap extracting unit 86. That is, the integrating unit 115 obtains, for each of pixels of a visual image, an average of the luminance values of tracking pixels correlated with that pixel, and regards the obtained average as the pixel value of that pixel in the visual image, thereby generating a visual image, that is, more specifically, a visual image signal.

An input image signal that is the same as that supplied to the image generating device 11, that is, an input image signal that is obtained by capturing an image of a photographic subject and that has been subjected to no particular processing, is supplied as a teacher image signal to the learning device 71. This input image signal is supplied one frame at a time, and at least two frames are supplied. When the teacher image signal is supplied to the learning device 71, the learning device 71 generates a student image signal using the supplied teacher image signal, and starts a learning process of obtaining a conversion coefficient from the teacher image signal and the student image signal.

Figure 6:
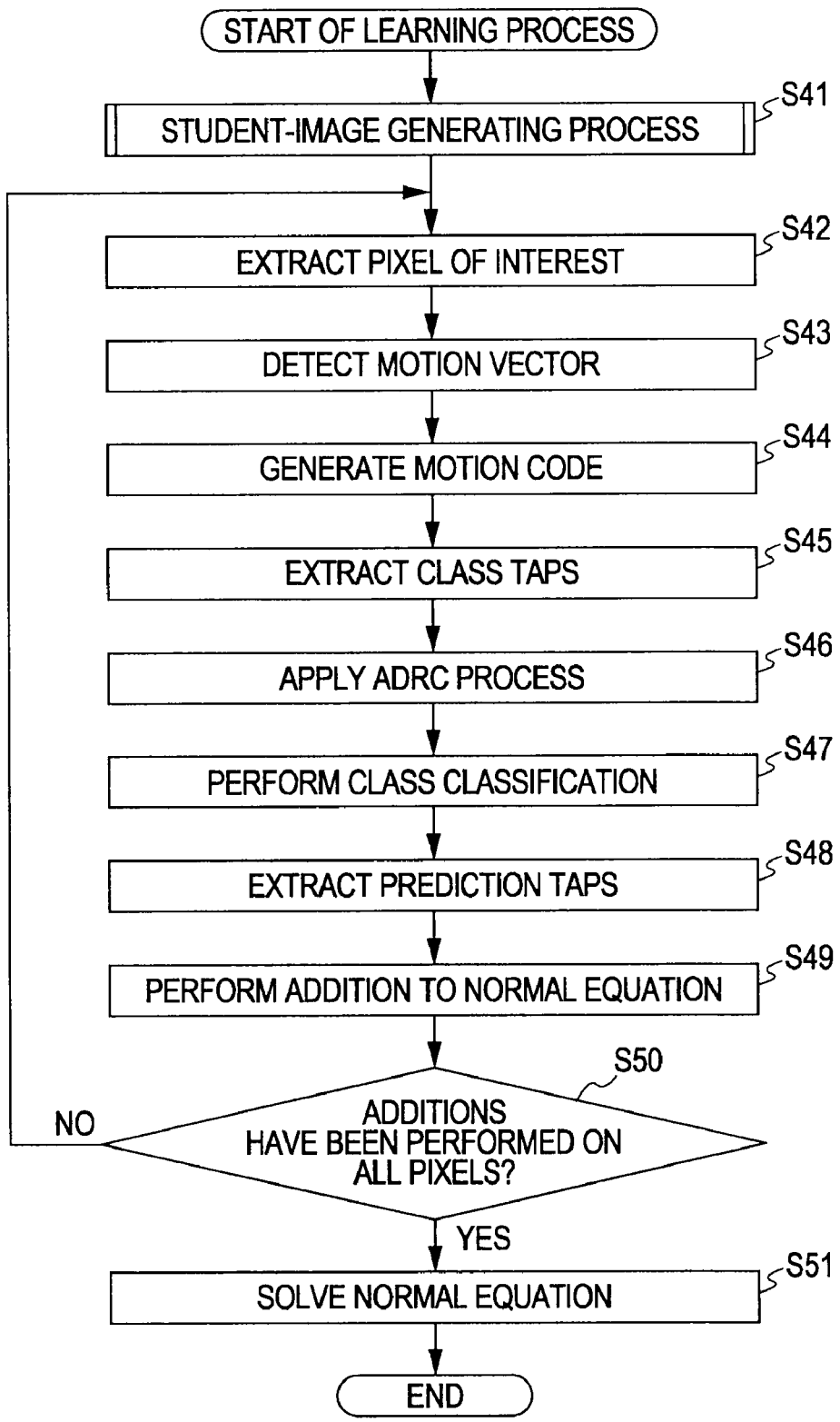
FIG. 6 is a flowchart describing a learning process.

Hereinafter, with reference to the flowchart illustrated in FIG. 6, the learning process performed by the learning device 71 will be described.

In step S41, the student-image generating unit 82 generates a visual image serving as a student image by performing a student-image generating process on the basis of the supplied teacher image signal, and supplies the generated student image to the motion-vector detecting unit 83, the class-tap extracting unit 84, and the prediction-tap extracting unit 86. The student-image generating process will be described in detail later.

In step S42, the pixel-of-interest extracting unit 81 regards a pixel in the teacher image based on the supplied teacher image signal as a pixel of interest, and extracts the pixel of interest, that is, more specifically, the pixel value of the pixel of interest, from the teacher image signal. The pixel-of-interest extracting unit 81 supplies the extracted pixel of interest to the calculating unit 87.

In step S43, the motion-vector detecting unit 83 detects, using the student image (student image signal) of a frame supplied from the student-image generating unit 82 and a student image of a frame that is immediately before that frame, a motion vector of a pixel in the student image of the frame supplied from the student-image generating unit 82, which is at the same position as that of the pixel of interest.

A frame to be processed this time will be called a current frame, and a frame that is temporally one frame before the current frame will be called a previous frame. The motion-vector detecting unit 83 is holding a student image signal of a previous frame that was supplied last time. For example, the motion-vector detecting unit 83 detects, using the student image signal of the current frame and the student image signal of the previous frame, a motion vector of the pixel in the student image of the current frame, which is at the same position as that of the pixel of interest, by performing, for example, block matching or a gradient method. The motion-vector detecting unit 83 supplies the detected motion vector to the class classification unit 85, the class-tap extracting unit 84, and the prediction-tap extracting unit 86.

In step S44, on the basis of the motion vector supplied from the motion-vector detecting unit 83, the class classification unit 85 generates a motion code determined by the size (absolute value) of the motion vector. The motion code is binary data (bit value) and is used to classify the pixel of interest.

In step S45, the class-tap extracting unit 84 extracts class taps from the student image on the basis of the motion vector from the motion-vector detecting unit 83 and the student image signal from the student-image generating unit 82 in correlation with the pixel of interest in the teacher image, and supplies the class taps to the class classification unit 85. That is, the class-tap extracting unit 84 is holding the student image signal of the previous frame. Using the student image signal of the previous frame and the student image signal of the current frame, the class-tap extracting unit 84 extracts some pixels positioned temporally or spatially near a pixel in the student image signal of the current frame, which is at the same position as that of the pixel of interest, that is, more specifically, pixel values of these pixels, as class taps.

For example, the class-tap extracting unit 84 extracts pixels in the student image that have, relative to the pixel of interest, the same positional relationships with the class taps extracted by the class-tap extracting unit 22 from the input image as class taps. That is, when the images of the current frame and the previous frame illustrated in FIG. 3A correspond to a student image and the pixel G11 is a pixel at the same position as that of the pixel of interest in the teacher image, the pixels G11 to G14 are extracted as class taps.

In step S46, the class classification unit 85 applies an ADRC process to the class taps supplied from the class-tap extracting unit 84.

In step S47, the class classification unit 85 determines the class of the pixel of interest by classifying the pixel of interest on the basis of the generated motion code and an ADRC code that is obtained as a result of the ADRC process, and supplies a class code indicating the determined class to the calculating unit 87.

In step S48, the prediction-tap extracting unit 86 extracts, on the basis of the motion vector from the motion-vector detecting unit 83 and the student image signal from the student-image generating unit 82, prediction taps from the student image, and supplies the prediction taps to the calculating unit 87. That is, the prediction-tap extracting unit 86 is holding the student image signal of the previous frame. Using the student image signal of the previous frame and the student image signal of the current frame, the prediction-tap extracting unit 86 extracts some pixels positioned temporally or spatially near a pixel in the student image of the current frame, which is at the same position as that of the pixel of interest, that is, more specifically, pixel values of these pixels, as prediction taps.

For example, the prediction-tap extracting unit 86 extracts pixels in the student image that have, relative to the pixel of interest, the same positional relationships with the prediction taps extracted by the prediction-tap extracting unit 24 from the input image as prediction taps. That is, when the images of the current frame and the previous frame illustrated in FIG. 3A correspond to a student image and the pixel G11 is a pixel at the same position as that of the pixel of interest in the teacher image, the pixels G11 to G18-4 are extracted as prediction taps.

In step S49, while correlating the pixel of interest supplied from the pixel-of-interest extracting unit 81 with the prediction taps supplied from the prediction-tap extracting unit 86, the calculating unit 87 performs an addition on the pixel of interest and pixels constituting the prediction taps, using the normal equation indicated in equation (8) formulated for the class correlated with the class code from the class classification unit 85.

In step S50, the calculating unit 87 determines whether additions have been performed on all the pixels. For example, when additions have been performed using all the pixels of the teacher image of the current frame as pixels of interest, it is determined that additions have been performed on all the pixels.

When it is determined in step S50 that additions have not been performed on all the pixels yet, the flow returns to step S42, and the above-described flow is repeated. That is, a pixel in the teacher image that has not been selected as a pixel of interest yet is selected as a new pixel of interest, and an addition is performed.

In contrast, when it is determined in step S50 that additions have been performed on all the pixels, the calculating unit 87 supplies the normal equation formulated for each class to the coefficient generating unit 88. The flow proceeds to step S51.

In step S51, the coefficient generating unit 88 obtains a conversion coefficient $w_i$ of each class by solving the normal equation of that class, which has been supplied from the calculating unit 87, using a sweeping out method or the like, and records the conversion coefficient $w_i$. Accordingly, the conversion coefficient $w_i$ used to predict the pixel value of a pixel of interest of each class is obtained. The conversion coefficient $w_i$ obtained as above is recorded in the coefficient holding unit 25 of the image generating device 11, and is used to generate a display image.

As above, the learning device 71 generates a visual image serving as a student image from an input image serving as a teacher image, and obtains a conversion coefficient using the teacher image and the student image.

As above, a conversion coefficient for converting an input image into a higher-quality display image can be obtained with a simpler process by obtaining the conversion coefficient by performing learning using an input image as a teacher image and a visual image as a student image. Using the conversion coefficient obtained as above, the input image can be converted into the higher-quality display image, and the higher-quality display image can be displayed. As a result, the degraded image quality of an image can be more easily improved.

In the above description, the example in which pixels of a teacher image of one frame individually serve as pixels of interest and a conversion coefficient is obtained has been described. Alternatively, a conversion coefficient may be obtained using teacher images of multiple frames. In such a case, pixels of the teacher images of the frames individually serve as pixels of interest, and a normal equation is formulated on a class-by-class basis.

Referring now to the flowchart illustrated in FIG. 7, the student-image generating process, which is the process correlated with the process in step S41 in FIG. 6, will be described.

In step S81, using the supplied teacher image, the motion-vector detecting unit 111 detects a motion vector by performing, for example, block matching or a gradient method, and supplies the motion vector to the motion compensation unit 112 and the motion compensation unit 114. For example, using the teacher image of the previous frame and the teacher image of the current frame, which is newly supplied this time, the motion-vector detecting unit 111 detects the motion vector of each pixel in the teacher image of the current frame.

In step S82, on the basis of the supplied teacher image and the motion vector supplied from the motion-vector detecting unit 111, the motion compensation unit 112 performs motion compensation with an accuracy of a pixel or lower, using a bicubic filter or the like, and generates a past image. The motion compensation unit 112 supplies the supplied teacher image and the generated past image to the response-model holding unit 113.

Figure 8A:
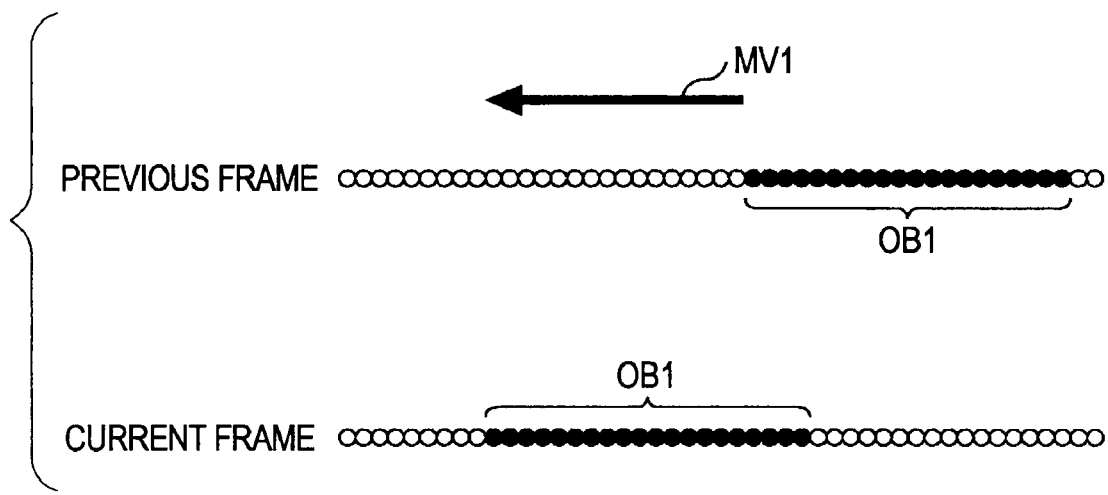
FIGS. 8A and 8B are diagrams describing generation of a past image.
Figure 8B:
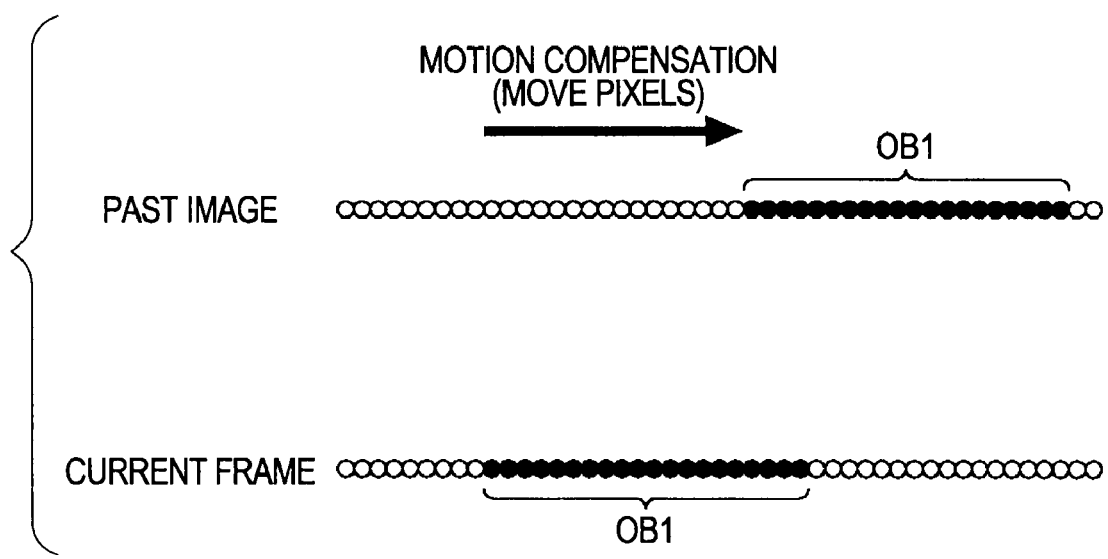

For example, as illustrated in FIG. 8A, when movement of a moving object OB1 in the teacher image, that is, a motion vector MV1 of the moving object OB1, is detected between the teacher image of the previous frame supplied last time and the teacher image of the current frame newly supplied this time, as illustrated in FIG. 8B, the moving object OB1 in the teacher image of the current frame is moved in a direction opposite to the detected movement, thereby generating a past image.

In FIGS. 8A and 8B, the vertical direction indicates time, and the horizontal direction indicates a spatial direction, that is, a position in the image. Also, in FIGS. 8A and 8B, one circle indicates one pixel.

Referring to FIG. 8A, an array of pixels in the upper portion indicates the teacher image (input image) of the previous frame, and an array of pixels in the lower portion indicates the teacher image (input image) of the current frame. Regions where black pixels (black circles) in the teacher images of the previous and current frames are horizontally arranged indicate the moving object OB1 moving in the teacher images. The moving object OB1 is moving to the left with time.

Therefore, the motion-vector detecting unit 111 detects the motion vector MV1 of the moving object OB1, which is indicated by an arrow in FIG. 8A. For example, the motion vector MV1 is a vector whose size of leftward movement is MV1.

When movement of the moving object OB1 is detected, the motion compensation unit 112 generates, as illustrated in FIG. 8B, a past image from the teacher image of the current frame and the detected motion vector MV1. Referring to FIG. 8B, an array of pixels in the upper portion indicates the generated past image, and an array of pixels in the lower portion indicates the teacher image of the current frame.

The motion compensation unit 112 generates a past image by moving pixels that have been detected to be moving in the teacher image of the current frame, as indicated by an arrow illustrated in FIG. 8A, that is, the moving object OB1, in a direction opposite to the detected motion vector MV1 by the size of the motion vector MV1. Accordingly, an image substantially the same as the teacher image (input image) of the previous frame is generated as a past image.

The teacher image of the previous frame may be used as it is as a past image. However, when a past image is generated by performing motion compensation, no inter-frame difference is generated due to movement of the moving object whose movement amount is a pixel or lower, or a noise component, it is preferable to generate a past image by performing motion compensation. In order to detect a motion vector, besides the teacher image of the frame that is one frame before the current frame, a teacher image of a frame that is temporally two frames before the current frame may additionally be used.

Figure 7:
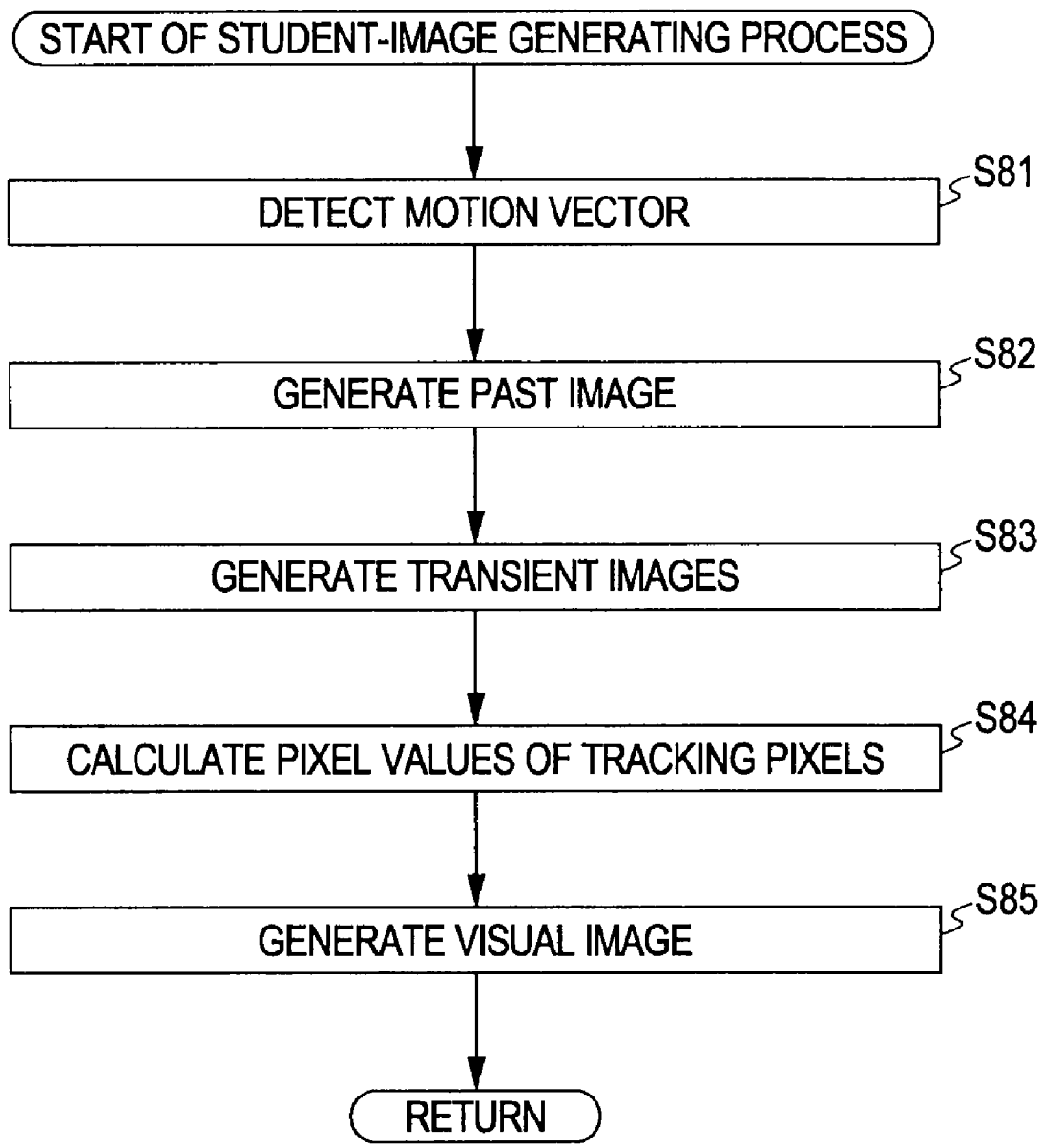
FIG. 7 is a flowchart describing a student-image generating process.

Referring back to the flowchart illustrated in FIG. 7, in step S83, the response-model holding unit 113 generates transient images using a response model that is held in advance and the teacher image and the past image, which are supplied from the motion compensation unit 112. The response-model holding unit 113 supplies the teacher image and the past image, which are supplied from the motion compensation unit 112, and the generated transient images to the motion compensation unit 114.

Figure 9:
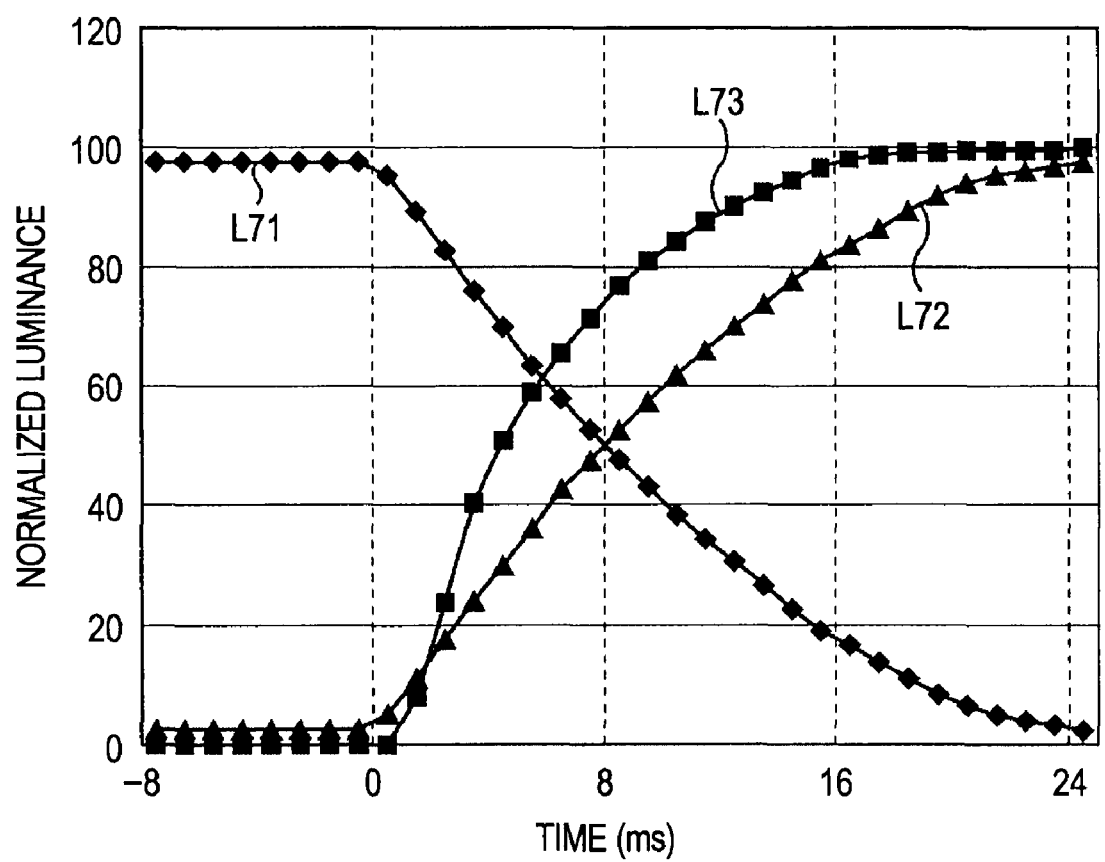
FIG. 9 is a diagram describing a response model.

For example, the response-model holding unit 113 is holding a response model illustrated in FIG. 9. Here, the response model in FIG. 9 illustrates a response characteristic of an LCD serving as the display unit 27. In FIG. 9, the luminance value of one pixel in the LCD is plotted in ordinate, and time is plotted in abscissa.

A curve L71 indicates a temporal change in the luminance value of the pixel when the luminance value is changed from 98 to 0. After 0 ms, that is, after the luminance value is changed, the luminance value is decreasing in a substantially linear manner. A curve L72 is an inverted copy of the curve L71. That is, the curve L72 is a curve symmetrical to the curve L71 about a horizontal straight line indicating a luminance value of 50.

Furthermore, a curve L73 indicates a temporal change in the luminance value of the pixel when the luminance value is changed from 0 to 98. After 0 ms, that is, after the luminance value is changed, the luminance value is gradually increasing. In particular, the curve L73 indicates a sudden increase in the luminance value in a section from 0 ms to 5 ms.

For example, the response-model holding unit 113 uses a curve having a luminance value at each time obtained by adding the luminance value of the curve L72 at the time and the luminance value of the curve L73 at the time and dividing the sum by 2, that is, a curve obtained by averaging the curves L72 and L73, and the curve L71 as the response model of the display unit 27.

Figure 10:
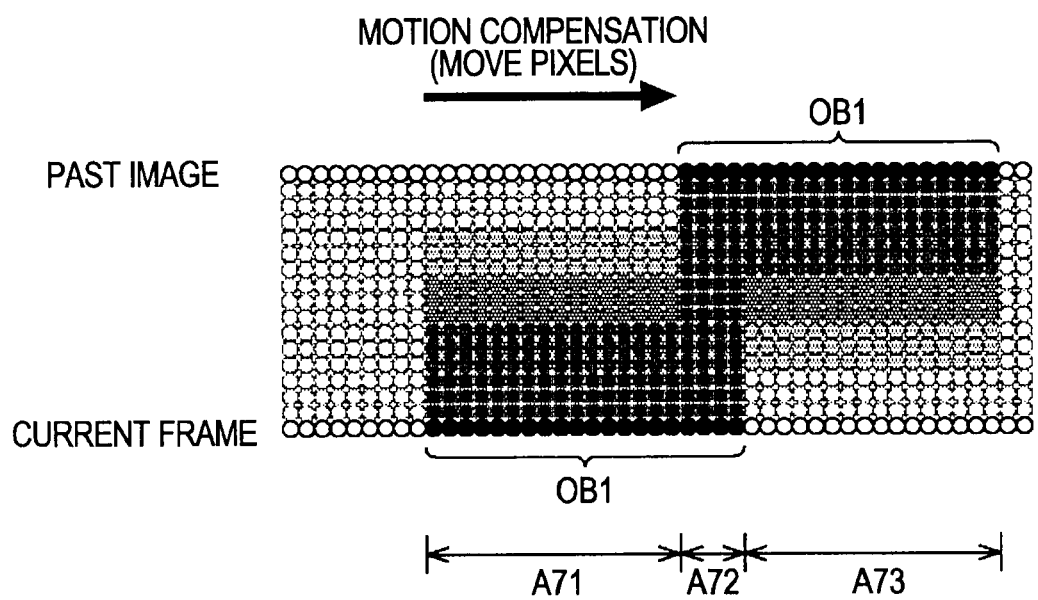
FIG. 10 is a diagram describing transient images.

The response-model holding unit 113 generates transient images using the foregoing response model. For example, when the past image illustrated in FIG. 8B was generated from the teacher image of the current frame, as illustrated in FIG. 10, transient images between the past image and the teacher image of the current frame are generated. In FIG. 10, the vertical direction indicates time, and the horizontal direction indicates a spatial direction, that is, a position in the image. Also, in FIG. 10, one circle indicates one pixel.

Referring to FIG. 10, an array of pixels at the top, that is, a horizontal array of pixels at the top, indicates the past image, and an array of pixels at the bottom indicates the teacher image of the current frame. Horizontal arrays of pixels between the past image and the teacher image indicate the generated transient images. In the example illustrated in FIG. 10, fifteen transient images are generated.

That is, transient images of fifteen frames are generated as images of frames (phases) between the past image, which corresponds to the teacher image of the previous frame, and the teacher image of the current frame. In FIG. 10, the higher the position of a transient image represented by an array of pixels, the earlier the transient image, that is, the closer the frame (phase) of the transient image is to the previous frame.

In FIG. 10, in the past image, the transient images, and the teacher image (input image), pixels that are arranged in the vertical direction are assumed to be pixels at the same position.

For example, within a section A71, pixels of the past image have a higher luminance value, and pixels of the teacher image have a lower luminance value. In other words, the pixels of the past image within the section A71 are white pixels (bright pixels), and the pixels of the teacher image within the section A71 are black pixels (dark pixels). Thus, the luminance values of the pixels of the transient images within the section A71 are decreasing with time. That is, within the section A71, the pixels of a transient image of a frame that is temporally closer to the current frame (transient image that is nearer to the bottom) have a lower luminance value.

Within a section A72, the pixels of the past image and the pixels of the teacher image have the same luminance value. Thus, the pixel values of the pixels of the transient images within the section A72 are constant regardless of time. That is, within the section A72, the pixels of a transient image of any frame have the same luminance value as that of the teacher image.

Within a section A73, the pixels of the past image have a lower luminance value, and the pixels of the teacher image have a higher luminance value. That is, within the section A73, the pixels of a transient image of a frame that is temporally closer to the current frame (transient image that is nearer to the bottom) have a higher luminance value.

As above, when the luminance value of pixels at the same position in the teacher image and the past image are different, that is, when the luminance value of a pixel in the teacher image changes with time, the luminance value of a pixel at a correlated position in a transient image is determined in accordance with a temporal change in the luminance value, which is indicated by the response model.

For example, when the response-model holding unit 113 is holding the response model illustrated in FIG. 9 and when a period of time from a display time at which the past image corresponding to the image of the previous frame is displayed to a display time at which the teacher image of the current frame is displayed is 24 ms, if the luminance value of a pixel at a certain position in the teacher image is 0 and the luminance value of a pixel at a correlated position in the past image is 98, the pixel value of a pixel at a correlated position (correlated with the pixel in the teacher image) in a transient image of an intermediate frame between the previous frame and the current frame, that is, a frame at a display time that is 12 ms after the display time of the image of the previous frame, is such a pixel value that the luminance value is 30.

In the example illustrated in FIG. 10, fifteen transient images are generated, and one frame is divided into sixteen sections. Alternatively, one frame may be divided into four sections or 64 sections. When one frame is divided into a greater number of sections, a more accurate visual image can be obtained.

Referring back to the flowchart illustrated in FIG. 7, in step S84, the motion compensation unit 114 performs, with a bicubic filter or the like, motion compensation with an accuracy of a pixel or lower and calculates pixel values of tracking pixels by using the motion vector supplied from the motion-vector detecting unit 111 and the teacher image, the past image, and the transient images, which are supplied from the response-model holding unit 113.

That is, the motion compensation unit 114 performs motion compensation with an accuracy of a pixel or lower by using the motion vector supplied from the motion-vector detecting unit 111, and calculates pixel values of tracking pixels of the teacher image, the past image, and the transient images, which are supplied from the response-model holding unit 113. When the motion compensation unit 114 obtains the pixel values of the tracking pixels for all the pixels of a visual image (this visual image is an image to be obtained and does not exist at present; thus, this visual image is virtually assumed), the motion compensation unit 114 supplies the calculated pixel values of the tracking pixels to the integrating unit 115.

In general, it is empirically clear that the eyes of a human being follow an intermediate phase of a frame. In other words, when an image of one frame and an image of the next frame are sequentially displayed, a virtual frame displayed at an intermediate time between the time at which the image of the first frame is displayed and the time at which the image of the next frame is displayed will be called an intermediate frame. The eyes of a human being perceive an image of the intermediate frame as an image that the human being is seeing, that is, a visual image.

Since the eyes of an observer follow a moving object in an image, the direction in which the line of sight of the observer moves and the direction of a motion vector of the moving object in the image are the same direction. Therefore, using the motion vector of the teacher image of the current frame, pixels in the past image and the transient images estimated to be followed by the eyes of the observer can be specified. These pixels serve as tracking pixels, based on which a visual image can be generated.

Figure 11:
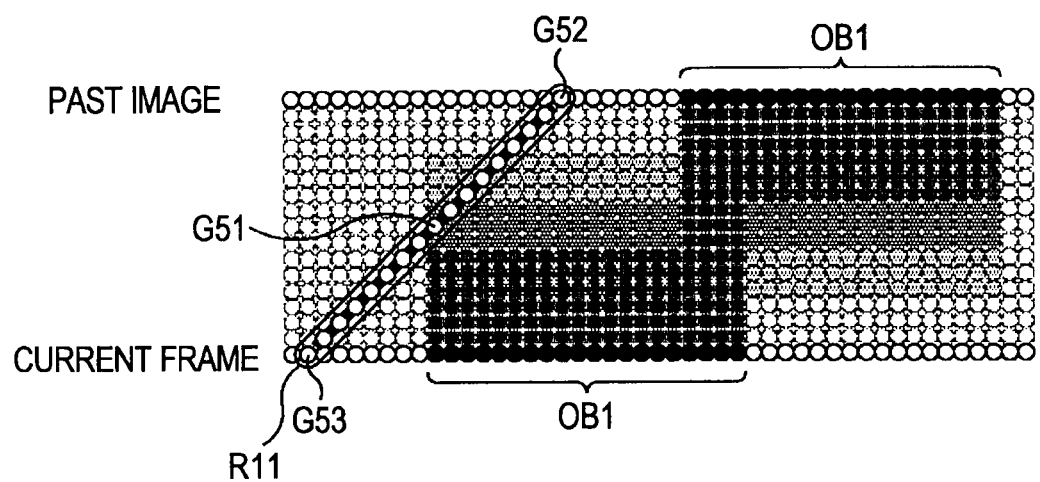
FIG. 11 is a diagram describing tracking pixels.

For example, when the transient images illustrated in FIG. 10 are generated, as illustrated in FIG. 11, tracking pixels for each pixel of a visual image can be obtained by performing motion compensation using the motion vector. In FIG. 11, the vertical direction indicates time, and the horizontal direction indicates a spatial direction, that is, a position in the image. Also, in FIG. 11, one circle indicates one pixel. Furthermore in FIG. 11, portions corresponding to those illustrated in FIG. 10 are given the same reference numerals, a detailed description of which is omitted.

Referring to FIG. 11, a horizontal array of pixels at the top indicates the past image, and a horizontal array of pixels at the bottom indicates the teacher image of the current frame. Horizontal arrays of pixels between the past image and the teacher image indicate the generated transient images.

For example, the case where the pixel value of a pixel in the visual image, which is at the same position as that of a pixel G51 in a transient image, is to be calculated will be discussed. The transient image including the pixel G51 is a transient image at an intermediate phase between the past image and the teacher image. It is also assumed that a portion of the moving object represented by a pixel G52 in the past image is displayed by a pixel G53 in the teacher image. It is also assumed that pixels on a motion vector of the pixel G53, that is, a straight line that indicates a trail of movement of the eyes of the observer and that connects the pixel G52 to the pixel G53 (pixels followed by the eyes of the observer), are pixels within a region R11 including the pixel G51.

In the example illustrated in FIG. 11, the number of pixels of each of the past image, the transient images, and the teacher image, which are positioned within the region R11, is one for each of the past image, the transient images, and the teacher image.

In this case, since the pixels within the region R11 are pixels followed by the eyes of the observer, the pixels positioned within the region R11 serve as tracking pixels for the pixel in the visual image, which is at the same position as that of the pixel G51. Therefore, the pixel value of the pixel in the visual image can be obtained by calculating an average of the pixel values of the pixels within the region R11 of the past image, the transient images, and the teacher image.

Since the number of pixels positioned within the region R11 is not necessarily one for each image, the pixel value of a tracking pixel in each image is actually obtained by performing motion compensation with an accuracy of a pixel or lower. That is, the pixel value of the tracking pixel is obtained from pixel values of some pixels near the region R11.

Referring back to the flowchart illustrated in FIG. 7, when the pixel values of the tracking pixels for each pixel in the visual image are calculated, in step S85, the integrating unit 115 generates a visual image by integrating the pixel values of the tracking pixels, which are supplied from the motion compensation unit 114. The integrating unit 115 supplies the generated visual image (visual image signal) as a student image to the motion-vector detecting unit 83, the class-tap extracting unit 84, and the prediction-tap extracting unit 86. The student-image generating process is completed. The flow proceeds to step S42 in FIG. 6.

For example, the integrating unit 115 calculates, for one pixel in the visual image, an average of the pixel values of the tracking pixels, correlated with that pixel in the visual image, in the past image, the transient images, and the input image, and regards the calculated average as the pixel value of the pixel in the visual image. The integrating unit 115 calculates the pixel value of each of the pixels of the visual image in this manner, thereby generating the visual image.

As above, the student-image generating unit 82 generates, on the basis of an input image serving as a teacher image, a visual image, which is an image predicted to be perceived by the eyes of a human being when the input image is displayed as it is on the display unit 27, as a student image. The visual image serving as the student image is an image that is generated from the motion-blur-free input image at a correct luminance level and that additionally has motion blur in accordance with the characteristics of the display unit 27 and human perception characteristics.

When a learning process is performed using the visual image generated as above as the student image and the input image as the teacher image, a conversion coefficient for converting an image that causes the observer to perceive that the visual image is displayed on the display unit 27 into an image that causes the observer to perceive that the input image is displayed on the display unit 27, that is, a vivid image having no motion blur, can be obtained.

Therefore, when the image generating device 11 converts the input image using this conversion coefficient, a display image that can be perceived by the observer as a vivid image having no motion blur can be obtained.

That is, for example, techniques such as overdrive compensate an input image for degradation of the image quality due to the characteristics of a display device. In contrast, the image generating device 11 compensates the input image for degradation of the image quality of the image, which is perceived by an observer who observes the display unit 27 and which is caused by the visual characteristics of the observer. Therefore, a display image that causes the observer to perceive an image that is closer to the input image can be displayed. Furthermore, since no black image is inserted as in the black insertion technique, the screen does not become dark.

Degradation of the image quality caused by motion blur in a hold-type display device occurs when the response speed of the display becomes zero. Therefore, the image generating device 11 can reliably improve the image quality degraded by motion blur by generating a display image by performing a class classification adaptive process using an input image.

An image of higher quality can be generated by using an input image and a visual image generated from the input image, compared with the case where an image is generated using only the input image. For example, when the difference between the visual image and the input image is added to the input image and a resulting image is displayed on the display unit 27, the eyes of an observer who observes this resulting image should see this image as if the input image were displayed. That is, this image really looks like the display image.

Since the visual image is generated from the input image, after all, a display image should be generated using only the input image. Therefore, a conversion coefficient for converting the input image into the display image should be generated using only the input image.

The learning device 71 generates a visual image from an input image, and obtains a conversion coefficient from the pixel values of some pixels in the visual image and the pixel value of a pixel of interest in the input image. Some of the pixels of the visual image used in this case, that is, pixels constituting prediction taps, are regarded as pixels that are temporally or spatially near a pixel in a visual image of a supplied frame, which is at the same position as that of the pixel of interest. For example, as illustrated in FIGS. 3B and 3C, about twenty pixels or so are used as prediction taps.

A conversion coefficient for obtaining an image that causes an observer to perceive that a vivid image is being displayed even when only about twenty pixels or so are used can be obtained because of the following reason. That is, a motion blurred image serving as a student image includes a mixture of multiple pixels or multiple portions of the moving object that correspond to a movement amount. Therefore, elements that are necessary for prediction of a pixel of interest are included in the environment of a pixel in the student image, which is at the same position as that of the pixel of interest. Fundamentally, not many pixels are necessary for predicting the pixel of interest.

For example, it is assumed that an image of a moving object serving as a photographic subject is captured with a shutter speed of one-fifth of a reference speed serving as a predetermined reference. A captured image obtained by this image capturing operation is equivalent to, as illustrated in FIG. 12, an average of five partial images that are temporally successively captured by using a shutter speed as a reference speed.

Figure 12:
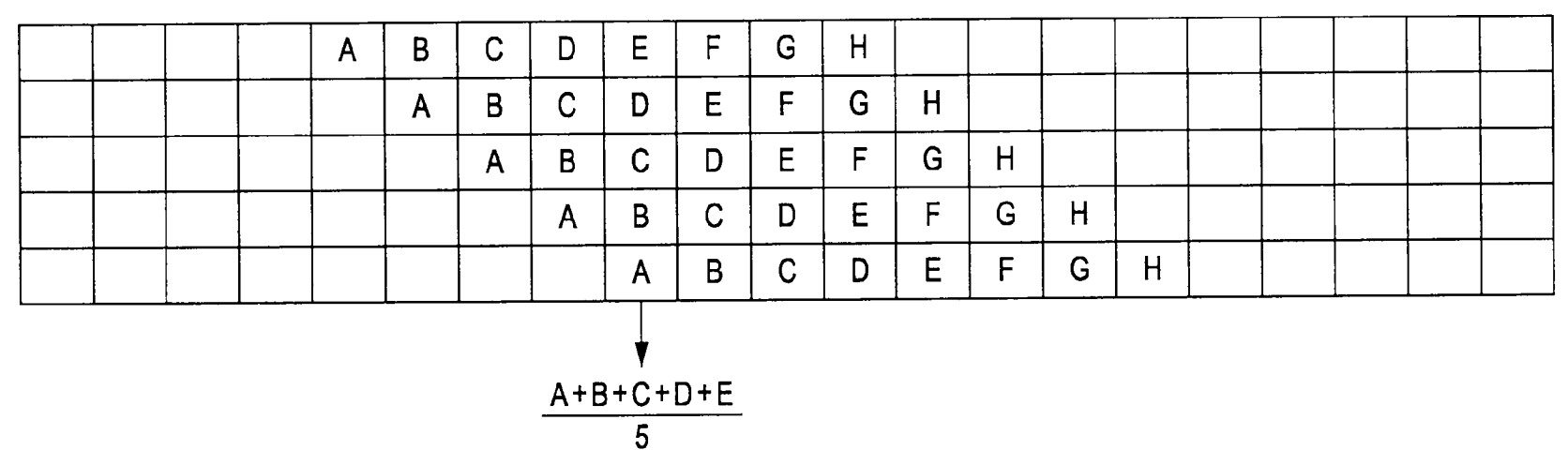

Referring to FIG. 12, one rectangle indicates one pixel in a partial image, and a horizontal array of rectangles indicates one partial image. The characters "A" to "H" written on the pixels indicate portions of the moving object serving as the photographic subject. For example, the rectangle on which the character "A" is written indicates a pixel at which a portion A of the moving object is displayed in the partial image. This pixel at which the portion A is displayed will also be called a pixel A. Partial images from the top to the bottom will be called partial images of frames F1 to F5. The higher the position of the partial image, the earlier the frame of the partial image.

For example, a pixel in a captured image, which is at the same position as that of a pixel C in the partial image of the frame F3, serves as a target pixel. The pixel value of the target pixel is an average of the pixel values of the pixels in the partial images of the frames F1 to F5, which are at the same position as that of the target pixel. That is, the pixel value of the target pixel is obtained by dividing the sum of the pixel value of a pixel E in the frame F1, the pixel value of a pixel D in the frame F2, the pixel value of the pixel C in the frame F3, the pixel value of a pixel B in the frame F4, and the pixel value of a pixel A in the frame F5 by five. As above, the captured image is an image including a mixture of the partial images of the frames, that is, a motion blurred image.

Here, the case where, with a learning process, a conversion coefficient for generating a motion-blur-free teacher image from a captured image serving as a student image will be discussed. Since the teacher image is an image having no motion blur, for example, when the teacher image is an image whose phase is the same as the partial image of the frame F3, the partial image of the frame F3 corresponds to the teacher image.

For example, the portion C of the moving object is displayed at, in the partial image of the frame F3 serving as the teacher image, a pixel positioned at the same position as that of the target pixel in the captured image. Therefore, when the pixel in the teacher image, which is at the same position as that of the target pixel, serves as a pixel of interest, if pixels including an element of the portion C are extracted from the captured image as prediction taps for obtaining the pixel of interest, a conversion coefficient for predicting the pixel value of the pixel of interest should be more accurately obtained using the extracted prediction taps. That is, it is only necessary to regard at least some of the pixels, at which the portion C is displayed, in the partial images of the frames F1 to F5, and the pixels in the captured image that are at the same position as prediction taps.

In particular, there is general knowledge that a conversion coefficient for more accurately obtaining a pixel of interest can be obtained by regarding, in the captured image, pixels at the extreme edges of a region including an element of the portion C as prediction taps. In the example illustrated in FIG. 12, pixels in the captured image that are at the same position as that of the pixel C in the partial image of the frame F1 and of the pixel C in the partial image of the frame F5 serve as pixels at the extreme edges of the region including the element of the portion C.

A region of the captured image including such an element of the portion C should be a region that is centered at the target pixel and that is within a range of, from that center, distance of the size of the motion vector of the target pixel. Therefore, when pixels within the range of distance of, from the target pixel, the size of the motion vector of the target pixel serve as prediction taps, a conversion coefficient for accurately predicting a pixel of interest should be obtained. Therefore, in the learning device 71 (or the image generating device 11), if the image illustrated in FIGS. 3A to 3C serves as a student image, the pixel G11 in the student image (or input image) at the same position as that of the pixel of interest, pixels adjacent to the pixel G11, the pixel G12 at a distance of, from the pixel G11, k times the size of the motion vector mv (where $0 < k \leq 1$), and pixels adjacent to the pixel G12 are selected as prediction taps.

In particular, at the time of learning, since a learning process is performed using these prediction taps, a conversion coefficient in which a coefficient to be multiplied by pixels that are more closely related to the pixel of interest (prediction taps) becomes greater is obtained. Therefore, using the conversion coefficient, the pixel of interest can be more accurately predicted using fewer prediction taps, thereby improving the motion blur removal effect. Furthermore, since it becomes possible to predictively calculate the pixel of interest using fewer prediction taps, the image generating device 11 can be realized using hardware with smaller dimensions.

In the example illustrated in FIG. 12, there are pixels including the element of the portion C in captured images of frames that are temporally before and after the frame (current frame) of the captured image. Therefore, when pixels including the element of the portion C in frames that are temporally different from the current frame are used as prediction taps, the pixel of interest can be accurately predicted. A region including the element of the portion C, which is in the captured image of each frame, is obtained from the motion vector of the captured image (target pixel), as in the case of the current frame.

Therefore, when the image illustrated in FIGS. 3A to 3C serves as a student image, the learning device 71 (or image generating device 11) extracts the pixel G13 in the student image (or input image) of the previous frame, pixels adjacent to the pixel G13, the pixel G14 in the student image (or input image) of the previous frame, and pixels adjacent to the pixel G14 as prediction taps. Here, the pixel G13 is a pixel at a position displaced from the pixel G11' in the student image (or input image), which is at the same position as that of the pixel of interest, by a distance equal to the size of the motion vector mv in a direction opposite to the motion vector mv. The pixel G14 is a pixel at a position displaced from the pixel G11' by a distance that is k times the size of the motion vector mv (where $0 < k \leq 1$).

As above, in the learning process and the class classification adaptive process, the pixel of interest can be more accurately predicted using pixels positioned spatially or temporally near a pixel that is at the same position as that of the pixel of interest and that is in the student image or the input image as prediction taps.

Therefore, pixels serving as prediction taps in the learning process and the class classification adaptive process are not limited to those in the example illustrated in FIGS. 3A to 3C. Any pixels may serve as prediction taps as long as they are positioned spatially or temporally near the pixel that is at the same position as that of the pixel of interest and that is in the student image or the input image.

Figure 13:
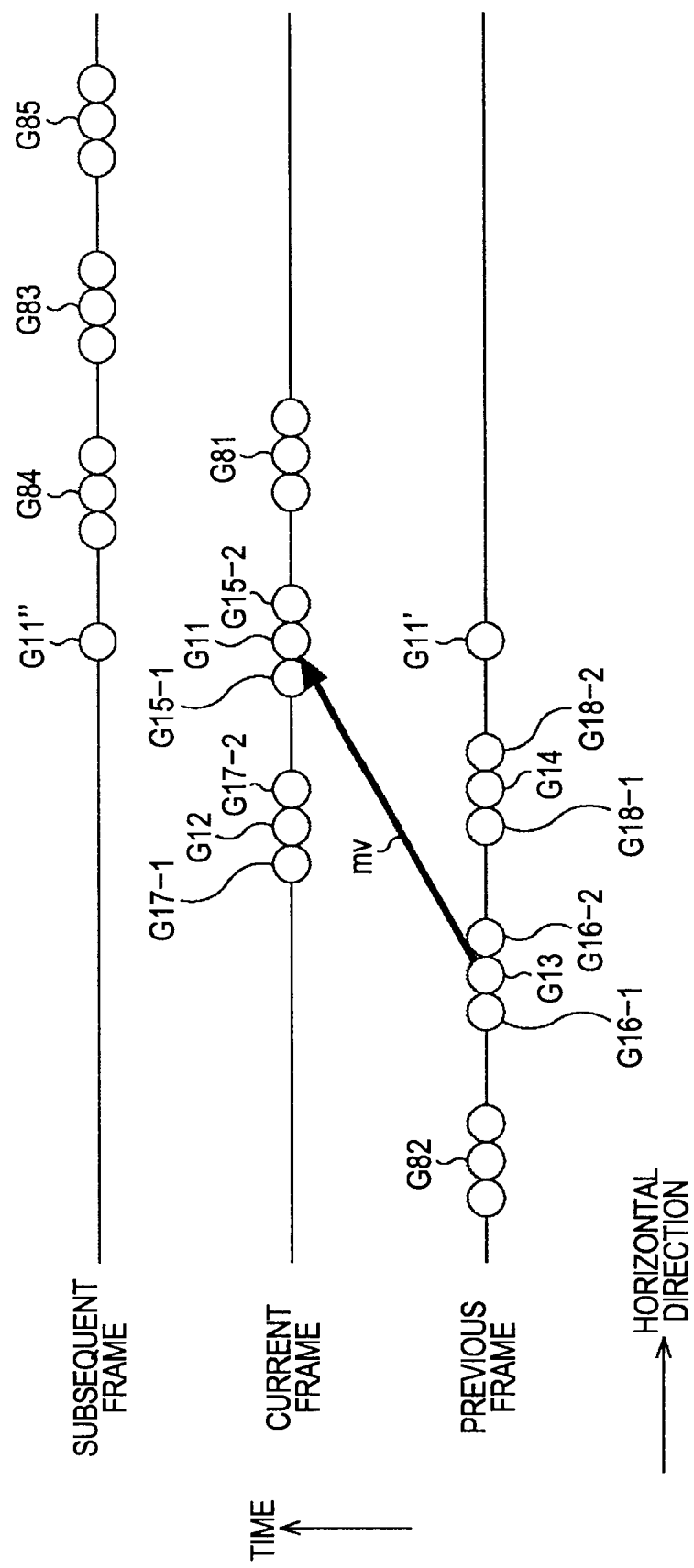
FIG. 13 is a diagram illustrating other examples of class taps and prediction taps.

For example, from the input image supplied to the image generating device 11 at the time of the class classification adaptive process, as illustrated in FIG. 13, pixels G81 to G85 positioned temporally or spatially near the pixel G11 and pixels adjacent to these pixels G81 to G85 may be extracted as prediction taps. In FIG. 13, portions corresponding to those illustrated in FIG. 3 are given the same reference numerals, a detailed description of which is omitted. In FIG. 13, at the top, a horizontal array of pixels (circles) indicates an input image of a frame that is one frame temporally after the current frame (hereinafter called a subsequent frame).

For example, it is assumed that the pixel G12 is a pixel in the input image of the current frame, which is at a position displaced from the pixel G11 by a distance k times the size MV of the motion vector mv (where 0<k≦1) in a direction opposite to the motion vector mv. In this case, the pixel G81 is a pixel in the input image of the current frame, which is at a position displaced from the pixel G11 by a distance kMV in the direction of the motion vector mv. The pixel G82 is a pixel in the input image of the previous frame, which is at a position displaced from the pixel G13 by the distance kMV in a direction opposite to the motion vector mv.

The pixel G83 is a pixel at a position displaced from a pixel G11" in the input image of the subsequent frame, which is at the same position as that of the pixel G11, by a distance MV in the direction of the motion vector mv. The pixel G84 is a pixel in the input image of the subsequent frame, which is at a position displaced from the pixel G83 by the distance kMV in a direction opposite to the motion vector mv. The pixel G85 is a pixel in the input image of the subsequent frame, which is at a position displaced from the pixel G83 by the distance kMV in the direction of the motion vector mv.

As above, the pixel of interest can be more accurately predicted using some of the pixels G11 to G14, the pixels G81 to G85, and the pixels adjacent to these pixels in the vertical and horizontal directions as prediction taps. Because of the similar reason, some of the pixels G11 to G14 and the pixels G81 to G85 may serve as class taps.

Figure 14:
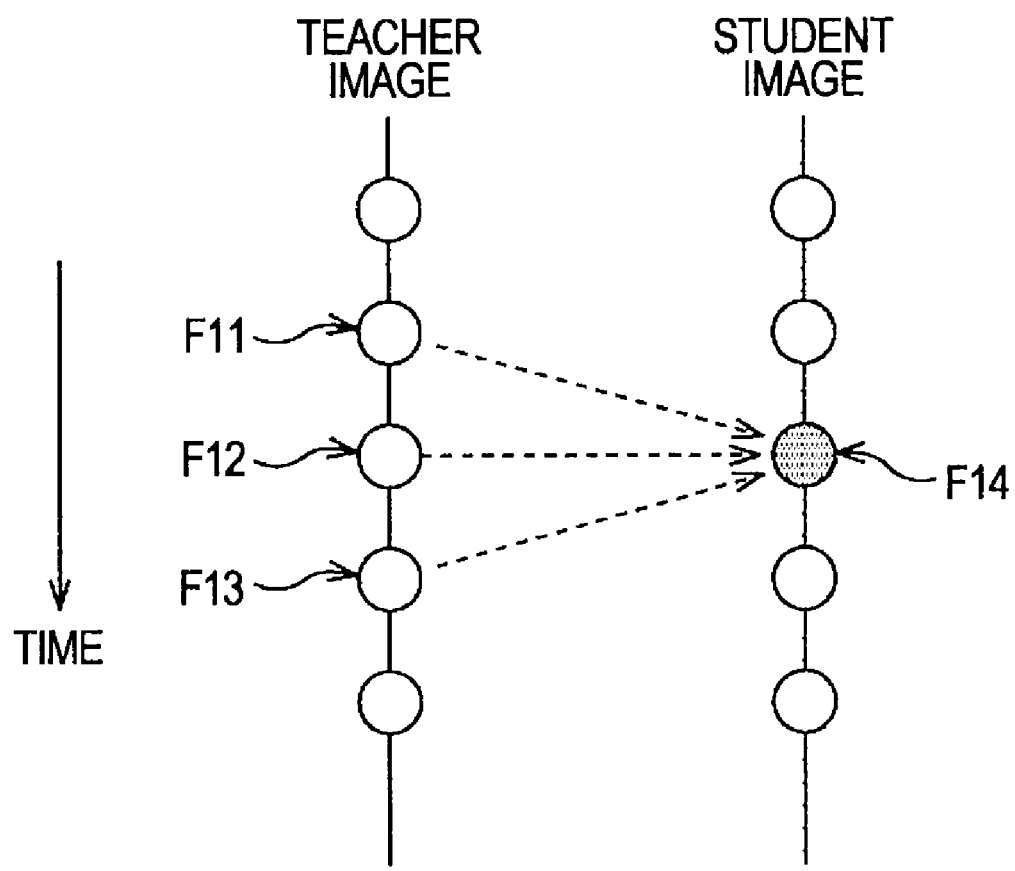
FIG. 14 is a diagram describing generation of a student image.

It has been described above that the student-image generating unit 82 of the learning device 71 generates a past image and transient images from an input image serving as a teacher image, and generates a visual image serving as a student image from the past image, the transient images, and the teacher image. However, as illustrated in FIG. 14, an average of teacher images of some frames may serve as a student image. In FIG. 14, the vertical direction indicates time, and one circle indicates one frame of a teacher image or a student image.

For example, referring to FIG. 14, it is assumed that frames F11 to F13 on the left side are temporally successive frames of teacher images, and the frame F12 is the current frame of the teacher image. In this case, an image obtained by averaging the teacher image of the frame F12, the teacher image of the frame F11, which is temporally one frame before the frame F12, and the teacher image of the frame F13, which is temporally one frame after the frame F12, serves as a student image of the frame F14 at the same phase as that of the frame F12. That is, an average of the pixel values of pixels at the same position in these teacher images serves as the pixel value of a pixel in the student image at the same position as these pixels.

As above, an image obtained by averaging teacher images of temporally successive frames is the teacher image of the current frame in which motion blur is additionally generated. When the input image is converted using a conversion coefficient obtained by performing a learning process using the student image generated in the example illustrated in FIG. 14, it can be expected that the amount of motion blur included in the input image itself is reduced to one-third. Image conversion using the conversion coefficient obtained by performing the learning process using the student image corresponds to conversion of a shutter speed at the time of capturing an image with a camera.

Figure 15:
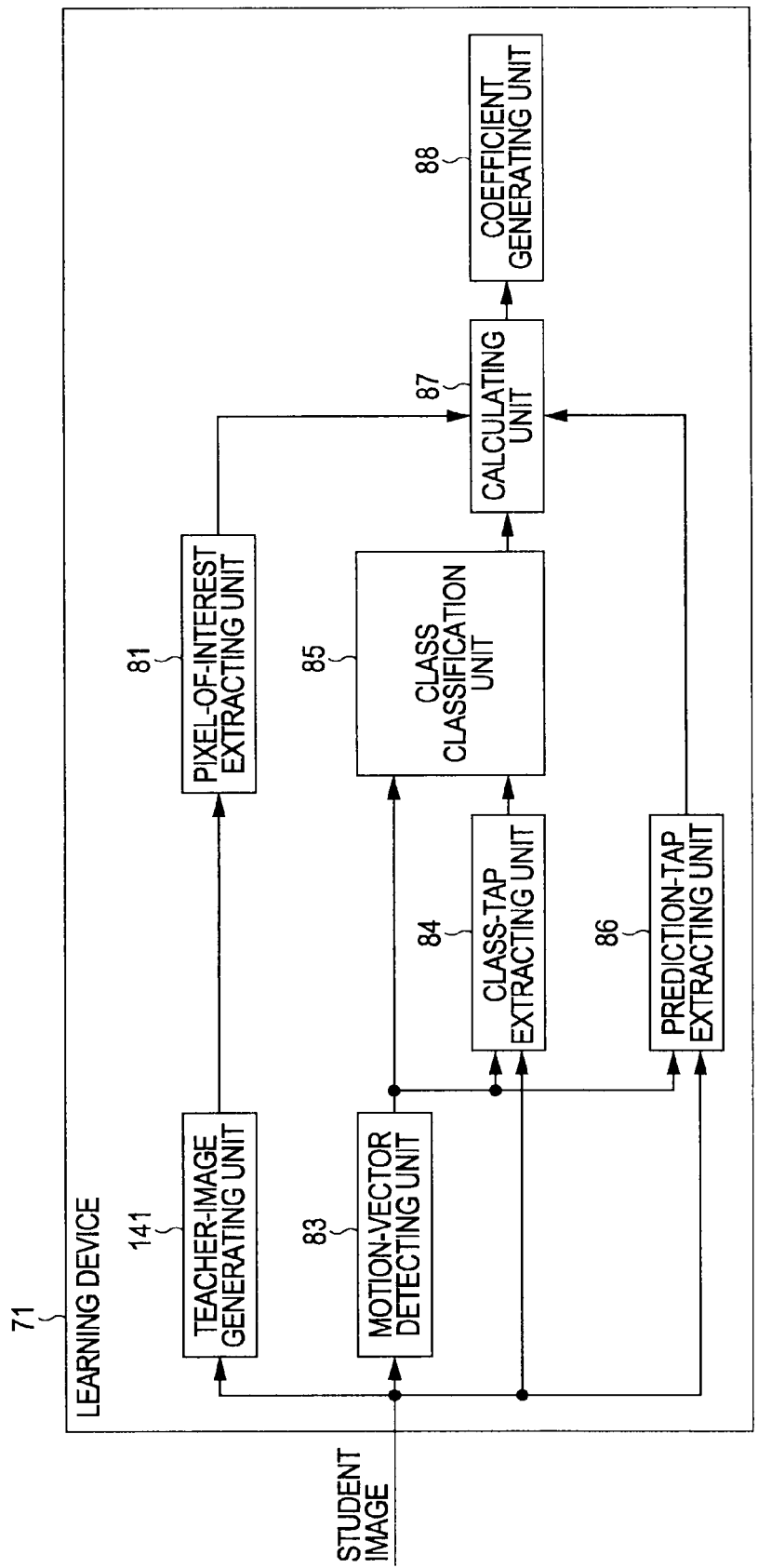
FIG. 15 is a diagram illustrating another structure example of the learning device.

It has been described above that a student image is generated from a teacher image by performing a learning process. Alternatively, a teacher image may be generated from a student image. In such a case, the learning device 71 includes, for example, components illustrated in FIG. 15. In FIG. 15, portions corresponding to those illustrated in FIG. 4 are given the same reference numerals, a detailed description of which is omitted.

The learning device 71 illustrated in FIG. 15 is different from the learning device 71 illustrated in FIG. 4 in that the learning device 71 illustrated in FIG. 15 includes a teacher-image generating unit 141 instead of the student-image generating unit 82. An input image serving as a student image is input to the learning device 71 illustrated in FIG. 15. This student image is supplied to the teacher-image generating unit 141, the motion-vector detecting unit 83, the class-tap extracting unit 84, and the prediction-tap extracting unit 86. The input image input as a student image is the same image as the input image input to the image generating device 11.

The teacher-image generating unit 141 generates a teacher image using the supplied student image, and supplies the teacher image to the pixel-of-interest extracting unit 81. Specifically, the teacher-image generating unit 141 generates a visual image from the input image serving as a student image, and regards an image obtained by adding the difference between the input image and the visual image to the input image as a teacher image. This teacher image is an image that causes the observer to perceive that the input image is displayed, when the teacher image is displayed as it is on the display unit 27 of the image generating device 11.

Figure 16:
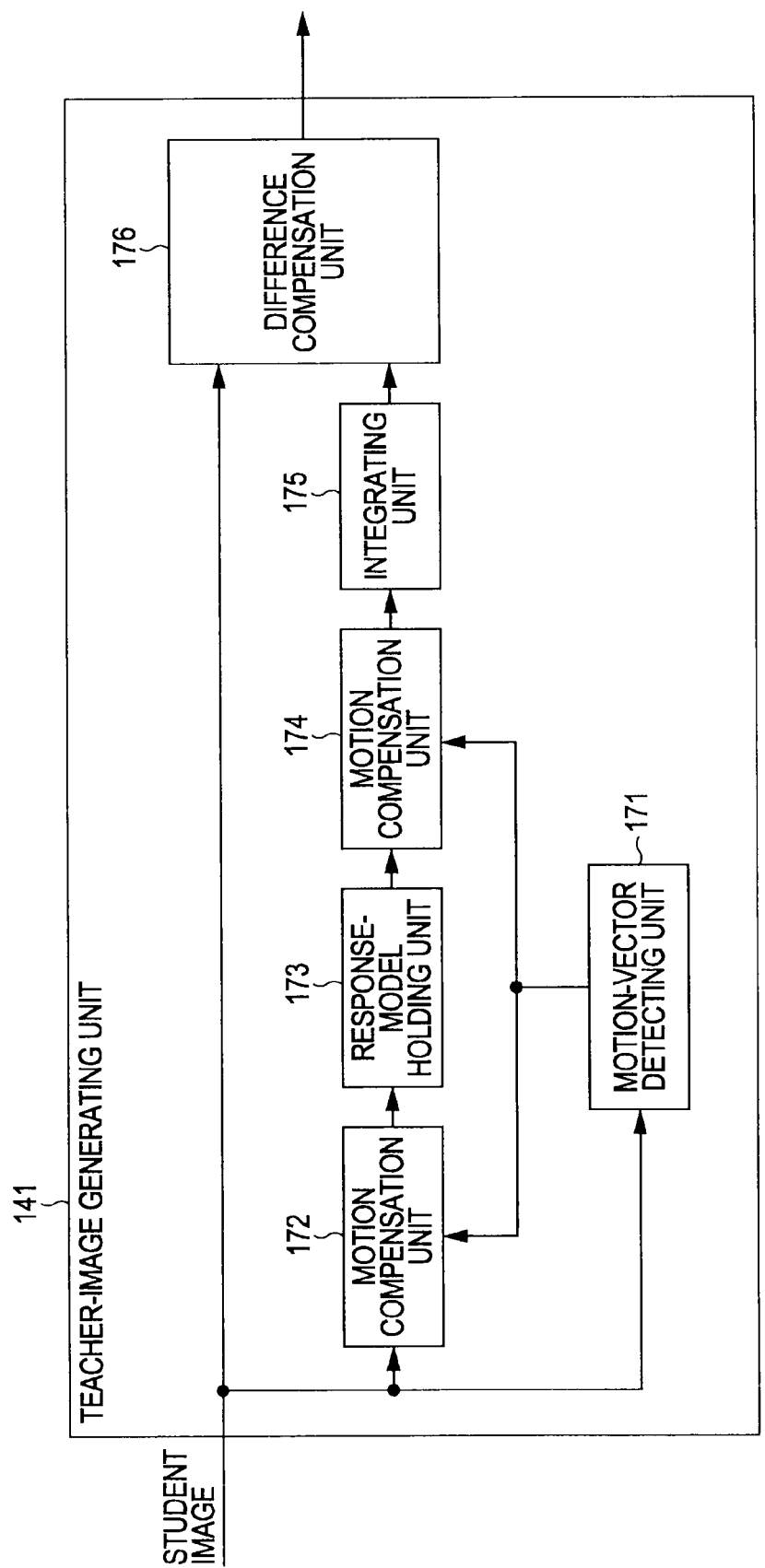
FIG. 16 is a diagram illustrating a structure example of a teacher-image generating unit.

More specifically, the teacher-image generating unit 141 includes components illustrated in FIG. 16. That is, the teacher-image generating unit 141 includes a motion-vector detecting unit 171, a motion compensation unit 172, a response-model holding unit 173, a motion compensation unit 174, an integrating unit 175, and a difference compensation unit 176.

In the teacher-image generating unit 141, the input student image is supplied to the motion-vector detecting unit 171, the motion compensation unit 172, and the difference compensation unit 176. Since the motion-vector detecting unit 171 to the integrating unit 175 in the teacher-image generating unit 141 are the same as the motion-vector detecting unit 111 to the integrating unit 115 illustrated in FIG. 5, a description thereof is omitted. That is, with the motion-vector detecting unit 171 to the integrating unit 175, a visual image for the input image serving as a student image is generated. The generated visual image is supplied from the integrating unit 175 to the difference compensation unit 176.

The difference compensation unit 176 generates a teacher image, that is, more specifically, a teacher image signal, by performing difference compensation on the basis of the supplied input image serving as a student image and the visual image supplied from the integrating unit 175, and supplies the teacher image (teacher image signal) to the pixel-of-interest extracting unit 81.

Figure 17:
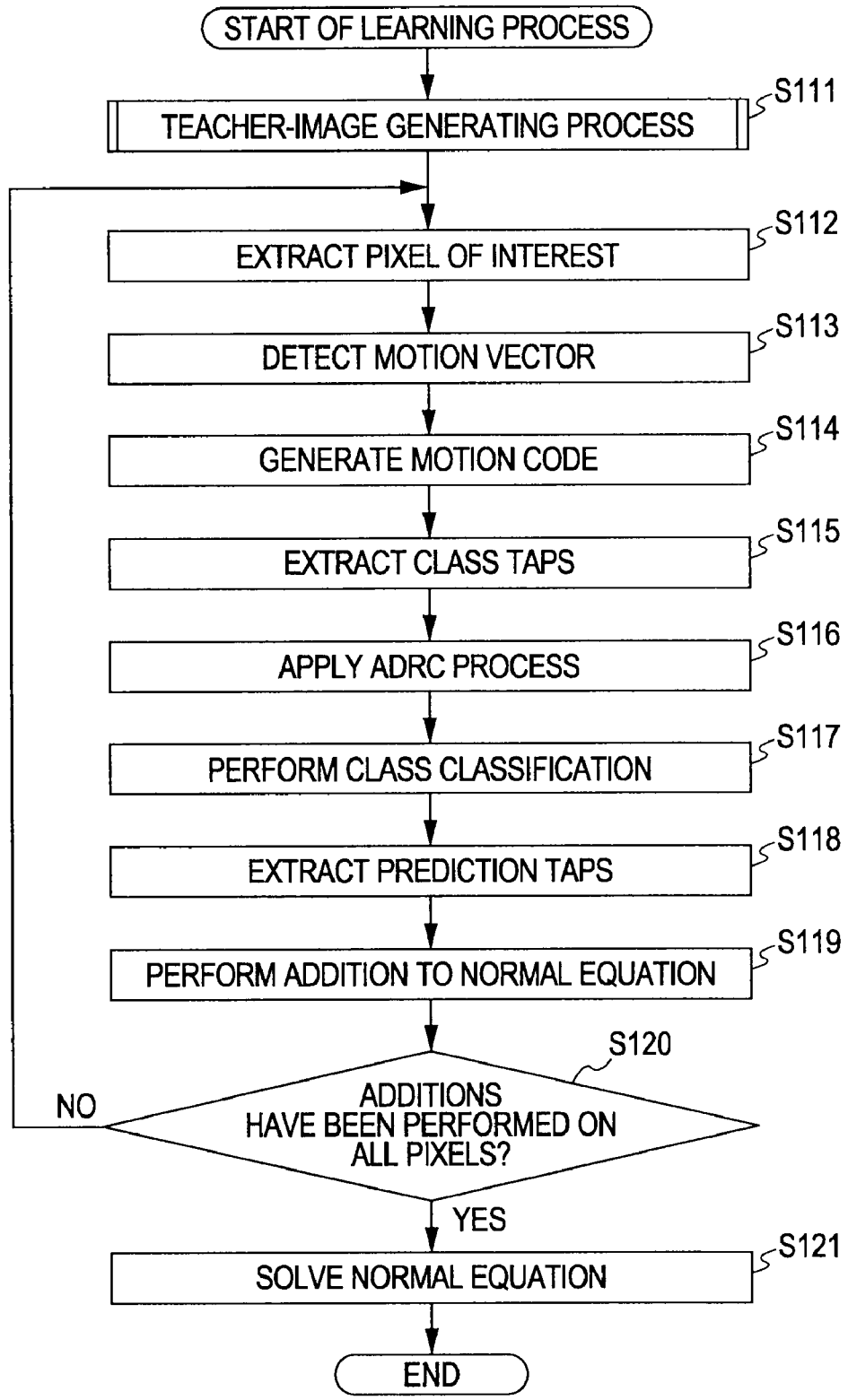
FIG. 17 is a flowchart describing a learning process.

Referring now to the flowchart illustrated in FIG. 17, a learning process performed by the learning device 71 illustrated in FIG. 15 will be described.

When a student image signal is supplied to the learning device 71, in step S111, the teacher-image generating unit 141 performs a teacher-image generating process. The teacher-image generating unit 141 generates a teacher image signal using the supplied student image signal, and supplies the teacher image signal to the pixel-of-interest extracting unit 81. The teacher-image generating process will be described in detail later.

When the teacher image is generated by performing the teacher-image generating process, thereafter, the flow in steps S112 to S121 is performed, and the learning process is completed. Since this flow is the same as that from step S42 to step S51 in FIG. 6, a detailed description thereof is omitted.

That is, the normal equation for each class, which is formulated by using the teacher image and the student image, is solved to obtain a conversion coefficient, and the obtained conversion coefficient is recorded in the coefficient generating unit 88. The conversion coefficient obtained as above is recorded in the coefficient holding unit 25 of the image generating device 11, and is used to generate a display image by performing a class classification adaptive process.

As above, the learning device 71 generates a teacher image from a student image, and obtains a conversion coefficient using the teacher image and the student image.

As above, a conversion coefficient for converting an input image into a higher-quality display image can be obtained with a simpler process by generating a teacher image from a student image and obtaining the conversion coefficient using the teacher image and the student image. Therefore, using the obtained conversion coefficient, the degraded image quality of an image can be more easily improved.

Figure 18:
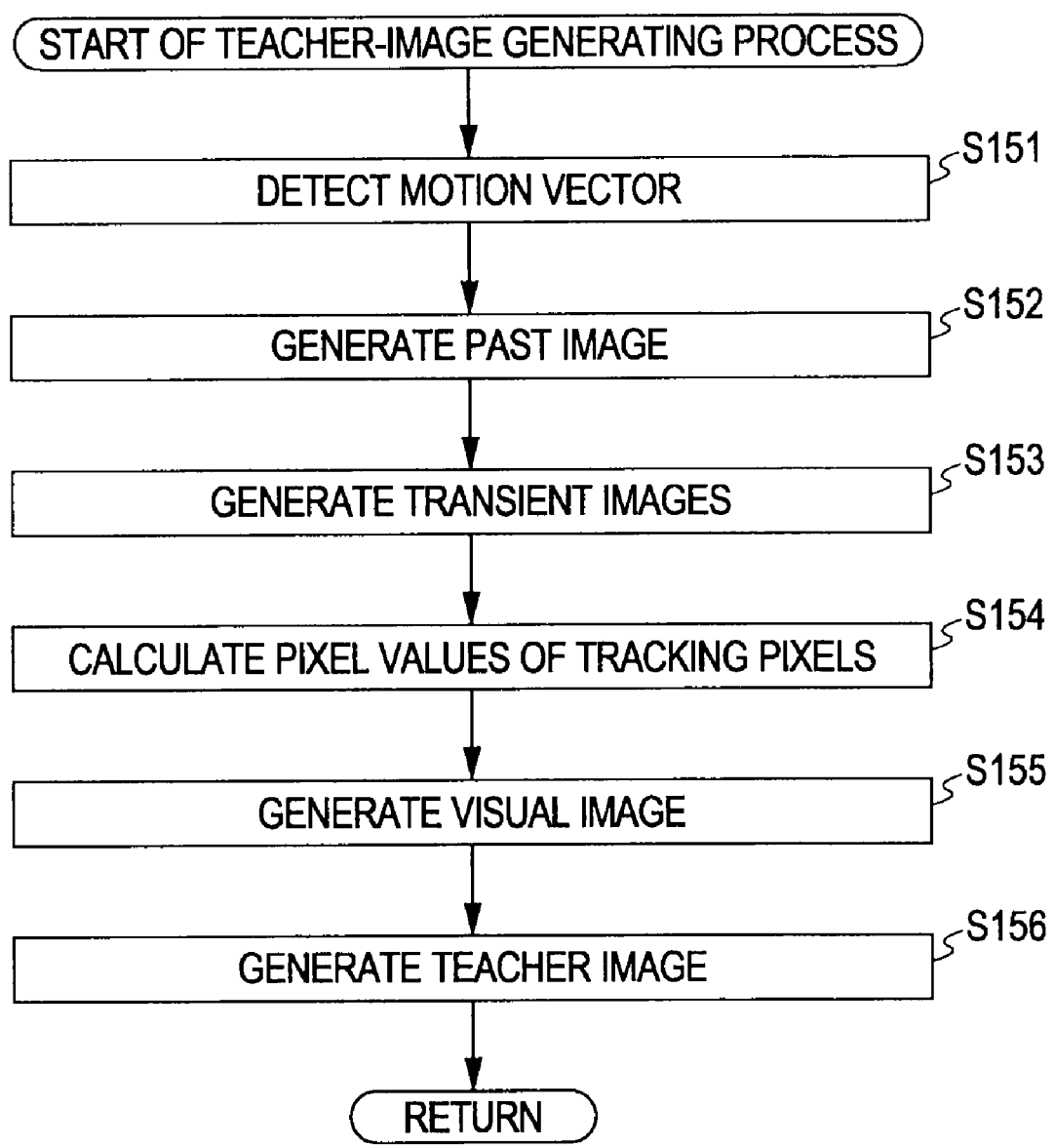
FIG. 18 is a flowchart describing a teacher-image generating process.

Referring now to the flowchart illustrated in FIG. 18, the teacher-image generating process, which is the process correlated with the process in step S111 in FIG. 17, will be described.

Since steps S151 to S155 are the same as steps S81 to S85 in FIG. 7, a description thereof is omitted. That is, from an input image supplied as a student image, a past image and transient images of the input image are generated. From the past image, the transient images, and the input image, a visual image is generated. The generated visual image is supplied from the integrating unit 175 to the difference compensation unit 176.

In step S156, the difference compensation unit 176 performs difference compensation and generates a teacher image on the basis of the supplied student image and the visual image supplied from the integrating unit 175. The difference compensation unit 176 supplies the generated teacher image to the pixel-of-interest extracting unit 81. The teacher-image generating process is completed. The flow proceeds to step S112 in FIG. 17.

For example, for each of the pixels of the student image, the difference compensation unit 176 obtains the difference between the pixel value of a target pixel in the student image and the pixel value of a pixel in the visual image, which is at the same position as that of the target pixel. The difference compensation unit 176 further adds the obtained difference to the pixel value of the target pixel in the student image, and regards a resulting value as the pixel value of a pixel in the teacher image, which is at the same position as that of the target pixel in the student image.

As above, the teacher-image generating unit 141 generates a visual image from an input image serving as a student image, and further generates a teacher image using the generated visual image. When a learning process is performed using the teacher image generated as above, a conversion coefficient for converting the input image into an image that causes the observer to perceive that the input image is displayed on the display unit 27, that is, a vivid image having no motion blur, can be obtained.

For example, it is assumed that a predetermined image is denoted by x, and a function for converting an image displayed on the display unit 27 into an image perceived by an observer who observes the image displayed on the display unit 27 is denoted as a visual filter function f(x). An inverse function of the visual filter function f(x) is denoted by $f^{-1}(x)$, an image displayed on the display unit 27 is denoted by x', and an image perceived by the observer when the image x" is displayed on the display unit 27 is denoted by x".

At this time, when the image x is displayed on the display unit 27, the image x'=the image x, and hence, the image x"=f(x). When a learning process is performed using an image obtained by regarding the image x, that is, the input image, as a student image and substituting this image x for the inverse function $f^{-1}(x)$, that is, an image obtained by adding the difference between the input image and the visual image to the input image, as a teacher image, a conversion coefficient for performing conversion using the inverse function $f^{-1}(x)$ is obtained.

Using the conversion coefficient obtained as above, a class classification adaptive process is performed on the image x, thereby obtaining an image $f^{-1}(x)$. When this image $f^{-1}(x)$ is displayed on the display unit 27, the image x" perceived by the observer becomes the image $x"=f(f^{-1}(x)) \cong x$. Thus, it seems to the observer that the image x having no motion blur is displayed on the display unit 27.

However, this method causes errors when generating the teacher image $f^{-1}(x)$. That is, the generated teacher image $f^{-1}(x)$ may not be an image that displays an image desired to be eventually perceived by the observer. Therefore, as in the learning process performed by the learning device 71 illustrated in FIG. 4, when a conversion coefficient for performing conversion using the inverse function $f^{-1}(x)$ is obtained where a motion blurred image f(x) serves as a student image and an image x that is an input image desired to be eventually perceived by the observer serves as a teacher image, the obtained conversion coefficient has fewer errors. That is, a conversion coefficient for obtaining an image that causes the observer to perceive that an image having a smaller amount of motion blur can be obtained.

In the above description, the example in which an input image is converted using a conversion coefficient into a display image having the same frame rate as that of the input image has been described. However, when such a display image from which motion blur has been removed is displayed, so-called jerkiness may occur, and the smoothness of movement of a moving object in the display image may be diminished.

Figure 19:
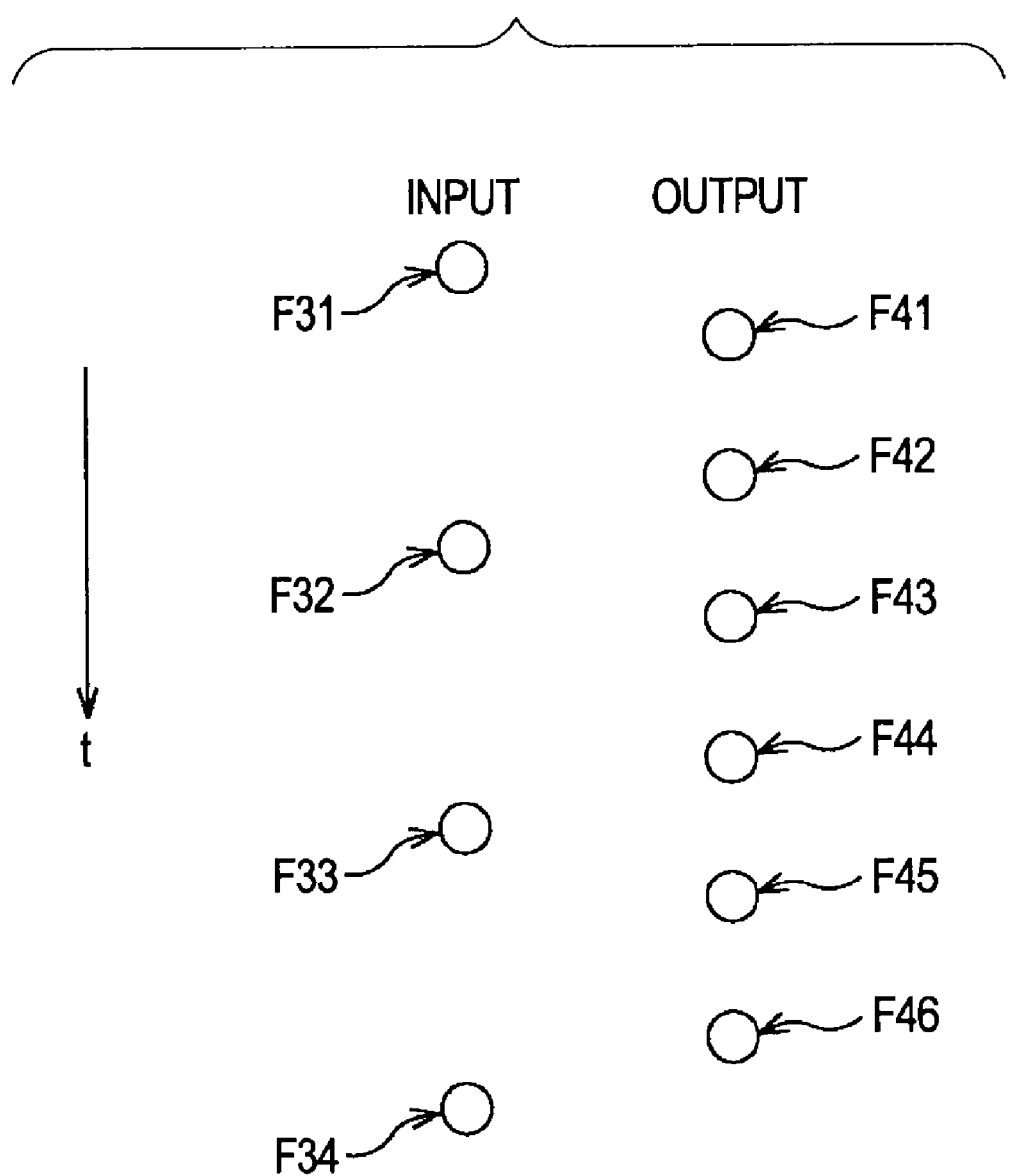
FIG. 19 is a diagram describing frame rate conversion.

Therefore, a display image with a higher frame rate than that of the input image may be generated so that the moving image will be perceived by the observer as if it were more smoothly moving in the display image. In such a case, for example, as illustrated in FIG. 19, a display image having a frame rate twice as high as that of the input image is generated. In FIG. 19, one circle indicates one frame of an input image or a display image, and the vertical direction indicates time.

In the example illustrated in FIG. 19, it is assumed that frames F31 to F34 are frames of input images that are temporally consecutive, and the input images of the frames are displayed at an interval of time t. It is also assumed that the order in which the frames are displayed is the frames F31 to F34 in ascending order of display time.

A class classification adaptive process is performed on the input images of the frames F31 to F34 to generate display images at a double frame rate, that is, more specifically, display images of frames F41 to F46 that are temporally consecutive. It is assumed that the order in which the frames are displayed is the frames F41 to F46 in ascending order of display time, and the display time interval of the display images is t/2.

For example, when the input image of the frame F32 is the input image of the current frame serving as a processing target, the input image of the frame F31, which is the frame immediately before the current frame, and the input image of the frame F32 are processed to generate display images of the frames F41 and F42.

Also, the input images of the frames are out of phase with the display images of the frames. That is, the display times of the frames are different. For example, when the display time of the input image of the frame F31 is t0, the display time of the input image of the frame F32 is (t0+t). In contrast, the display time of the frame F41 is (t0+t/4), and the display time of the frame F42 is (t0+3t/4).

Both the display image of the frame F41 and the display image of the frame F42 are generated from the input images of the frames F31 and F32. However, these display images are out of phase with each other. Thus, different conversion coefficients are necessary in accordance with relative phase positions with respect to the current frame. This is because the relative positional relationship between a pixel serving as a pixel of interest in a display image and pixels serving as prediction taps and class taps in an input image changes in accordance with the relative phase relationship of a display image to be generated with respect to an input image of the current frame.

Of display images of two frames at different phases between the current frame and the previous frame, the display image of the frame at a phase further away from the current frame will be called the display image of the previous-phase frame, and the display image of the frame at a phase closer to the current frame will be called the display image of the subsequent-phase frame. For example, when the current frame is the frame F32, the previous-phase frame is the frame F41, and the subsequent-phase frame is the frame F42.

As above, when a display image having a frame rate twice as high as that of an input image is to be generated, a previous-phase conversion coefficient used to generate a display image of a previous-phase frame and a subsequent-phase conversion coefficient used to generate a display image of a subsequent-phase frame are prepared.

Figure 20:
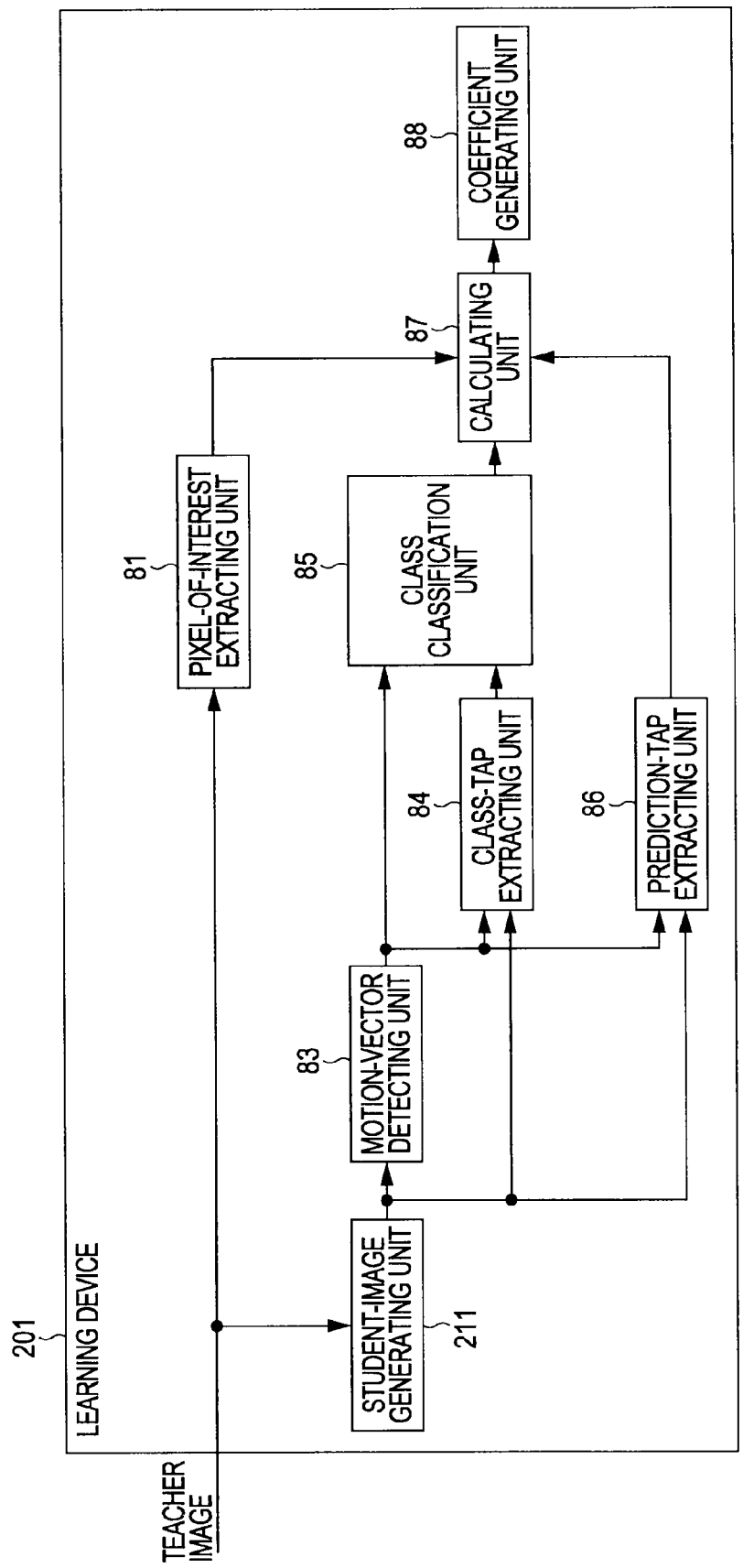
FIG. 20 is a diagram illustrating another structure example of the learning device.

A learning device that generates such a previous-phase conversion coefficient and a subsequent-phase conversion coefficient includes, for example, components illustrated in FIG. 20.

A learning device 201 includes the pixel-of-interest extracting unit 81, the motion-vector detecting unit 83, the class-tap extracting unit 84, the class classification unit 85, the prediction-tap extracting unit 86, the calculating unit 87, the coefficient generating unit 88, and a student-image generating unit 211. In FIG. 20, portions corresponding to those illustrated in FIG. 4 are given the same reference numerals, a detailed description of which is omitted.

An input image serving as a teacher image is supplied to the learning device 201. This input image is supplied to the pixel-of-interest extracting unit 81 and the student-image generating unit 211 of the learning device 201. The student-image generating unit 211 generates a student image using the supplied teacher image of the current frame and a teacher image of a frame that is temporally one frame before the current frame, and supplies the student image to the motion-vector detecting unit 83, the class-tap extracting unit 84, and the prediction-tap extracting unit 86.

Figure 21:
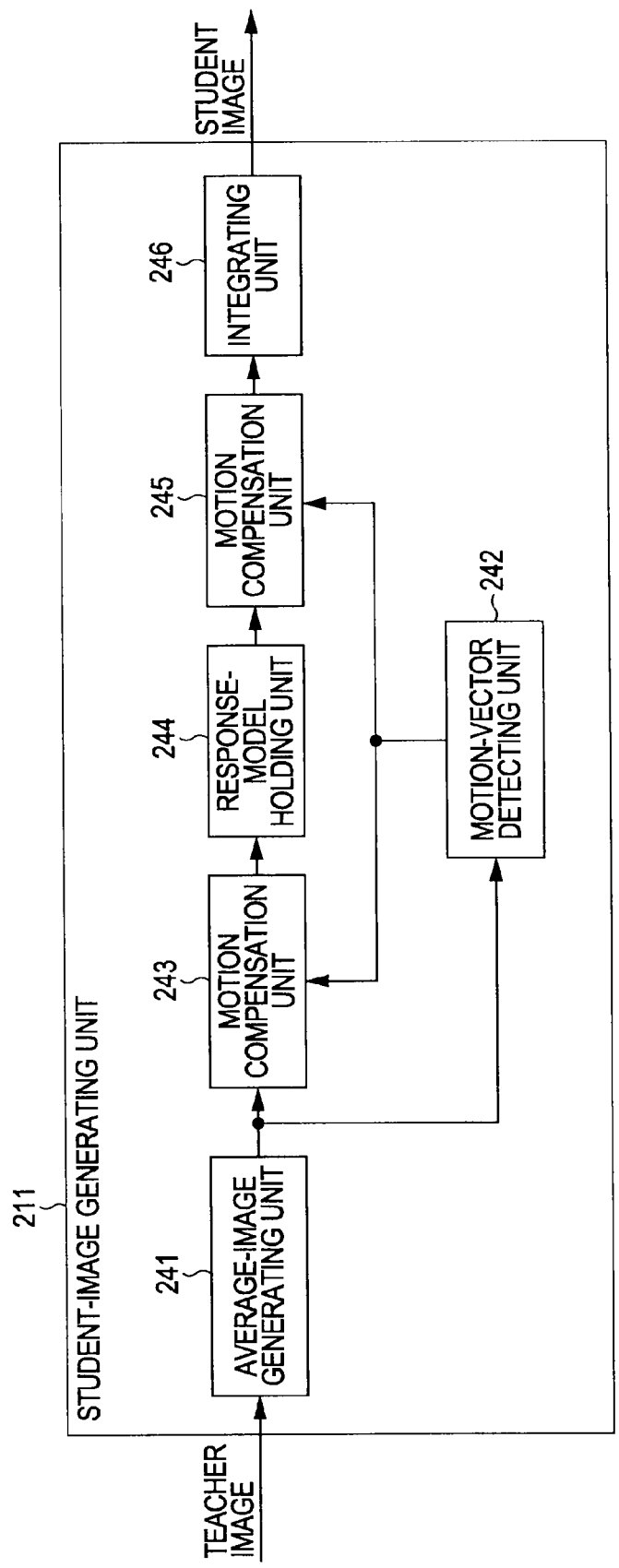
FIG. 21 is a diagram illustrating a structure example of a student-image generating unit.

More specifically, the teacher-image generating unit 211 includes components illustrated in FIG. 21. That is, the student-image generating unit 211 includes an average-image generating unit 241, a motion-vector detecting unit 242, a motion compensation unit 243, a response-model holding unit 244, a motion compensation unit 245, and an integrating unit 246.

The average-image generating unit 241 generates an average image that is an image obtained by averaging teacher images, namely, the supplied teacher image of the current frame and a teacher image of a frame that is temporally one frame before the current frame, and supplies the average image to the motion-vector detecting unit 242 and the motion compensation unit 243. That is, the average-image generating unit 241 is holding the teacher image of the previous frame, which was supplied last time. Using the held teacher image of the previous frame and the supplied teacher image of the current frame, which is supplied this time, the average-image generating unit 241 generates an average image. The pixel value of a pixel in the average image is an average of the pixel values of pixels at the same position in the teacher images of the previous frame and the current frame.

Since the motion-vector detecting unit 242 to the integrating unit 246 are the same as the motion-vector detecting unit 111 to the integrating unit 115 illustrated in FIG. 5, a description thereof is omitted. That is, when the average image generated by the average-image generating unit 241 is supplied to the motion-vector detecting unit 242 and the motion compensation unit 243, the motion-vector detecting unit 242 to the integrating unit 246 generate a visual image for the average image, which serves as a student image, by using the average image.

Referring now to the flowchart illustrated in FIG. 22, a learning process performed by the learning device 201 will be described.

In step S181, the student-image generating unit 211 generates a student image by performing a student-image generating process using an input image serving as a supplied teacher image, and supplies the generated student image to the motion-vector detecting unit 83, the class-tap extracting unit 84, and the prediction-tap extracting unit 86. The student-image generating process will be described in detail later.

In step S182, the pixel-of-interest extracting unit 81 regards a pixel in the supplied teacher image as a pixel of interest, extracts the pixel of interest from the teacher image signal, and supplies the pixel of interest to the calculating unit 87.

In step S183, the motion-vector detecting unit 83 detects, using the student image of the frame supplied from the student-image generating unit 211 and a student image of a frame that is immediately before that frame, a motion vector of a pixel, correlated with the pixel of interest, in the student image of the frame supplied from the student-image generating unit 211.

When the frame of the student image supplied this time from the student-image generating unit 211 serves as the current frame and a frame immediately before the current frame serves as the previous frame, a pixel that is correlated with the pixel of interest and that is in the student image refers to a pixel that is in the student image of the current frame and that serves as a movement destination of a pixel in the student image of the previous frame. Specifically, this is such a pixel that the pixel of interest is positioned on the motion vector connecting the pixel before the movement and the pixel after the movement.

That is, it is assumed that a pixel in the student image of the current frame, which is at the same position as that of a predetermined pixel in the student image of the previous frame, will be called a movement-source pixel, and a pixel in the student image of the current frame, which serves as a movement destination of the predetermined pixel in the student image of the previous frame, that is, a pixel in the student image of the current frame at which a portion of a moving object displayed at the predetermined pixel is displayed, will be called a movement-destination pixel. In this case, a vector connecting the movement-source pixel and the movement-destination pixel in the student image of the current frame becomes a motion vector of the movement-destination pixel. When a pixel in the student image of the current frame, which is at the same position as that of the pixel of interest, is on the motion vector of the movement-destination pixel, the movement-destination pixel becomes a pixel correlated with the pixel of interest.

The motion vector of the pixel in the student image, which is correlated with the pixel of interest and which is obtained in the foregoing manner, is supplied from the motion-vector detecting unit 83 to the class-tap extracting unit 84, the class classification unit 85, and the prediction-tap extracting unit 86.

In step S184, the class classification unit 85 generates a motion code on the basis of the motion vector from the motion-vector detecting unit 83.

In step S185, the class-tap extracting unit 84 extracts class taps from the student image on the basis of the motion vector from the motion-vector detecting unit 83 and the student image from the student-image generating unit 211 in correlation with the pixel of interest in the teacher image.

Figure 23A:
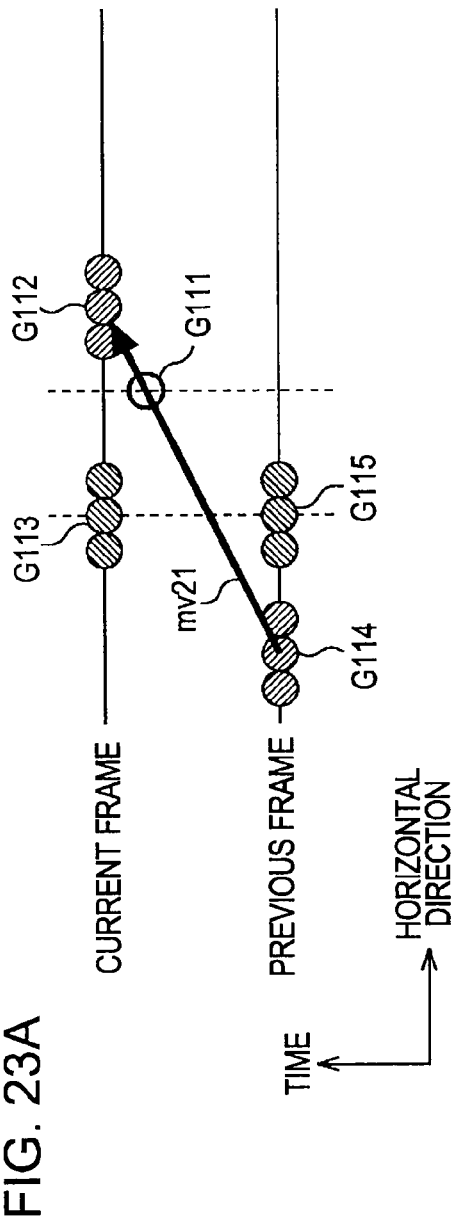
FIGS. 23A to 23C are diagrams illustrating examples of class taps and prediction taps.

For example, when the subsequent-phase conversion coefficient is to be generated by performing a learning process, as illustrated in FIG. 23A, a pixel G112 in the student image of the current frame, which is correlated with a pixel of interest G111, a pixel G113 in the student image of the current frame, and a pixel G114 and a pixel G115 in the student image of the previous frame are extracted as class taps. In FIG. 23A, the vertical direction indicates time, and the horizontal direction indicates the position of each pixel in a student image or a teacher image. One circle indicates one pixel.

The pixel G112 is a pixel in the student image of the current frame, which is correlated with the pixel of interest G111. The pixel G113 is a pixel positioned at a distance of, from the pixel G112, k times the size MV21 of a motion vector mv21 of the pixel G112 in a direction opposite to the motion vector mv21 (where 0<k≦1).

The pixel G114 is a pixel positioned at a distance of kMV21 in a direction opposite to the motion vector mv21 from a pixel in the student image of the previous frame, which is at the same position as that of the pixel G112. The pixel G115 is a pixel positioned at a distance of, from the pixel G114 in the student image of the previous frame, kMV21 in a direction of the motion vector mv21.

The pixels G112 to G115 constituting the class taps extracted from the student images in such a manner are supplied from the class-tap extracting unit 84 to the class classification unit 85.

For the pixels G112 to G115 serving as the class taps, the pixels G112 to G115 and pixels that are horizontally and vertically adjacent thereto are extracted as prediction taps. That is, as illustrated in the left portion of FIG. 23B, the pixel G112 in the student image of the current frame and four pixels that are adjacent to (on the left of, on the right of, above, and below) the pixel G112 are extracted as prediction taps. Also, as illustrated in the right portion of FIG. 23B, the pixel G114 in the student image of the previous frame and four pixels that are adjacent to (on the left of, on the right of, above, and below) the pixel G114 are extracted as prediction taps.

Figure 23B:
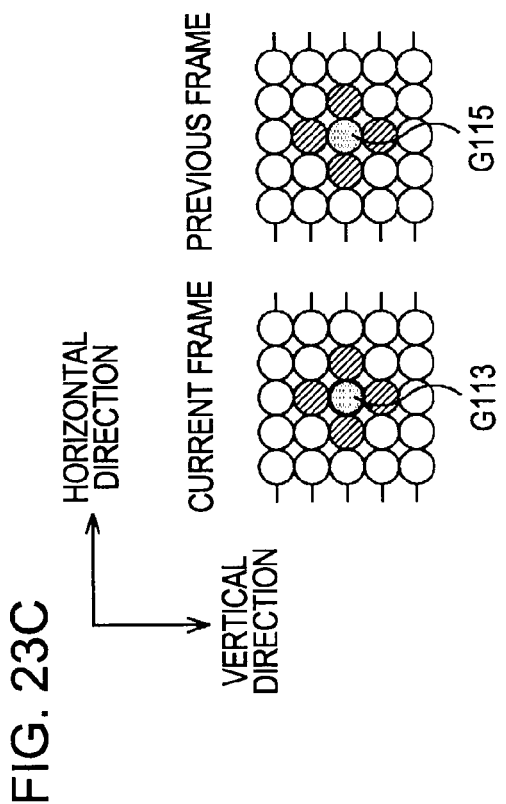
Figure 23C:
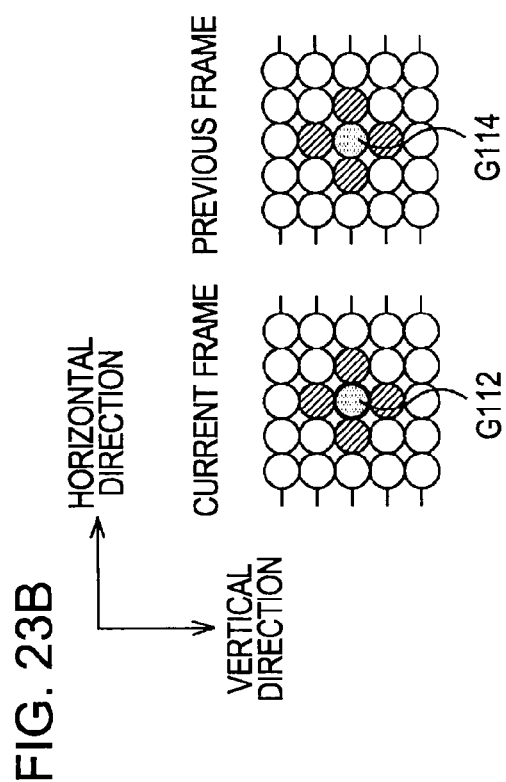

Furthermore, as illustrated in the left portion of FIG. 23C, the pixel G113 in the student image of the current frame and four pixels that are adjacent to (on the left of, on the right of, above, and below) the pixel G113 are extracted as prediction taps. As illustrated in the right portion of FIG. 23C, the pixel G115 in the student image of the previous frame and four pixels that are adjacent to (on the left of, on the right of, above, and below) the pixel G115 are extracted as prediction taps. In FIGS. 23B and 23C, pixels serving as prediction taps are hatched with slanted lines.

As above, the learning device 201 extracts pixels that are spatially or temporally near a pixel in the student image, which is at the same position as that of the pixel of interest, as class taps or prediction taps.

Figure 22:
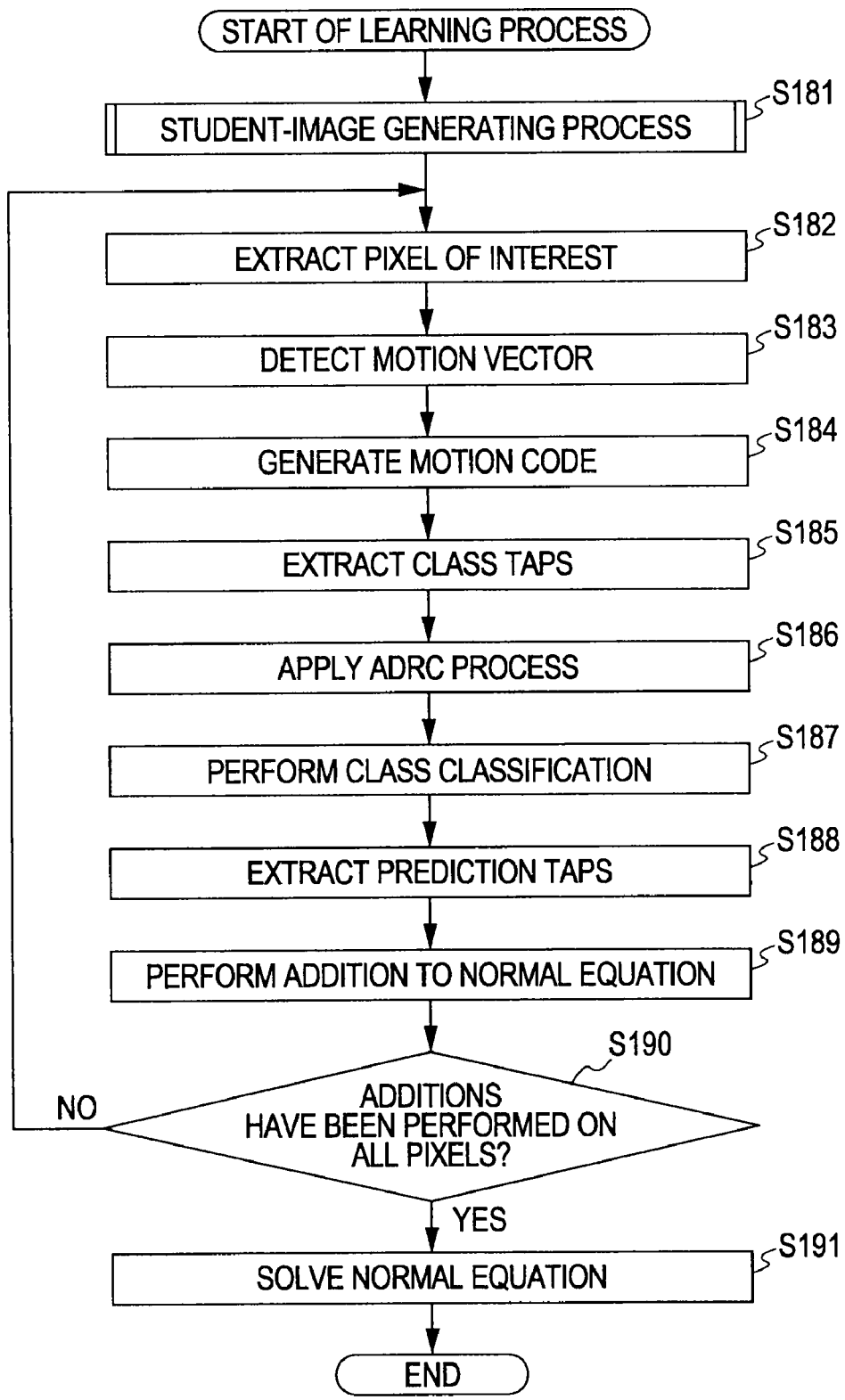
FIG. 22 is a flowchart describing a learning process.

Referring back to the flowchart illustrated in FIG. 22, when the class taps are extracted, thereafter, the flow in steps S186 to S191 is performed, and the learning process is completed. Since this flow is the same as that from steps S46 to S51 in FIG. 6, a detailed description thereof is omitted. In step S188, for example, the pixels G112 to G115 and pixels that are adjacent thereto, which are illustrated in FIGS. 23B and 23C, are extracted as prediction taps.

As above, the learning device 201 generates a visual image serving as a student image from an input image serving as a teacher image, and obtains a conversion coefficient for each phase, that is, a previous-phase conversion coefficient or a subsequent-phase conversion coefficient, by using the teacher image and the student image. A learning process for obtaining a previous-phase conversion coefficient and a learning process for obtaining a subsequent-phase conversion coefficient are separately performed.

As above, a conversion coefficient for converting an input image into a higher-quality display image can be obtained with a simpler process by obtaining the conversion coefficient using an input image as a teacher image and a visual image as a student image. Therefore, using the obtained conversion coefficient, the degraded image quality of an image can be more easily improved. Furthermore, when an input image is converted into a display image by using a having a frame rate twice as high as that of the input image can be obtained, thereby suppressing jerkiness from occurring.

Referring now to the flowchart illustrated in FIG. 24, the student-image generating process, which is the process correlated with the process in step S181 in FIG. 22, will be described.

In step S221, the average-image generating unit 241 generates an average image using a teacher image of a frame that is supplied this time and a teacher image of a frame that is temporally one frame before that frame, and supplies the average image to the motion-vector detecting unit 242 and the motion compensation unit 243.

Figure 25:
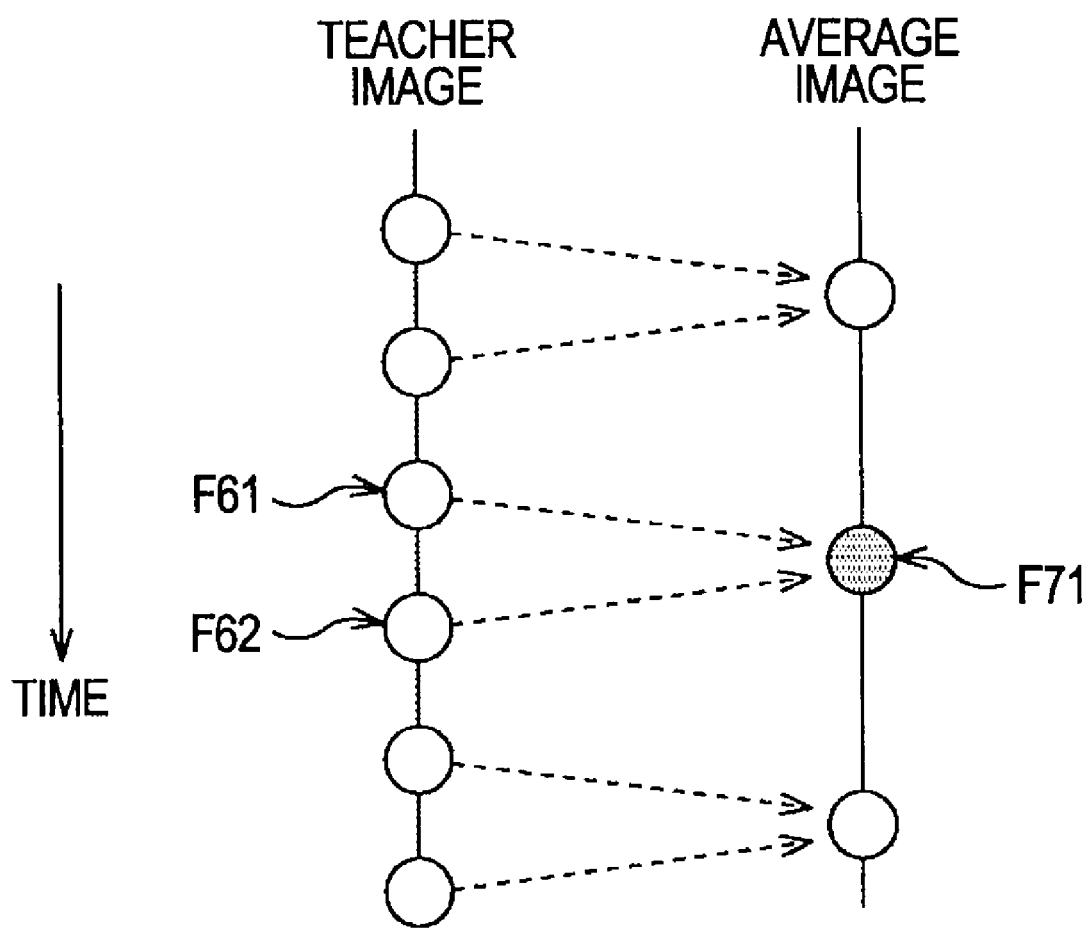
FIG. 25 is a diagram describing generation of an average image.

For example, as illustrated in FIG. 25, teacher images of two frames F61 and F62 that are temporally consecutive are averaged to generate an average image of a frame F71 at a phase between the frames F61 and F62. In FIG. 25, the vertical direction indicates time, and one circle indicates one frame of a teacher image or an average image.

In the example illustrated in FIG. 25, an average image having an amount of motion blur that is twice as high as that of the teacher image is obtained. The teacher image of the frame F61 serves as a subsequent-phase frame for a student image that is obtained from the generated average image of the frame F71. That is, when a student image obtained from the average image of the frame F71 and a student image of a frame that is immediately before the frame F71 are used for learning, at the time of learning a subsequent-phase conversion coefficient, the input image of the frame F61 is used as a teacher image; and, at the time of learning a previous-phase conversion coefficient, the input image of the frame that is immediately before the frame F61 is used as a teacher image.

Figure 24:
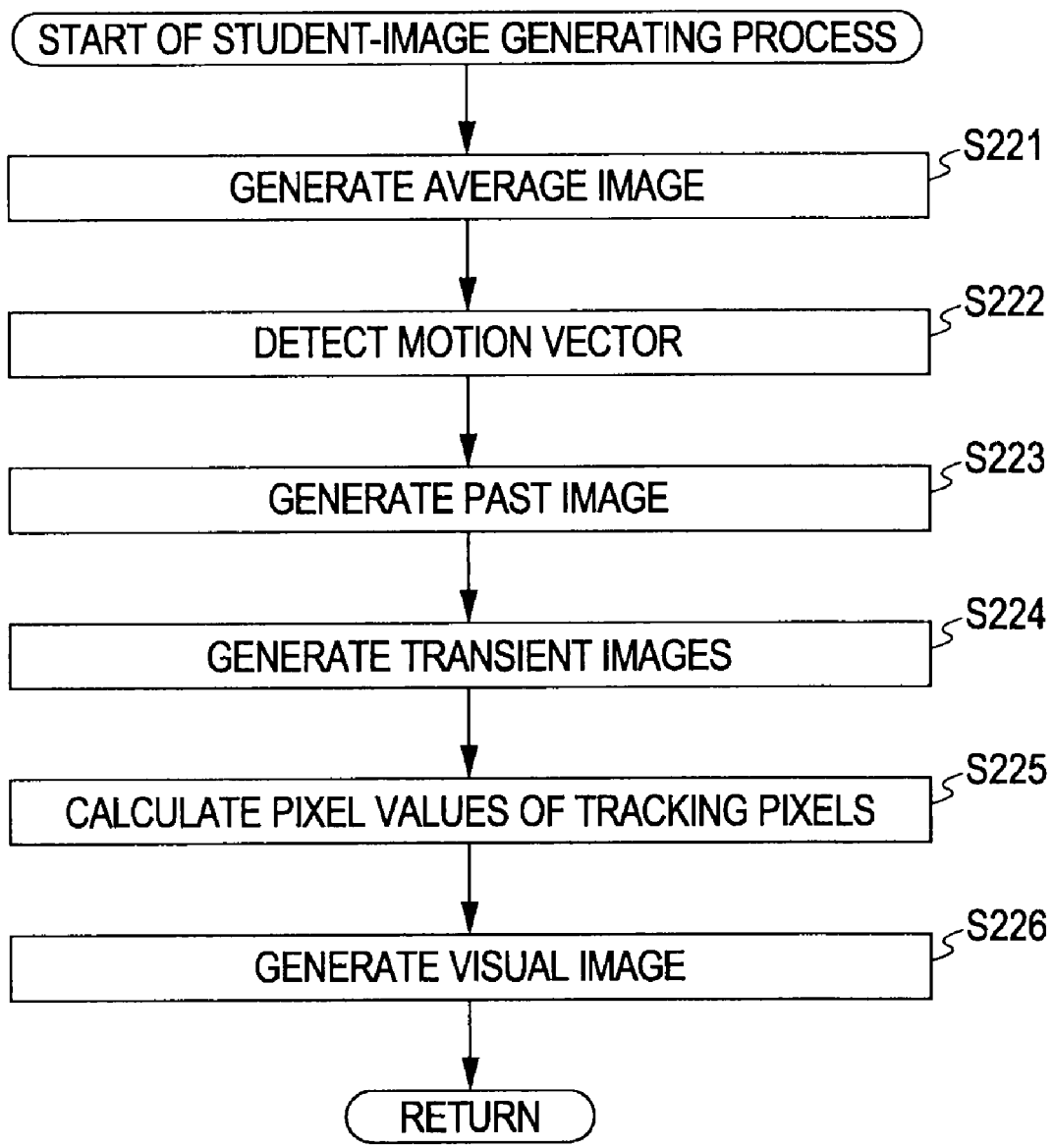
FIG. 24 is a flowchart describing a student-image generating process.

Referring back to the flowchart illustrated in FIG. 24, when the average image is generated, thereafter, the flow in steps S222 to S226 is performed. Since this flow is the same as that from steps S81 to S85 in FIG. 7, a detailed description thereof is omitted. That is, from the generated average image, a visual image for the average image is generated as a student image.

In step S226, the student image is generated. When the student image is supplied from the integrating unit 246 to the motion-vector detecting unit 83, the class-tap extracting unit 84, and the prediction-tap extracting unit 86, the student-image generating process is completed, and the flow proceeds to step S182 in FIG. 22.

As above, an average image having a frame rate that is half of that of the teacher image is generated from the teacher image, and a visual image serving as a student image is generated from the average image.

Figure 26:
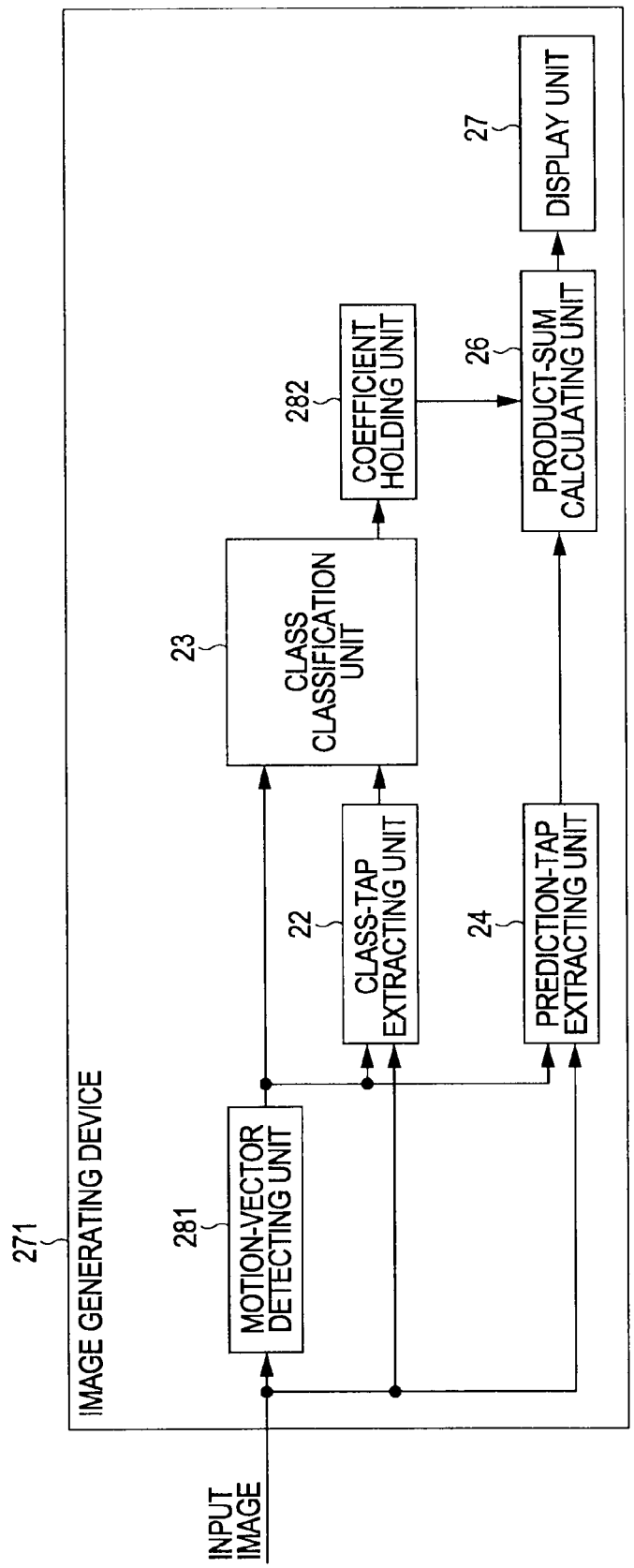
FIG. 26 is a diagram illustrating another structure example of the image generating device.

An image generating device for converting an input image into a display image using a previous-phase conversion coefficient and a subsequent-phase conversion coefficient, which are generated by the learning device 201 in the foregoing manner, includes, for example, components illustrated in FIG. 26.

An image generating device 271 includes the class-tap extracting unit 22, the class classification unit 23, the prediction-tap extracting unit 24, the product-sum operation unit 26, the display unit 27, a motion-vector detecting unit 281, and a coefficient holding unit 282. In FIG. 26, portions corresponding to those illustrated in FIG. 1 are given the same reference numerals, a detailed description of which is omitted.

An input image is supplied to the motion-vector detecting unit 281, the class-tap extracting unit 22, and the prediction-tap extracting unit 24 of the image generating device 271. The motion-vector detecting unit 281 regards a pixel in a display image to be generated as a pixel of interest and, on the basis of the supplied input image, detects a motion vector of a pixel in the input image, which is correlated with the pixel of interest.

The pixel in the input image, which is correlated with the pixel of interest, is a pixel having, among pixels of the input image, the same positional relationship as a pixel in a student image, which is correlated with the pixel of interest at the time of a learning process, relative to the pixel of interest. For example, when the pixel G111 illustrated in FIG. 23A is a pixel of interest in a display image, and when the pixel G112 is a pixel in an input image of a supplied frame, a pixel in the input image, which is correlated with the pixel of interest, is the pixel G112.

The motion-vector detecting unit 281 supplies the detected motion vector to the class-tap extracting unit 22, the class classification unit 23, and the prediction-tap extracting unit 24.

The coefficient holding unit 282 is holding a previous-phase conversion coefficient and a subsequent-phase conversion coefficient, which are generated by the learning device 201. The coefficient holding unit 282 supplies the held previous-phase conversion coefficient or subsequent-phase conversion coefficient, in accordance with a class code from the class classification unit 23, to the product-sum calculating unit 26.

Figure 27:
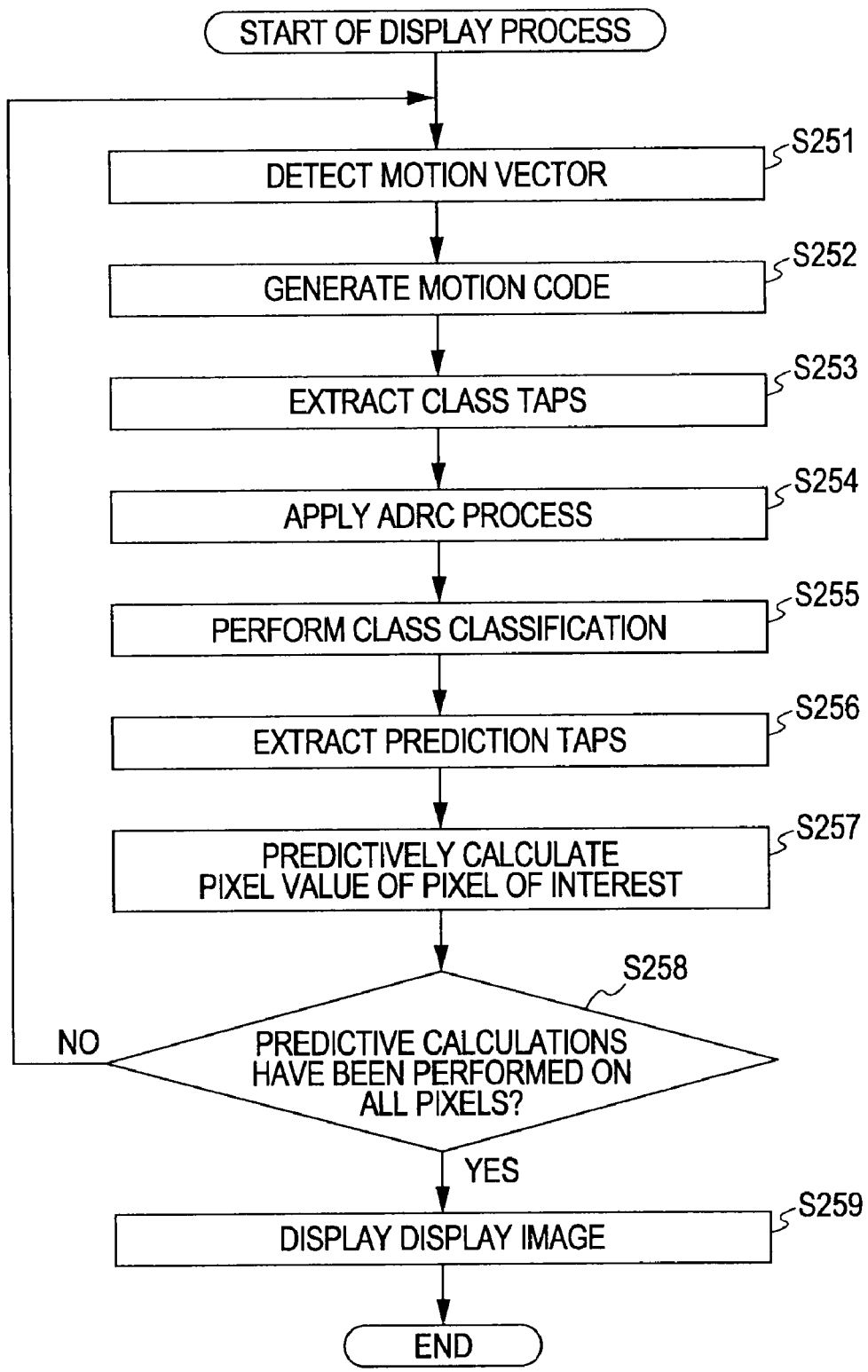
FIG. 27 is a flowchart describing a display process.

When an input image is supplied to the image generating device 271 as constructed above, the image generating device 271 starts a display process of generating and displaying a display image. Hereinafter, with reference to the flowchart illustrated in FIG. 27, the display process performed by the image generating device 271 will be described.

In step S251, the motion-vector detecting unit 281 regards a pixel in a display image to be generated as a pixel of interest, and, using an input image of a supplied frame and an input image of a frame that is immediately before the supplied frame, detects a motion vector of a pixel in the input image of the supplied frame, which is correlated with the pixel of interest, by performing, for example, block matching or a gradient method. The motion-vector detecting unit 281 supplies the detected motion vector to the class classification unit 23, the class-tap extracting unit 22, and the prediction-tap extracting unit 24.

Thereafter, the flow in steps S252 to S259 is performed, and the display process is completed. Since this flow is the same as that from steps S12 to S19 in FIG. 2, a detailed description thereof is omitted.

Some of pixels that are positioned temporally or spatially near the pixel in the input image, which is at the same position as that of the pixel of interest, are extracted as class taps or prediction taps. For example, when the pixel G111 illustrated in FIG. 23A is a pixel of interest in the display image, and when the pixel G112 is a pixel correlated with the pixel of interest, which is in the input image of the supplied frame, the pixels G112 to G115 are extracted as class taps from the input image. The pixels G112 to G115 and pixels that are adjacent thereto are extracted as prediction taps from the input image.

Furthermore, when a display image of a previous-phase frame is to be generated, the coefficient holding unit 282 supplies a previous-phase conversion coefficient specified by a class code to the product-sum calculating unit 26. Similarly, when a display image of a subsequent-phase frame is to be generated, the coefficient holding unit 282 supplies a subsequent-phase conversion coefficient specified by a class code to the product-sum calculating unit 26.

As above, the image generating device 271 generates a previous-phase display image or a subsequent-phase display image from a supplied input image, and displays the previous-phase or subsequent-phase display image on the display unit 27. A display process of generating and displaying a previous-phase or subsequent-phase display image is performed on a frame-by-frame basis.

In the above description, it has been described that, at the time of a previous-phase or subsequent-phase conversion coefficient learning process, a student image is generated from an input image serving as a teacher image. However, at the time of a learning process, a student image and a teacher image may be generated from an input image.

Figure 28:
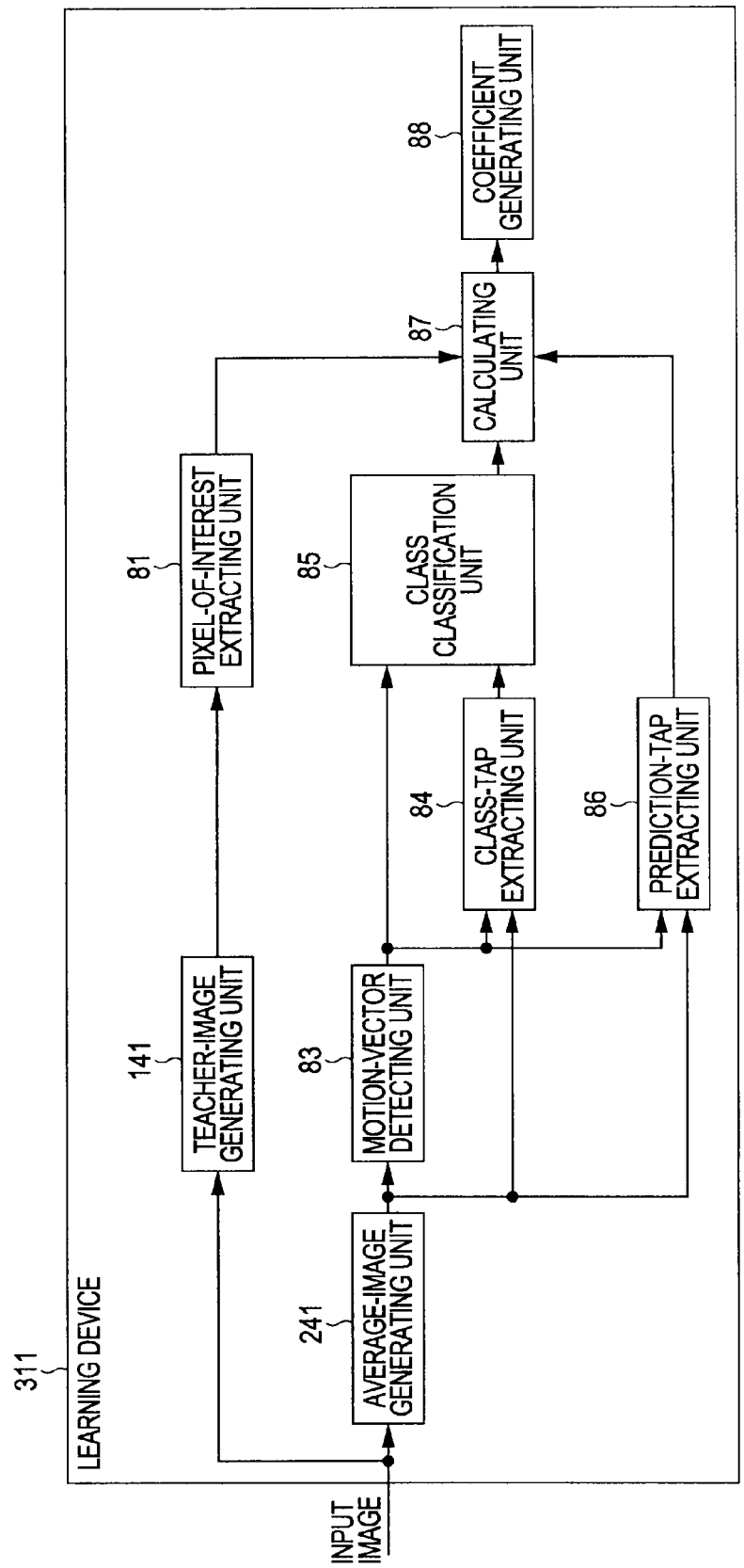
FIG. 28 is a diagram illustrating another structure example of the learning device.

In such a case, for example, a learning device includes components illustrated in FIG. 28. A learning device 311 illustrated in FIG. 28 includes the average-image generating unit 241, the teacher-image generating unit 141, the pixel-of-interest extracting unit 81, the motion-vector detecting unit 83, the class-tap extracting unit 84, the class classification unit 85, the prediction-tap extracting unit 86, the calculating unit 87, and the coefficient generating unit 88. In FIG. 28, portions corresponding to those illustrated in FIGS. 15, 20, and 21 are given the same reference numerals, a detailed description of which is appropriately omitted.

An input image is supplied to the average-image generating unit 241 and the teacher-image generating unit 141 of the learning device 311. The average-image generating unit 241 generates an average image from the supplied input image, and supplies the generated average image as a student image to the motion-vector detecting unit 83, the class-tap extracting unit 84, and the prediction-tap extracting unit 86.

The teacher-image generating unit 141 generates a visual image from the supplied input image, and regards an image obtained by adding the difference between the input image and the visual image to the input image as a teacher image. This teacher image is an image that causes the observer to perceive that the input image is displayed, when the teacher image is displayed as it is on the display unit 27 of the image generating device 271. The teacher-image generating unit 141 supplies the generated teacher image to the pixel-of-interest extracting unit 81.

Figure 29:
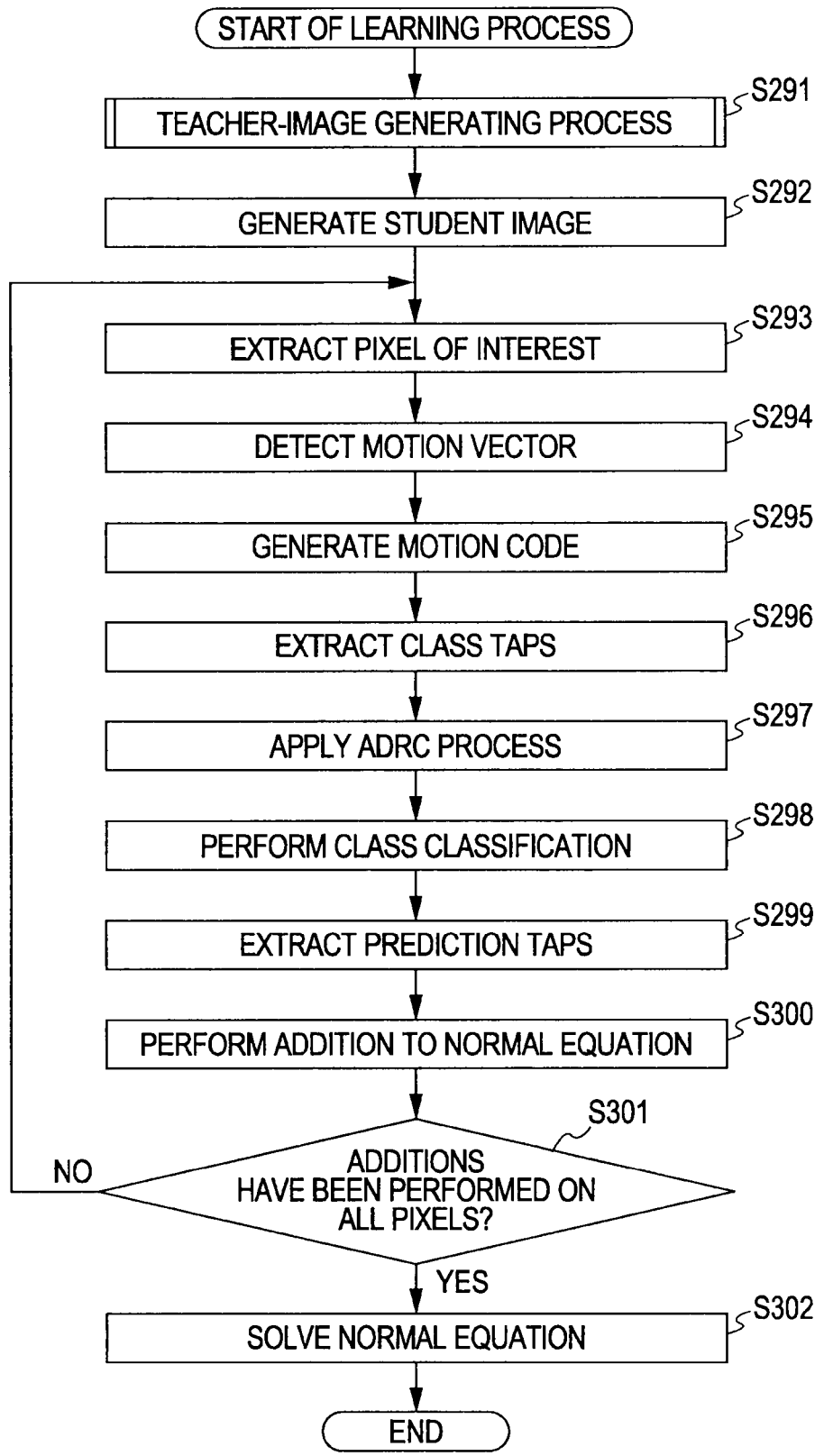
FIG. 29 is a flowchart describing a learning process.

Referring now to the flowchart illustrated in FIG. 29, a learning process performed by the learning device 311 will be described. With this learning device 311, a previous-phase or subsequent-phase conversion coefficient is generated.

In step S291, the teacher-image generating unit 141 generates a teacher image by performing a teacher-image generating process using the supplied input image, and supplies the generated teacher image to the pixel-of-interest extracting unit 81. Since the teacher-image generating process is the same as that in step S111 of FIG. 17, that is, the process described with reference to the flowchart illustrated in FIG. 18, a detailed description thereof is omitted.

In step S292, the average-image generating unit 241 generates a student image from the supplied input image, and supplies the generated student image to the motion-vector detecting unit 83, the class-tap extracting unit 84, and the prediction-tap extracting unit 86. That is, the average-image generating unit 241 generates an average image using the input image of the frame that is supplied this time and an input image of a frame that is temporally one frame before that frame, and regards the average image as a student image.

When the student image is generated, thereafter, the flow in steps S293 to S302 is performed, and the learning process is completed. Since this flow is the same as that from steps S182 to S191 in FIG. 22, a detailed description thereof is omitted.

As above, the learning device 311 generates a student image and a teacher image from a supplied input image, and obtains a conversion coefficient for each phase, that is, a previous-phase conversion coefficient or a subsequent-phase conversion coefficient. A learning process for obtaining a previous-phase conversion coefficient and a learning process for obtaining a subsequent-phase conversion coefficient are separately performed.

As above, a conversion coefficient for converting an input image into a higher-quality display image can be obtained with a simpler process by generating a student image and a teacher image from the supplied input image and obtaining the conversion coefficient. Therefore, using the obtained conversion coefficient, the degraded image quality of an image can be more easily improved.

A series of the foregoing processes may be executed by hardware or software. When the series of processes is to be executed by software, a program constituting the software is installed from a program recording medium into a computer embedded in dedicated hardware or, for example, a general personal computer that can execute various functions by using various programs installed therein.

FIG. 30 is a block diagram illustrating a structure example of hardware of a computer that executes the series of the above-described processes by using a program.

In the computer, a central processing unit (CPU) 501, a read-only memory (ROM) 502, and a random access memory (RAM) 503 are interconnected by a bus 504.

Furthermore, an input/output interface 505 is connected to the bus 504. An input unit 506 including a keyboard, a mouse, and a microphone, an output unit 507 including a display and a loudspeaker, a recording unit 508 including a hard disk and a non-volatile memory, a communication unit 509 including a network interface, and a drive 510 that drives a removable medium 511 including a magnetic disk, an optical disk, a magneto-optical disk, or a semiconductor memory are connected to the input/output interface 505.

In the computer constructed as above, for example, the CPU 501 loads a program recorded in the recording unit 508 into the RAM 503 via the input/output interface 505 and the bus 504 and executes the program, thereby executing the series of the above-described processes.

The program executed by the computer (CPU 501) is provided by, for example, recording it on the removable medium 511, which is a packaged medium including a magnetic disk (including a flexible disk), an optical disk (including a compact-disc read-only memory (CD-ROM) or a digital versatile disc (DVD)), a magneto-optical disk, or a semiconductor memory, or via a wired or wireless transmission medium, such as a local area network (LAN), the Internet, or digital satellite broadcasting.

The program can be installed into the recording unit 508 via the input/output interface 505 by mounting the removable medium 511 onto the drive 510. Alternatively, the program may be received at the communication unit 509 via a wired or wireless transmission medium and installed into the recording unit 508. Alternatively, the program may be installed in advance in the ROM 502 or the recording unit 508.

The program executed by the computer may be a program with which processes are performed time sequentially in accordance with the order described in the specification, or may be a program with which processes are executed in parallel or at necessary times, such as when called.

The embodiments of the present invention are not limited to the foregoing embodiments, and various modifications can be made without departing from the scope of the present invention.

The present application contains subject matter related to that disclosed in Japanese Priority Patent Application JP 2008-173459 filed in the Japan Patent Office on Jul. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A coefficient generating device that generates a conversion coefficient for converting an input image signal of an input image into a display image signal of a display image perceived by an observer as if the input image were displayed when the display image is displayed on predetermined display means, comprising:

past-image generating means for generating a past image signal of a past image correlated with a teacher image of a frame that is one frame before a teacher image correlated with the display image, on the basis of a teacher image signal of the teacher image and a motion vector detected in the teacher image, the teacher image being used to obtain the conversion coefficient;

transient-image generating means for generating, on the basis of the teacher image signal and the past image signal, in a case where the past image and then the teacher image are to be displayed on the display means, a transient image signal of a transient image to be displayed on the display means in a period in which displaying is switched from the past image to the teacher image;

visual-image generating means for generating, using the past image signal, the transient image signal, the teacher image signal, and the motion vector, a visual image signal of a visual image perceived by the observer when the teacher image is displayed on the display means, the visual image serving as a student image correlated with the input image, the student image being used to obtain the conversion coefficient, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image; and calculating means for obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

2. The coefficient generating device according to claim 1, wherein the transient-image generating means generates the transient image signal using a model indicating a light-emitting characteristic of the display means, the teacher image signal, and the past image signal.

3. The coefficient generating device according to claim 2, wherein the calculating means includes:

class-tap extracting means for extracting, from a student image signal of the student image, pixel values of some pixels that are determined by the motion vector detected in the student image and that are spatially or temporally near the pixel in the student image that is at the same position as that of the pixel of interest as class taps used to classify the pixel of interest into one of a plurality of classes;

class classification means for classifying the pixel of interest on the basis of a size of the motion vector detected in the student image and the class taps;

prediction-tap extracting means for extracting, from the student image signal, pixel values of some pixels that are determined by the motion vector detected in the student image and that are spatially or temporally near the pixel in the student image that is at the same position as that of the pixel of interest as prediction taps used to predict the pixel of interest; and coefficient generating means for obtaining the conversion coefficient for each of the plurality of classes by solving a normal equation formulated for the class of the pixel of interest, relative to the pixel value of the pixel of interest and the prediction taps, the normal equation representing a relationship among the pixel value of the pixel of interest, the prediction taps, and the conversion coefficient.

4. A coefficient generating method for a coefficient generating device that generates a conversion coefficient for converting an input image signal of an input image into a display image signal of a display image perceived by an observer as if the input image were displayed when the display image is displayed on predetermined display means, the coefficient generating device including past-image generating means for generating a past image signal of a past image correlated with a teacher image of a frame that is one frame before a teacher image correlated with the display image, the teacher image being used to obtain the conversion coefficient, transient-image generating means for generating, in a case where the past image and then the teacher image are to be displayed on the display means, a transient image signal of a transient image to be displayed on the display means in a period in which displaying is switched from the past image to the teacher image, visual-image generating means for generating a visual image signal of a visual image perceived by the observer when the teacher image is displayed on the display means, the visual image serving as a student image correlated with the input image, the student image being used to obtain the conversion coefficient, and calculating means for obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest, the coefficient generating method comprising the steps of:

generating, with the past-image generating means, the past image signal of the past image on the basis of a teacher image signal of the teacher image and a motion vector detected in the teacher image;

generating, with the transient-image generating means, the transient image signal of the transient image on the basis of the teacher image signal and the past image signal;

generating, with the visual-image generating means, using the past image signal, the transient image signal, the teacher image signal, and the motion vector detected in the teacher image, the visual image signal of the visual image by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image; and obtaining, with the calculating means, the conversion coefficient using the pixel value of the pixel of interest and the pixel values of the pixels that are spatially or temporally near the pixel in the student image that is at the same position as that of the pixel of interest.

5. A non-transitory computer-readable medium including a program for causing a coefficient generating device that generates a conversion coefficient for converting an input image signal of an input image into a display image signal of a display image perceived by an observer as if the input image were displayed when the display image is displayed on predetermined display means to perform a process comprising the steps of:

generating a past image signal of a past image correlated with a teacher image of a frame that is one frame before a teacher image correlated with the display image, on the basis of a teacher image signal of the teacher image and a motion vector detected in the teacher image, the teacher image being used to obtain the conversion coefficient;

generating, on the basis of the teacher image signal and the past image signal, in a case where the past image and then the teacher image are to be displayed on the display means, a transient image signal of a transient image to be displayed on the display means in a period in which displaying is switched from the past image to the teacher image;

generating, using the past image signal, the transient image signal, the teacher image signal, and the motion vector, a visual image signal of a visual image perceived by the observer when the teacher image is displayed on the display means, the visual image serving as a student image correlated with the input image, the student image being used to obtain the conversion coefficient, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image; and obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

6. An image generating device that converts an input image signal of an input image into a display image signal of a display image perceived by an observer as if the input image were displayed when the display image is displayed on predetermined display means, comprising:

prediction-tap extracting means for regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest; and predictive calculation means for predictively calculating a pixel value of the first pixel of interest by performing linear coupling on a conversion coefficient that is obtained in advance and the prediction taps, wherein the conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest, and wherein the student image is a visual image perceived by the observer when the teacher image is displayed on the display means, the visual image being generated using a teacher image signal of the teacher image, a past image signal of a past image correlated with a teacher image of a frame that is one frame before the teacher image, the past image being generated on the basis of the teacher image signal and a motion vector detected in the teacher image, a transient image signal of a transient image to be displayed on the display means in a period in which displaying is switched from the past image to the teacher image in a case where the past image and then the teacher image are to be displayed on the display means, the transient image being generated on the basis of a model indicating a light-emitting characteristic of the display means, the teacher image signal, and the past image signal, and the motion vector detected in the teacher image, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image.

7. The image generating device according to claim 6, further comprising:

class-tap extracting means for extracting, from the input image signal, pixel values of some pixels that are determined by the motion vector detected in the input image and that are spatially or temporally near the pixel in the input image that is at the same position as that of the first pixel of interest as class taps used to classify the first pixel of interest into one of a plurality of classes; and class classification means for classifying the first pixel of interest on the basis of a size of the motion vector detected in the input image and the class taps, wherein the predictive calculation means predictively calculates a pixel value of the first pixel of interest using the conversion coefficient obtained in advance for the class of the first pixel of interest.

8. The image generating device according to claim 7, wherein the conversion coefficient is obtained for each of the plurality of classes by extracting, from a student image signal of the student image, pixel values of some pixels that are determined by the motion vector detected in the student image and that are spatially or temporally near the pixel in the student image that is at the same position as that of the second pixel of interest as the class taps, classifying the second pixel of interest on the basis of a size of the motion vector detected in the student image and the class taps extracted from the student image signal, extracting, from the student image signal, pixel values of some pixels that are determined by the motion vector detected in the student image and that are spatially or temporally near the pixel in the student image that is at the same position as that of the second pixel of interest as the prediction taps, and obtaining the conversion coefficient by solving a normal equation formulated for the class of the second pixel of interest, relative to the pixel value of the second pixel of interest and the prediction taps extracted from the student image signal, the normal equation representing a relationship among the pixel value of the second pixel of interest, the prediction taps extracted from the student image signal, and the conversion coefficient.

9. An image generating method for an image generating device that converts an input image signal of an input image into a display image signal of a display image perceived by an observer as if the input image were displayed when the display image is displayed on predetermined display means, the image generating device including prediction-tap extracting means for regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest, and predictive calculation means for predictively calculating a pixel value of the first pixel of interest by performing linear coupling on a conversion coefficient that is obtained in advance and the prediction taps, the image generating method comprising the steps of:

extracting, with the prediction-tap extracting means, the prediction taps from the input image signal; and predictively calculating, with the predictive calculation means, the pixel value of the first pixel of interest by performing linear coupling on the conversion coefficient and the prediction taps, wherein the conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest, and wherein the student image is a visual image perceived by the observer when the teacher image is displayed on the display means, the visual image being generated using a teacher image signal of the teacher image, a past image signal of a past image correlated with a teacher image of a frame that is one frame before the teacher image, the past image being generated on the basis of the teacher image signal and a motion vector detected in the teacher image, a transient image signal of a transient image to be displayed on the display means in a period in which displaying is switched from the past image to the teacher image in a case where the past image and then the teacher image are to be displayed on the display means, the transient image being generated on the basis of a model indicating a light-emitting characteristic of the display means, the teacher image signal, and the past image signal, and the motion vector detected in the teacher image, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image.

10. A non-transitory computer-readable medium including a program for causing an image generating device that converts an input image signal of an input image into a display image signal of a display image perceived by an observer as if the input image were displayed when the display image is displayed on predetermined display means to perform a process comprising the steps of:

regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest; and predictively calculating a pixel value of the first pixel of interest by performing linear coupling on a conversion coefficient that is obtained in advance and the prediction taps, wherein the conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest, and wherein the student image is a visual image perceived by the observer when the teacher image is displayed on the display means, the visual image being generated using a teacher image signal of the teacher image, a past image signal of a past image correlated with a teacher image of a frame that is one frame before the teacher image, the past image being generated on the basis of the teacher image signal and a motion vector detected in the teacher image, a transient image signal of a transient image to be displayed on the display means in a period in which displaying is switched from the past image to the teacher image in a case where the past image and then the teacher image are to be displayed on the display means, the transient image being generated on the basis of a model indicating a light-emitting characteristic of the display means, the teacher image signal, and the past image signal, and the motion vector detected in the teacher image, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image.

11. A coefficient generating device that generates a conversion coefficient for converting an input image signal of an input image into a display image signal of a display image perceived by an observer as if the input image were displayed when the display image is displayed on predetermined display means, comprising:

average-image generating means for generating an average image signal of an average image obtained by averaging a teacher image correlated with the display image and a teacher image of a frame that is one frame before the teacher image, on the basis of a teacher image signal of the teacher image, the teacher image being used to obtain the conversion coefficient;

past-image generating means for generating a past image signal of a past image correlated with an average image of a frame that is one frame before the average image, on the basis of the average image signal and a motion vector detected in the average image;

transient-image generating means for generating, on the basis of the average image signal and the past image signal, in a case where the past image and then the average image are to be displayed on the display means, a transient image signal of a transient image to be displayed on the display means in a period in which displaying is switched from the past image to the teacher image;

visual-image generating means for generating, using the past image signal, the transient image signal, the average image signal, and the motion vector, a visual image signal of a visual image perceived by the observer when the average image is displayed on the display means, the visual image serving as a student image correlated with the input image, the student image being used to obtain the conversion coefficient, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image; and calculating means for obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

12. The coefficient generating device according to claim 11, wherein the transient-image generating means generates the transient image signal using a model indicating a light-emitting characteristic of the display means, the average image signal, and the past image signal.

13. The coefficient generating device according to claim 12, wherein the calculating means includes:
   class-tap extracting means for extracting, from a student image signal of the student image, pixel values of some pixels that are determined by the motion vector detected in the student image and that are spatially or temporally near the pixel in the student image that is at the same position as that of the pixel of interest as class taps used to classify the pixel of interest into one of a plurality of classes;
   class classification means for classifying the pixel of interest on the basis of a size of the motion vector detected in the student image and the class taps;
   prediction-tap extracting means for extracting, from the student image signal, pixel values of some pixels that are determined by the motion vector detected in the student image and that are spatially or temporally near the pixel in the student image that is at the same position as that of the pixel of interest as prediction taps used to predict the pixel of interest; and
   coefficient generating means for obtaining the conversion coefficient for each of the plurality of classes by solving a normal equation formulated for the class of the pixel of interest, relative to the pixel value of the pixel of interest and the prediction taps, the normal equation representing a relationship among the pixel value of the pixel of interest, the prediction taps, and the conversion coefficient.

14. A coefficient generating method for a coefficient generating device that generates a conversion coefficient for converting an input image signal of an input image into a display image signal of a display image perceived by an observer as if the input image were displayed when the display image is displayed on predetermined display means, the coefficient generating device including
   average-image generating means for generating an average image signal of an average image obtained by averaging a teacher image correlated with the display image and a teacher image of a frame that is one frame before the teacher image, on the basis of a teacher image signal of the teacher image, the teacher image being used to obtain the conversion coefficient,
   past-image generating means for generating a past image signal of a past image correlated with an average image of a frame that is one frame before the average image,
   transient-image generating means for generating, in a case where the past image and then the average image are to be displayed on the display means, a transient image signal of a transient image to be displayed on the display means in a period in which displaying is switched from the past image to the average image,
   visual-image generating means for generating a visual image signal of a visual image perceived by the observer when the average image is displayed on the display means, the visual image serving as a student image correlated with the input image, the student image being used to obtain the conversion coefficient, and
   calculating means for obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest, the coefficient generating method comprising the steps of:
      generating, with the average-image generating means, the average image signal;
      generating, with the past-image generating means, the past image signal of the past image on the basis of the average image signal of the average image and a motion vector detected in the average image;
      generating, with the transient-image generating means, the transient image signal of the transient image on the basis of the average image signal and the past image signal;
      generating, with the visual-image generating means, using the past image signal, the transient image signal, the teacher image signal, and the motion vector detected in the average image, the visual image signal of the visual image by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image; and
      obtaining, with the calculating means, the conversion coefficient using the pixel value of the pixel of interest and the pixel values of the pixels that are spatially or temporally near the pixel in the student image that is at the same position as that of the pixel of interest.

15. A non-transitory computer-readable medium including a program for causing a coefficient generating device that generates a conversion coefficient for converting an input image signal of an input image into a display image signal of a display image perceived by an observer as if the input image were displayed when the display image is displayed on predetermined display means to perform a process comprising the steps of:
   generating an average image signal of an average image obtained by averaging a teacher image correlated with the display image and a teacher image of a frame that is one frame before the teacher image, on the basis of a teacher image signal of the teacher image, the teacher image being used to obtain the conversion coefficient;
   generating a past image signal of a past image correlated with an average image of a frame that is one frame before the average image, on the basis of the average image signal of the average image and a motion vector detected in the average image;
   generating, on the basis of the average image signal and the past image signal, in a case where the past image and then the average image are to be displayed on the display means, a transient image signal of a transient image to be displayed on the display means in a period in which displaying is switched from the past image to the average image;
   generating, using the past image signal, the transient image signal, the average image signal, and the motion vector, a visual image signal of a visual image perceived by the observer when the average image is displayed on the display means, the visual image serving as a student image correlated with the input image, the student image being used to obtain the conversion coefficient, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image; and
   obtaining the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

16. An image generating device that converts an input image signal of an input image into a display image signal of a display image perceived by an observer as if the input image were displayed when the display image is displayed on predetermined display means, comprising:

prediction-tap extracting means for regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest; and predictive calculation means for predictively calculating a pixel value of the first pixel of interest by performing linear coupling on a conversion coefficient that is obtained in advance and the prediction taps, wherein the conversion coefficient is obtained using
  a pixel value of a second pixel of interest in a teacher image correlated with the display image, and
  pixel values of pixels that are determined by a motion vector detected in a student image correlated with the input image and that are spatially or temporally near a pixel in the student image that is at the same position as that of the second pixel of interest, and wherein the student image is a visual image perceived by the observer when the average image is displayed on the display means, the visual image being generated using
  an average image signal of an average image obtained by averaging the teacher image and a teacher image of a frame that is one frame before the teacher image, the average image being generated on the basis of a teacher image signal of the teacher image,
  a past image signal of a past image correlated with an average image of a frame that is one frame before the average image, the past image being generated on the basis of the average image signal and a motion vector detected in the average image,
  a transient image signal of a transient image to be displayed on the display means in a period in which displaying is switched from the past image to the average image in a case where the past image and then the average image are to be displayed on the display means, the transient image being generated on the basis of a model indicating a light-emitting characteristic of the display means, the average image signal, and the past image signal, and
  the motion vector detected in the average image,
  by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image.

17. The image generating device according to claim 16, further comprising:

class-tap extracting means for extracting, from the input image signal, pixel values of some pixels that are determined by the motion vector detected in the input image and that are spatially or temporally near the pixel in the input image that is at the same position as that of the first pixel of interest as class taps used to classify the first pixel of interest into one of a plurality of classes; and class classification means for classifying the first pixel of interest on the basis of a size of the motion vector detected in the input image and the class taps, wherein the predictive calculation means predictively calculates the pixel value of the first pixel of interest using the conversion coefficient obtained in advance for the class of the first pixel of interest.

18. The image generating device according to claim 17, wherein the conversion coefficient is obtained for each of the plurality of classes by extracting, from a student image signal of the student image, pixel values of some pixels that are determined by the motion vector detected in the student image and that are spatially or temporally near the pixel in the student image that is at the same position as that of the second pixel of interest as the class taps, classifying the second pixel of interest on the basis of a size of the motion vector detected in the student image and the class taps extracted from the student image signal, extracting, from the student image signal, pixel values of some pixels that are determined by the motion vector detected in the student image and that are spatially or temporally near the pixel in the student image that is at the same position as that of the second pixel of interest as the prediction taps, and obtaining the conversion coefficient by solving a normal equation formulated for the class of the second pixel of interest, relative to the pixel value of the second pixel of interest and the prediction taps extracted from the student image signal, the normal equation representing a relationship among the pixel value of the second pixel of interest, the prediction taps extracted from the student image signal, and the conversion coefficient.

19. An image generating method for an image generating device that converts an input image signal of an input image into a display image signal of a display image perceived by an observer as if the input image were displayed when the display image is displayed on predetermined display means, the image generating device including prediction-tap extracting means for regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest, and predictive calculation means for predictively calculating a pixel value of the first pixel of interest by performing linear coupling on a conversion coefficient that is obtained in advance and the prediction taps, the image generating method comprising the steps of:

extracting, with the prediction-tap extracting means, the prediction taps from the input image signal; and predictively calculating, with the predictive calculation means, the pixel value of the first pixel of interest by performing linear coupling on the conversion coefficient and the prediction taps, wherein the conversion coefficient is obtained using
  a pixel value of a second pixel of interest in a teacher image correlated with the display image, and
  pixel values of pixels that are determined by a motion vector detected in a student image correlated with the input image and that are spatially or temporally near a pixel in the student image that is at the same position as that of the second pixel of interest, and wherein the student image is a visual image perceived by the observer when the average image is displayed on the display means, the visual image being generated using an average image signal of an average image obtained by averaging the teacher image and a teacher image of a frame that is one frame before the teacher image, the average image being generated on the basis of a teacher image signal of the teacher image, a past image signal of a past image correlated with an average image of a frame that is one frame before the average image, the past image being generated on the basis of the average image signal and a motion vector detected in the average image, a transient image signal of a transient image to be displayed on the display means in a period in which displaying is switched from the past image to the average image in a case where the past image and then the average image are to be displayed on the display means, the transient image being generated on the basis of a model indicating a light-emitting characteristic of the display means, the average image signal, and the past image signal, and the motion vector detected in the average image, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image.

20. A non-transitory computer-readable medium including a program for causing an image generating device that converts an input image signal of an input image into a display image signal of a display image perceived by an observer as if the input image were displayed when the display image is displayed on predetermined display means to perform a process comprising the steps of:

regarding a pixel of interest in the display image to be generated as a first pixel of interest, and extracting, from the input image signal, pixel values of some pixels that are determined by a motion vector detected in the input image and that are spatially or temporally near a pixel in the input image that is at the same position as that of the first pixel of interest as prediction taps used to predict the first pixel of interest; and predictively calculating a pixel value of the first pixel of interest by performing linear coupling on a conversion coefficient that is obtained in advance and the prediction taps, wherein the conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest, and wherein the student image is a visual image perceived by the observer when the average image is displayed on the display means, the visual image being generated using an average image signal of an average image obtained by averaging the teacher image and a teacher image of a frame that is one frame before the teacher image, the average image being generated on the basis of a teacher image signal of the teacher image, a past image signal of a past image correlated with an average image of a frame that is one frame before the average image, the past image being generated on the basis of the average image signal and a motion vector detected in the average image, a transient image signal of a transient image to be displayed on the display means in a period in which displaying is switched from the past image to the average image in a case where the past image and then the average image are to be displayed on the display means, the transient image being generated on the basis of a model indicating a light-emitting characteristic of the display means, the average image signal, and the past image signal, and the motion vector detected in the average image, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image.

21. A coefficient generating device that generates a conversion coefficient for converting an input image signal of an input image into a display image signal of a display image perceived by an observer as if the input image were displayed when the display image is displayed on a predetermined display device, comprising:

a past-image generating unit configured to generate a past image signal of a past image correlated with a teacher image of a frame that is one frame before a teacher image correlated with the display image, on the basis of a teacher image signal of the teacher image and a motion vector detected in the teacher image, the teacher image being used to obtain the conversion coefficient;

a transient-image generating unit configured to generate, on the basis of the teacher image signal and the past image signal, in a case where the past image and then the teacher image are to be displayed on the display device, a transient image signal of a transient image to be displayed on the display device in a period in which displaying is switched from the past image to the teacher image;

a visual-image generating unit configured to generate, using the past image signal, the transient image signal, the teacher image signal, and the motion vector, a visual image signal of a visual image perceived by the observer when the teacher image is displayed on the display device, the visual image serving as a student image correlated with the input image, the student image being used to obtain the conversion coefficient, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image; and a calculating unit configured to obtain the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

22. An image generating device that converts an input image signal of an input image into a display image signal of a display image perceived by an observer as if the input image were displayed when the display image is displayed on a predetermined display device, comprising:

a prediction-tap extracting unit configured to regard a pixel of interest in the display image to be generated as a first pixel of interest, and to extract, from the input image signal, pixel values of some pixels that are determined by a motion vector detected in the input image and that are spatially or temporally near a pixel in the input image that is at the same position as that of the first pixel of interest as prediction taps used to predict the first pixel of interest; and a predictive calculation unit configured to predictively calculate a pixel value of the first pixel of interest by performing linear coupling on a conversion coefficient that is obtained in advance and the prediction taps, wherein the conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest, and wherein the student image is a visual image perceived by the observer when the teacher image is displayed on the display device, the visual image being generated using a teacher image signal of the teacher image, a past image signal of a past image correlated with a teacher image of a frame that is one frame before the teacher image, the past image being generated on the basis of the teacher image signal and a motion vector detected in the teacher image, a transient image signal of a transient image to be displayed on the display device in a period in which displaying is switched from the past image to the teacher image in a case where the past image and then the teacher image are to be displayed on the display device, the transient image being generated on the basis of a model indicating a light-emitting characteristic of the display device, the teacher image signal, and the past image signal, and the motion vector detected in the teacher image, by obtaining an average of pixel values of pixels in the past image, the transient image, and the teacher image, the pixels being predicted to be followed by eyes of the observer in the period in which displaying is switched from the past image to the teacher image, and regarding the average as a pixel value of a pixel in the visual image.

23. A coefficient generating device that generates a conversion coefficient for converting an input image signal of an input image into a display image signal of a display image perceived by an observer as if the input image were displayed when the display image is displayed on a predetermined display device, comprising:

an average-image generating unit configured to generate an average image signal of an average image obtained by averaging a teacher image correlated with the display image and a teacher image of a frame that is one frame before the teacher image, on the basis of a teacher image signal of the teacher image, the teacher image being used to obtain the conversion coefficient;

a past-image generating unit configured to generate a past image signal of a past image correlated with an average image of a frame that is one frame before the average image, on the basis of the average image signal and a motion vector detected in the average image;

a transient-image generating unit configured to generate, on the basis of the average image signal and the past image signal, in a case where the past image and then the average image are to be displayed on the display device, a transient image signal of a transient image to be displayed on the display device in a period in which displaying is switched from the past image to the teacher image;

a visual-image generating unit configured to generate, using the past image signal, the transient image signal, the average image signal, and the motion vector, a visual image signal of a visual image perceived by the observer when the average image is displayed on the display device, the visual image serving as a student image correlated with the input image, the student image being used to obtain the conversion coefficient, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image; and a calculating unit configured to obtain the conversion coefficient using a pixel value of a pixel of interest in the teacher image and pixel values of pixels that are determined by a motion vector detected in the student image and that are spatially or temporally near a pixel in the student image that is at the same position as that of the pixel of interest.

24. An image generating device that converts an input image signal of an input image into a display image signal of a display image perceived by an observer as if the input image were displayed when the display image is displayed on a predetermined display device, comprising:

a prediction-tap extracting unit configured to regard a pixel of interest in the display image to be generated as a first pixel of interest, and to extract, from the input image signal, pixel values of some pixels that are determined by a motion vector detected in the input image and that are spatially or temporally near a pixel in the input image that is at the same position as that of the first pixel of interest as prediction taps used to predict the first pixel of interest; and a predictive calculation unit configured to predictively calculate a pixel value of the first pixel of interest by performing linear coupling on a conversion coefficient that is obtained in advance and the prediction taps, wherein the conversion coefficient is obtained using a pixel value of a second pixel of interest in a teacher image correlated with the display image, and pixel values of pixels that are determined by a motion vector detected in a student image correlated with the input image and that are spatially or temporally near a pixel in the student image that is at the same position as that of the second pixel of interest, and wherein the student image is a visual image perceived by the observer when the average image is displayed on the display device, the visual image being generated using an average image signal of an average image obtained by averaging the teacher image and a teacher image of a frame that is one frame before the teacher image, the average image being generated on the basis of a teacher image signal of the teacher image, a past image signal of a past image correlated with an average image of a frame that is one frame before the average image, the past image being generated on the basis of the average image signal and a motion vector detected in the average image, a transient image signal of a transient image to be displayed on the display device in a period in which displaying is switched from the past image to the average image in a case where the past image and then the average image are to be displayed on the display device, the transient image being generated on the basis of a model indicating a light-emitting characteristic of the display device, the average image signal, and the past image signal, and the motion vector detected in the average image, by obtaining an average of pixel values of pixels in the past image, the transient image, and the average image, the pixels being predicted to be followed by eyes of the observer in the period in which displaying is switched from the past image to the average image, and regarding the average as a pixel value of a pixel in the visual image.

* * * * *